(12) United States Patent
Greer et al.

(10) Patent No.: US 8,782,093 B2
(45) Date of Patent: *Jul. 15, 2014

(54) SYSTEM AND METHOD FOR MANAGING CONSTRUCTION PROJECTS

(75) Inventors: Gary L. Greer, Lewisville, TX (US); John T. Hohn, Santa Cruz, CA (US); Margaret L. Flores, San Jose, CA (US)

(73) Assignee: GCC, Inc., San Jose, CA (US)

( * ) Notice: Subject to any disclaimer, the term of this patent is extended or adjusted under 35 U.S.C. 154(b) by 526 days.

This patent is subject to a terminal disclaimer.

(21) Appl. No.: 12/221,621

(22) Filed: Aug. 5, 2008

(65) Prior Publication Data

US 2008/0301153 A1 Dec. 4, 2008

Related U.S. Application Data

(63) Continuation of application No. 10/642,103, filed on Aug. 15, 2003, now Pat. No. 7,409,392.

(60) Provisional application No. 60/404,281, filed on Aug. 16, 2002, provisional application No. 60/495,856, filed on Aug. 15, 2003.

(51) Int. Cl.
*G06F 17/30* (2006.01)

(52) U.S. Cl.
CPC ....... *G06F 17/30017* (2013.01); *Y10S 707/966* (2013.01)
USPC .......................................... 707/802; 707/966

(58) Field of Classification Search
USPC .......... 707/600–831, 966; 703/1; 705/8, 9, 11
See application file for complete search history.

(56) References Cited

U.S. PATENT DOCUMENTS

| | | | | |
|---|---|---|---|---|
| 5,761,674 A | * | 6/1998 | Ito | 1/1 |
| 6,842,760 B1 | * | 1/2005 | Dorgan et al. | 1/1 |

(Continued)

FOREIGN PATENT DOCUMENTS

| | | |
|---|---|---|
| JP | 2002-123577 A | 4/2002 |
| JP | 2002-188290 A | 7/2002 |

OTHER PUBLICATIONS

Wooyoung Kim et al., Visualized construction process on virtual reality, 2001, IEEE, 684-689.*

(Continued)

*Primary Examiner* — Jean B Fleurantin
(74) *Attorney, Agent, or Firm* — Larry E. Henneman, Jr.; Gregory P. Gibson; Henneman & Associates, PLC

(57) ABSTRACT

A system for managing construction projects includes a database, a component interface, a state interface, and a database interface. The component interface is operative to receive component identifiers identifying components of a construction project. The state interface is operative to receive state indicators, each state indicator indicating a particular state (e.g., ordered, in transit, installed, inspected, etc.) associated with one of the components. The database interface is operative to store the component identifiers and the associated state indicators in the database. A method of managing construction projects is also described. The method includes the steps of receiving a plurality of component identifiers from a user, associating an initial predefined state with each received identifier, storing the component identifiers and the associated initial states in a database, updating the states associated with the component identifiers in the data base, and retrieving the updated states from the database to determine the status of the construction project. Novel data structures, application program interfaces, and graphical user interfaces are also disclosed.

124 Claims, 48 Drawing Sheets

(56) References Cited

U.S. PATENT DOCUMENTS

| | | | |
|---|---|---|---|
| 6,859,768 B1 * | 2/2005 | Wakelam et al. | 703/1 |
| 6,922,701 B1 * | 7/2005 | Ananian et al. | 1/1 |
| 2003/0018507 A1 * | 1/2003 | Flanagan | 705/8 |

OTHER PUBLICATIONS

PCT App. No. PCT/US2003/025437; International Search Report dated Dec. 15, 2003.
PCT App. No. PCT/US2003/025437; International Preliminary Report on Patentability dated Apr. 26, 2004.
AU Application No. 2003256420, Office Action dated Nov. 14, 2008.
CA Application No. 2,495,204, Office Action dated Apr. 26, 2010.
CN Application No. 03823501.3, Office Action dated Sep. 21, 2007 (English translation).
CN Application No. 03823501.3, Office Action dated Nov. 22, 2007 (English translation).
CN Application No. 03823501.3, Office Action dated Jun. 13, 2008 (English translation).
CN Application No. 03823501.3, Office Action dated Apr. 20, 2009 (English translation).
EP Application No. 03788468.1, European Search Report dated May 2, 2008.
EP Application No. 03788468.1, Office Action dated Nov. 10, 2008.
JP Application No. 2004-529392, Office Action dated Jun. 17, 2009 (English translation).
MX App. No. PA/A/2005/001911, Office Action dated May 7, 2008 (English translation).
MX App. No. PA/A/2005/001911, Office Action dated Oct. 13, 2008 (English translation).
MX App. No. PA/A/2005/001911, Office Action dated Mar. 15, 2009 (English translation).
CA Application Serial No. 2, 495,204, Office Action dated Apr. 30, 2013.

* cited by examiner

Transmittal

- transID - 1804
- employeeID - 1806
- toCompanyID - 1808
- toAttnID - 1810
- tranDate - 1812
- jobID - 1814
- jobName - 1816
- subject1 - 1818
- subject2 - 1820
- herewith - 1822
- asRequested - 1824
- prints - 1826
- showDrawing - 1828
- specifications - 1830
- brochurs - 1832
- letter - 1834
- submittalData - 1836
- review - 1838
- approval - 1840
- yourFiles - 1842
- correction - 1844
- signature - 1846
- yourAction - 1848
- submittalOfPrice - 1850
- yourReply - 1852
- regularMail - 1854
- approved - 1856
- notApproved - 1858
- handDelivery - 1860
- proceedAsIndicated - 1862
- resubmit - 1864
- sendingOther - 1866
- forOther - 1868
- byOther - 1870
- submit - 1872
- forOtherString - 1874
- byOtherString - 1876
- sendingOtherString - 1878
- byNote - 1880
- byNoteString - 1882
- remark - 1884
- transNumber - 1886

| Site Information | ☒ |

| | |
|---|---|
| *Site Name: | 2292 |
| *Address: | 2294 |
| Address2: | 2296 |
| *City: | 2298 |
| *State: | 2300 |
| *Zip: | 2302 |
| *Phone: | 2304 |
| Fax: | 2306 |

2308

Save   Cancel

*Denotes Required Field

| Clients | | | | | | | |
|---|---|---|---|---|---|---|---|
| *Client Name: | 2402 | | | | | New | Delete |
| *Address: | 2404 | | | | | 2424 | |
| Address2: | 2406 | | | | | | |
| *City: | 2408 | | | | | | |
| *State: | 2410 | | Fax: | 2416 | | | |
| *Zip: | 2412 | | Type: | 2418 | | | |
| *Phone: | 2414 | | BBS: | 2420 | | | |
| Pact Name: | 2422 | | | | 2426 | | |

Client Contacts

| First Name | Last Name | Title | Phone | Fax | E-Mail | Pager |
|---|---|---|---|---|---|---|
| * | | | | | | |
| ▲ | | | | | | |
| ▼ | | | Save | Cancel | | |
| | | | 2428 | | | |

*Denotes Required Field

| Employees | |
|---|---|
| Employee Name: | 2442 |
| *First Name: | 2444 |
| *Last Name: | 2446 |
| *Preferred Name: | 2448 |
| *User Name: | 2450 |
| Code: | 2452 |
| Trade: | 2454 |
| Grade: | 2456 |
| Termination Date: | 2458 |
| Active: | ✓ 2460 |
| Phone: | 2462 |
| Extension: | 2464 |
| Fax: | 2466 |
| Mobile: | 2468 |
| Pager: | 2470 |

New — 2472
Delete
Save  Cancel — 2440

*Denotes Required Field

Vendors

*Vendor Name: 2512    ▽—2534    New    Delete

*Address: 2514

Address2: 2516

*City: 2518

*State: 2520    Fax: 2526

*Zip: 2522    Type: 2528

*Phone: 2524    BBS: 2530

Pact Name: 2532

Vendor Contacts — 2536

| First Name | Last Name | Title | Phone | Fax | E-Mail | Pager | Mobile | Pref |
|---|---|---|---|---|---|---|---|---|
| * | | | | | | | | |
| ▲ | | | | | | | | |
| | | | | | | | | |

Save — 2538      Cancel

*Denotes Required Field — 2510

FIG. 76

Standard Attachments

- *Attachment Name: 2552 [New] [Delete] — 2564
- Title: 2554
- Sub Title: 2556
- Short Description: 2558
- Description: 2560
- *Path: 2562

[Save] [Cancel]

*Denotes Required Field

Standard Notes

- Active Notes: 2572 [New] [Delete]
- Edit Note: 2574 — 2576

[Save] [Cancel]

| Purchase Order Categories | | | | ☒ |
|---|---|---|---|---|
| Categories: | 2582 | ▽ | New | Delete |
| Category ID: | 2584 | ⌐ 2588 | | |
| Category Description: | 2586 | | | |

Save  Cancel

| PO Classifications | ╱ 2612 | | | ☒ |
|---|---|---|---|---|
| PO Classifications: | 2592 ▽ | | New | Delete |
| PO Classification Name: | 2594 | | | |
| First PO No. In Sequence: | 2596 | String Identifier: | 2602 | |
| Last PO No. In Sequence: | 2598 | Append Identifier: | ☐ ⌐ 2604 | |
| Next PO No. To Use: | 2600 | Prepend Identifier: | ☐ ⌐ 2608 | |

Maximum PO Value: 2610

Save  Cancel

System Configuration Form

*Installation Path: 2802

*POs Editable?: ⬜ — 2804

Default SMTP Host: 2806

*Late Notification For PO Items Enabled?: ⬜ — 2808

*Late Notification For RFIs Enabled?: ⬜ — 2810

State Names:

- 0: Undefined
- 1: Material Ordered
- 2: Fabricated In Shop
- 3: Fabricated In Field
- 4: Shipped To Jobsite
- 5: Received On Jobsite
- 6: Spool or ISO Installed
- 7: Spool or ISO Complete
- 8: Ready For Testing
- 9: System Being Tested
- 10: System Being Flushed
- 11: System In Startup Mode
- 12: <input by user>
- 13: <input by user>
- 14: <input by user>
- 15: <input by user>
- 16: <input by user>

2812

[ Save ]  [ Cancel ]

*Denotes Required Field

SYSTEM AND METHOD FOR MANAGING CONSTRUCTION PROJECTS

RELATED APPLICATIONS

This application is a continuation of co-pending U.S. patent application Ser. No. 10/642,103 now U.S. Pat. No. 7,409,392 B2), filed Aug. 15, 2003 by the same inventors, which claims priority to U.S. Provisional Application No. 60/404,281 filed on Aug. 16, 2002 by the same inventors, and to U.S. Provisional Application No. 60/495,856 filed on Aug. 15, 2003 by the same inventors, all of which are incorporated herein by reference in their entirety.

BACKGROUND OF THE INVENTION

1. Field of the Invention

This invention relates generally to construction project management, and more particularly to a system and method for tracking the progress of construction projects.

2. Description of the Background Art

Managing a large construction project is a complex undertaking. Typical tasks include, but are not limited to, project design, ordering materials and supplies, fabrication, transportation of fabricated components, installation, inspection/testing, employee management, monitoring the use of resources, and customer billing. To complicate matters further, many of these tasks are performed at a construction site that is some distance from the construction company's central office, making supervision of the project even more difficult.

Having current information regarding the status of a project is critical to proper management. For example, current status information is required for a manager to determine whether a project is on schedule and/or is staying within budgetary constraints. As another example, it is common for construction contracts to provide for a payment schedule that is tied to certain percentages of completion of the project. Thus, it is important for management to know (and to be able to demonstrate to a customer) the status of a project, because delays in collecting and compiling status data result in delays in receiving payment. Under current practices, the time required to collect and process status data can be weeks for complex projects.

Another problem encountered in the management of construction projects is that certain critical projects (e.g., food handling systems, pharmaceutical systems, etc.) require validation that the project has been constructed in accordance with certain standards. Such validation typically requires the compiling of inspection reports and of product and/or process certifications of installed components. It is not uncommon for the validation process to take up to six months after project completion.

It is also difficult to maintain a "paper trail" of the project for warranty, liability, and/or other purposes. For example, if an installed component fails, it will be necessary to retrieve any information (e.g., manufacturer, inspections, warranty information, repair/replacement information, etc.) relating to the failed component. Under current practices, locating such information is extraordinarily time consuming. First the component must be identified. Then the purchasing records must be searched to determine which vendor provided the component. If more than one vendor provides identical components, it may be impossible to determine and/or prove the source of the component. Even if the vendor can be determined, it still remains to search records to determine the vendor's and/or manufacture's responsibility. Indeed, the time and expense required to collect the information on the component may well exceed the cost of simply replacing it.

For several reasons, detailed data related to the status of a construction project is not typically collected. First, as explained above, construction sites are physically removed, making data collection more difficult. Another reason is that workers at the site (electricians, plumbers, welders, etc.) are tradesman skilled in their field, but not trained, equipped, or necessarily willing to collect detailed data at a construction site. Yet another reason might be that data on the status of a project will be of little value when the project is complete. For example, the most detailed data is of little value if it cannot be compiled and presented in a manner that provides useful information. Whatever the reason(s), detailed data regarding the status of construction projects is not currently collected.

What is needed, therefore, is a system and method for providing the current status of construction projects. What is also needed is a system and method for providing near realtime information regarding the status of construction projects. What is also needed is a system and method for providing current costs expended on a construction project. What is also needed is a system and method for organizing and providing certification, inspection, and other information related to components of a construction project. What is also needed is a system and method for easily collecting data at a construction site. What is also needed is a system and method for presenting construction project data in a useful manner.

SUMMARY

The present invention overcomes the problems associated with the prior art by providing a system and method for managing a construction projects that provides current information on the status of the projects. The invention facilitates the easy entry of data corresponding to the construction status (e.g., ordered, installed, inspected, etc.) of particular components of construction projects, and the provision of the data in a clear and concise manner to a project manager.

A system for managing construction projects includes a database, a component interface, a state interface, and a database interface. The component interface is operative to receive component identifiers identifying components of a construction project. The state interface is operative to receive state indicators, each state indicator indicating a particular state (e.g., ordered, in transit, installed, inspected, etc.) associated with one of the components. The database interface is operative to store the component identifiers and the associated state indicators in the database.

Optionally, the system includes a time interface in addition to, or instead of, the state interface. The time interface is operative to receive time values indicative of hours worked on a particular component, and the database interface is operative to store the time values and associated component identifiers in the database.

Other optional interfaces include a link interface, a worker interface, a date interface, a site interface, a job interface, an activity interface, a drawing object interface, and a state property interface. The link interface is operative to receive links to files, the worker interface is operative to receive worker identifiers, the date interface is operative to receive date values, the site interface is operative to receive site identifiers, the job interface is operative to receive job identifiers, the activity interface is operative to receive activity identifiers, the drawing object interface is operative to receive drawing object identifiers, and the state property interface is operative to receive state property identifiers. The database interface is operative to store each of the above identifiers/values and associated component identifiers in the data base. The association between the identifiers/values and the component identifiers can be either direct or indirect, and can be either a many-to-one or a one-to-many relationship.

The system further includes query interfaces. In some cases, the query interface receives a query including a particular identifier and/or value, and the database interface searches the database, and provides identifiers/values associated with the received identifier/value. In other cases, the query interface receives a general query, and the database interface searches the database and provides a set of allowed identifiers/values.

The system further includes an optional viewer. The viewer includes a display, a user input device, and an application program interface. The application program interface enables the viewer to access the above described interfaces and query interfaces, and to write data to and receive data from the database. The viewer then displays a model file representation of the construction project based on the data received from the database. The user input device enables the viewer to incorporate identifiers/values selected by the user into the queries submitted to the query interfaces.

The system further includes an optional remote (e.g., handheld) data entry device, whereby a user can collect data for subsequent transfer to the database. The remote data entry device includes a display, a user input device, and an application program interface. The application program interface enables the remote data entry device to access the above described interfaces and query interfaces. In one particular embodiment, the remote device is operative to retrieve sets of component identifiers, sets of state indicators, sets of worker identifiers, and/or sets of activity codes. The remote device then presents the retrieved identifiers to the user, so the user can select identifiers to be included in records (e.g., time entries, state changes, etc.) stored in the remote device and later transferred to the database.

An optional extractor extracts component identifiers from a drawing file, and provides the component identifiers to the component interface. The components are defined within the drawing file by the program that creates the drawing file.

A method of managing a construction project is also described. The method includes the steps of receiving a plurality of component identifiers from a user, associating an initial one of at least three predefined states with each received identifier, storing the component identifiers and the associated initial states in a database, updating the states associated with the component identifiers in the data base, and retrieving the updated states from the database to determine the status of the construction project.

Novel data structures, application program interfaces, and graphical user interfaces are also disclosed, and are considered to be a part of the present invention.

The invention is also directed to non-transitory, electronically-readable storage media that store code associated with various aspects (e.g., methods, data structures, etc.) of the invention. The term "non-transitory" is intended to distinguish storage media from transitory electrical signals. However, rewritable memories are considered to be "non-transitory".

BRIEF DESCRIPTION OF THE DRAWINGS

The present invention is described with reference to the following drawings, wherein like reference numbers denote substantially similar elements:

FIG. 50 shows the fields included in the Transmittal table of FIG. 15;

FIG. 68 shows another portion of a graphical user interface of the present invention;

FIG. 69 shows another portion of a graphical user interface of the present invention;

FIG. 70 shows another portion of a graphical user interface of the present invention;

FIG. 73 shows another portion of a graphical user interface of the present invention;

FIG. 74 shows another portion of a graphical user interface of the present invention;

FIG. 76 shows another portion of a graphical user interface of the present invention;

FIG. 77 shows another portion of a graphical user interface of the present invention;

FIG. 78 shows another portion of a graphical user interface of the present invention;

FIG. 79 shows another portion of a graphical user interface of the present invention;

FIG. 80 shows another portion of a graphical user interface of the present invention;

FIG. 81 shows another portion of a graphical user interface of the present invention;

FIG. 83 shows another portion of a graphical user interface of the present invention;

FIG. 84 shows another portion of a graphical user interface of the present invention;

FIG. 85 shows another portion of a graphical user interface of the present invention;

FIG. 87 shows another portion of a graphical user interface of the present invention.

DETAILED DESCRIPTION

The present invention overcomes the problems associated with the prior art, by providing a system and method for managing construction projects that facilitates the easy entry of project data, and provides current information regarding the status of construction projects. In the following description, numerous specific details are set forth (e.g., example commercially available application programs) in order to provide a thorough understanding of the invention. Those skilled in the art will recognize, however, that the invention may be practiced apart from these specific details. In other instances, details of well known database programming practices (e.g., searching operations) have been omitted, so as not to unnecessarily obscure the present invention.

Figure 1:
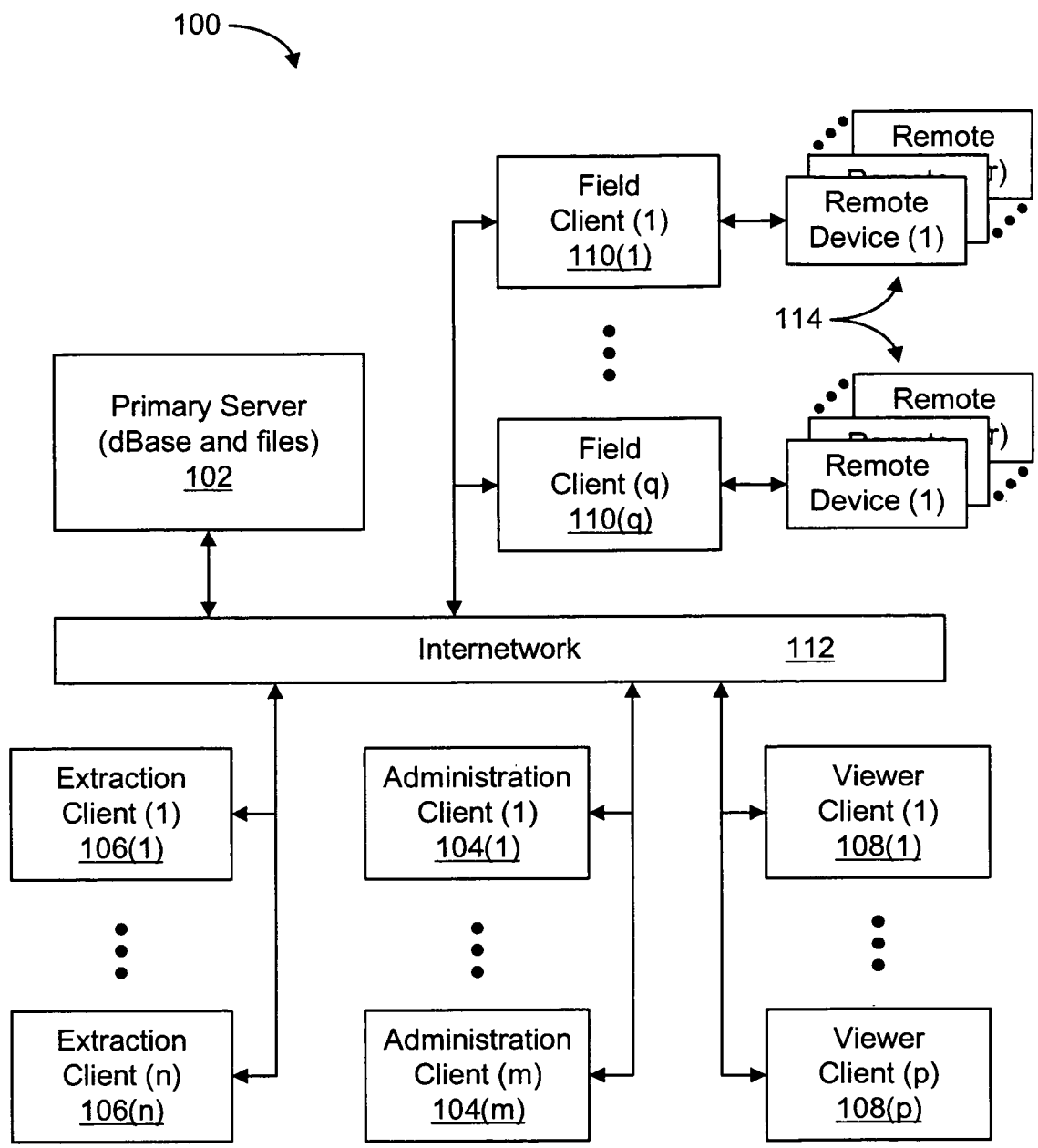
FIG. 1 is a block diagram of a system for managing construction projects according to one particular embodiment of the present invention.

FIG. 1 is a block diagram of a system 100 for managing construction projects according to one particular embodiment of the present invention. System 100 includes a primary server 102, a plurality of administration clients 104(1-m), a plurality of extraction clients 106(1-n), a plurality of viewer clients 108(1-p), and a plurality of field clients 110(1-q), all intercommunicating via an internetwork 112. System 100 further includes a plurality of remote devices 114(1-r) capable of communicating field clients 110(1-q).

Primary server 102 includes a database and files associated with one or more construction projects. Administration clients 104(1-m) facilitate the entry and/or retrieval of project data to and from server 102 by various personnel, including but not limited to those responsible for supervising construction, providing logistical support, reporting to customers, and so on. Extraction clients 106(1-n) are operative to extract information (e.g., drawing objects, object identifiers, etc.) from drawing files associated with construction projects, and to provide the extracted information to primary server 102. Extraction clients 106(1-n) are further operative to generate model files that include objects representing components (e.g., pipes, vents, support structures, etc.) of construction projects from computer-aided-design (CAD) files of the respective projects. Viewer clients 108(1-p) are operative to retrieve information from server 102, and to display the model files based on the retrieved data, such that the displayed model conveys information (e.g., the current state) related to the components. Field clients 110(1-q) are operative to provide data to server 102 from construction sites as projects at the respective sites proceed. Remote devices (e.g., hand-held, palm-top, etc.) are used by workers (e.g., foremen for the various trades) at a construction site to collect various data associated with particular components of the project, and to provide the collected data to field clients 110(1-q).

In this particular embodiment, internetwork 112 is a private wide-area-network (WAN). However, it should be understood that internetwork 112 can include any means to facilitate communication between server 102 and the other components of system 100, including but not limited to public networks, direct dial-up connections, wireless connections, docking stations, company intranets, and the like.

Further, the invention is not limited to any particular physical location of the particular components of system 100. According to one particular implementation, primary server 102 is located at the construction company headquarters in the IT department. Administration clients 104(1-m) can be scattered throughout various departments such as accounting, shipping and receiving, human resources, operations, and the like. Extraction clients 106(1-n) would likely be located in the engineering department, and viewer clients 108(1-p) would likely be distributed among the engineering and operations departments. As indicated above, field clients 110(1-q) are primarily intended for use on the actual construction sites. However, the foregoing distribution of components is intended only as an example, and it should be understood that the various components of system 100 can be located anywhere that is convenient for the staff that need to use them.

In the presently described embodiment, primary server 102 is an otherwise typical, commercially available server machine. Administration clients 104(1-m), extraction clients 106(1-n), and viewer clients 108(1-p) are otherwise conventional desk top computers. Field clients 110(1-q) are otherwise typical portable computers, and remote devices 114 are hand-held devices capable of communicating with field clients 110(1-q) via a docking cradle, an infrared connection, or the like. It should be understood, however, that the client components of system 100 can be hosted on other types of computing systems if desired. Further, two or more of the different client components can be hosted on a single computer. For example, a project manager might have a desktop machine that hosts an administration client 104 and a viewer client 108.

Figure 2:
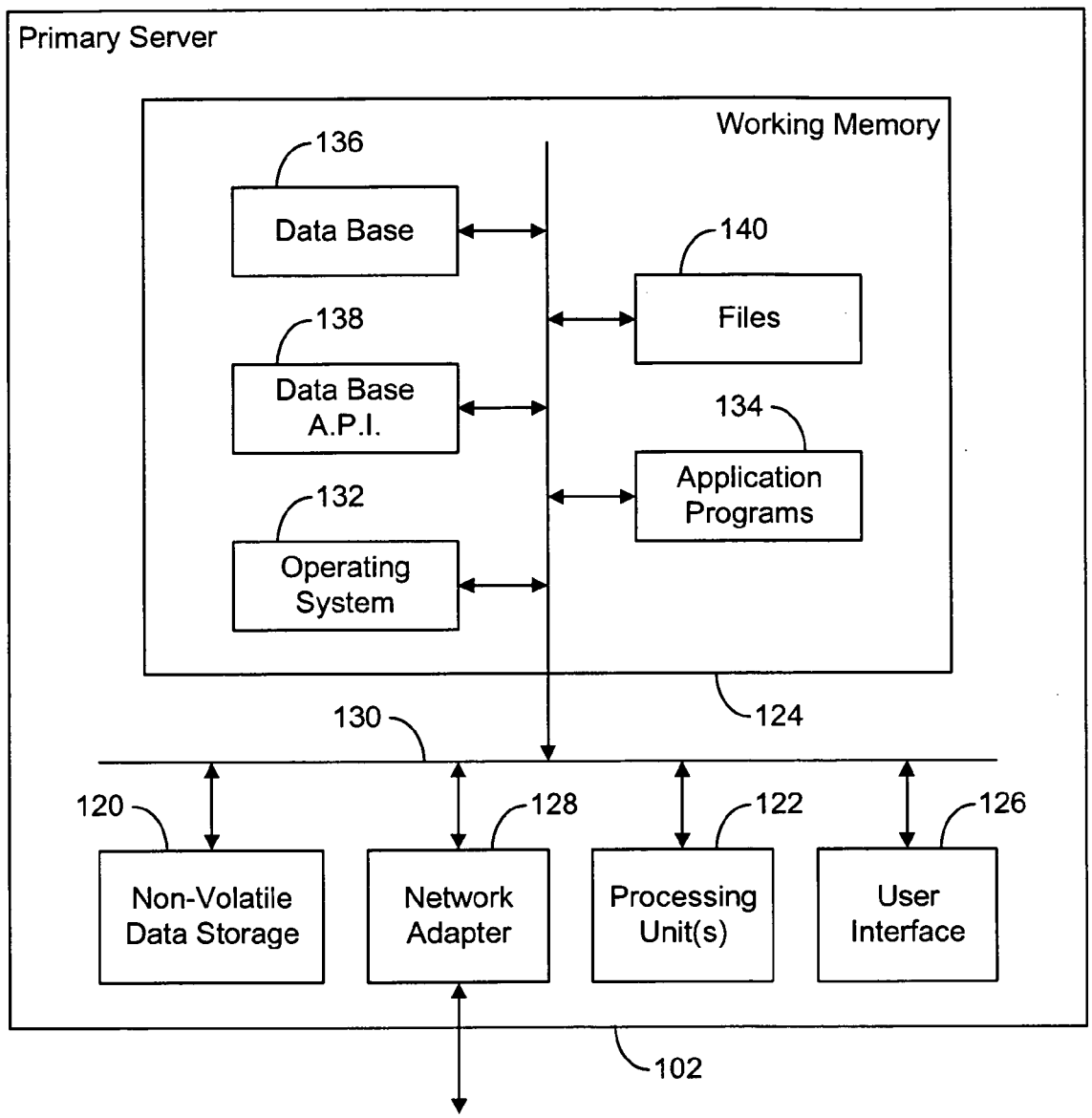
FIG. 2 is a block diagram showing the primary server of the system of FIG. 1 in greater detail.

FIG. 2 is a block diagram showing primary server 102 in greater detail to include non-volatile data storage 120, one or more processing units 122, working memory 124 (e.g., random access memory), a user interface 126, and a network adapter 128, all intercommunicating via an internal bus 130. Non-volatile data storage 120 stores data and code that is retained even when primary server 102 is powered down. Typical examples of non-volatile data storage include read only memory, hard disk drives, RAID arrays, optical disk drives, and other types of removable media. Processing unit(s) 122 impart functionality to primary server 102 by processing the executable code stored in non-volatile data storage 120 and memory 124. Working memory 124 provides temporary storage for data and code being processed by processing units(s) 122. User interface 126 provides a means for a user to interact with server 102, and typically include such devices as a keyboard, a monitor, a printer, a pointing device, and the like. Network adapter 128 facilitates communication with the other components of system 100 (FIG. 1) via internetwork 112.

In order to clearly explain the operation of primary server 102 (and the subsequently described client components), the functionality of server 102 (or the respective client component) is shown representationally as code blocks in memory 124 (or the memory of the respective client component). Those skilled in the art will understand, however, that all of the code need not remain in memory 124 during the operation of server 102. Indeed, processing unit(s) 122 will typically shuffle portions of the code into and out of memory 124 (e.g., to/from non-volatile data storage 120) for execution as required during operation. Further, although the functional blocks in memory 124 are shown to be physically coupled to one another, those skilled in the art will understand that they are actually processes that communicate by calling one another of execution.

As shown in FIG. 2, memory 124 includes an operating system 132, one or more application programs 134, a database 136, a database application program interface (API) 138, and files 140. Operating system 132 is a low level program upon which the other programs run. In other words, operating system 132 provides an interface between higher level programs and the hardware of server 102. Application programs 916 are representative of word processing programs, graphics programs, accounting programs, and the like, which can be used in conjunction with or in addition to the programs of the present invention.

Database 136 stores data related to the status of construction projects. A particular embodiment of the present invention was constructed using MICROSOFT® SQL Server to assemble and maintain database 136. The particular structure and contents of database 136 will be described in greater detail below.

Database API 138 includes a set of commands that facilitate the reading and writing of data to and from database 136 by the client components of system 100. Files 140 include, but are not limited to, word processing documents, drawing files, scanned images, and accounting files. Particular files stored in files 140 can be associated with respective construction projects via database 136 by associating a link to the file with an identifier corresponding to the respective construction project, and writing a record including the identifier and the link to database 136. For example, a record stored in database 136 can associate an identifier corresponding to a valve in a plumbing system with a link to an image file showing the valve in files 140.

Figure 3:
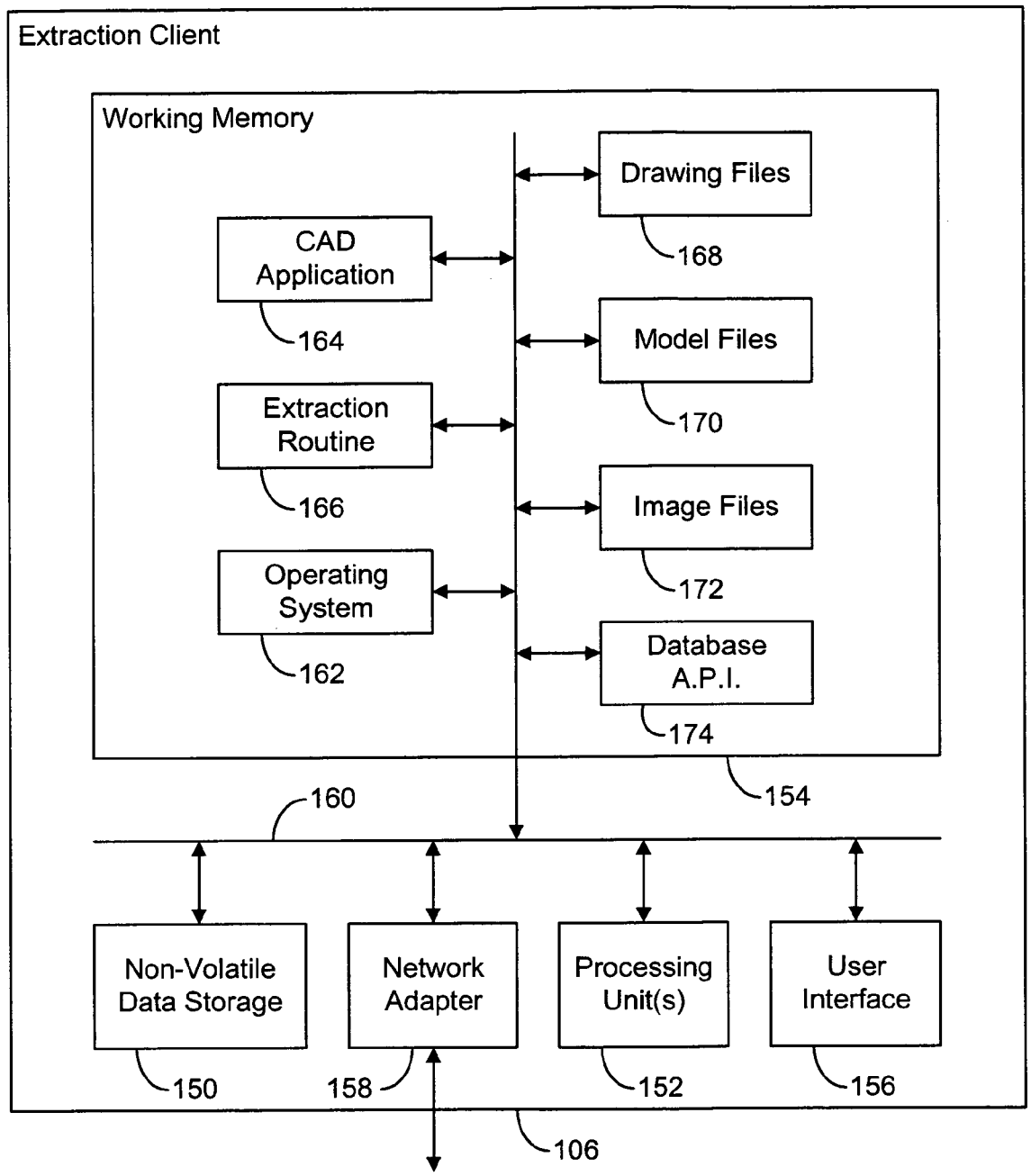
FIG. 3 is a block diagram showing an extraction client of the system of FIG. 1 in greater detail.

FIG. 3 is a block diagram showing extraction client 106 in greater detail to include non-volatile data storage 150, one or more processing units 152, working memory 154 (e.g., random access memory), a user interface 156, and a network adapter 158, all intercommunicating via an internal bus 160. Non-volatile data storage 150 stores data and code that is retained even when extraction client 106 is powered down. Processing unit(s) 152 impart functionality to extraction client 106 by processing the executable code stored in non-volatile data storage 150 and memory 154. Working memory 154 provides temporary storage for data and code being processed by processing units(s) 152. User interface 156 provides a means for a user to interact with extraction client 106, and typically includes such devices as a keyboard, a monitor, a printer, a pointing device, and the like. Network adapter 158 facilitates communication with primary server 102, or other components of system 100, via internetwork 112 (FIG. 1).

As shown in FIG. 3, memory 154 includes an operating system 162, a CAD application program 164, an extraction routine 166, one or more drawing files 168, one or more model files 170, one or more image files 172, and a database application program interface (API) 174. CAD application 164 is a program for creating drawing files 168 corresponding to particular construction projects. For example, a designer could use CAD application 164, via user interface 156, to generate of a drawing file 168 of a warehouse to be constructed. A particular drawing file can include graphical representations of some or all of the systems (e.g., electrical, plumbing, HVAC, structural, etc.) of the warehouse. Typically, drawing files 168 also include objects corresponding to specific components (e.g., a valve, a duct section, a structural beam, etc.) of the construction project that include additional data (e.g., size, material, manufacturer, etc.) associated with that component. A particular embodiment of the present invention was assembled using AUTOCAD® by Autodesk as the CAD application.

Extraction routine 166 is operative to extract information from drawing files 168, and to use the extracted information to generate associated model files 170, to generate image files 172, and to write information to database 136 via database API 174. Model files 170 are files that can be displayed with a viewer (e.g., NAVIS WORKS®) as a three-dimensional image of the construction project. Image files are two-dimensional images, of any convenient format, which depict selected portions of the construction project. An object in a model file 170 or an image file 172 corresponds to one or more objects in an associated drawing file 168 from which it is extracted, and therefore also corresponds to components of the particular construction project represented by the drawing file 168.

In a particular implementation of the present invention, extraction routine is provided as a NAVIS® file export plug-in application for AUTOCAD® that has been modified to provide the functionality described herein. It should be understood, however, that extraction routine 166 can be integrated within the code of CAD application 164, or can be a stand alone application.

Using extraction routine 166, a user groups the objects of a drawing file into "ISOs". As used herein, an ISO is generally interpreted to be a definition of a sub-portion of an entire construction project. The ISO definitions can include as many or as few of the components of the project as is convenient or practical for a particular project. For example, if the construction project is a warehouse, an ISO can be defined that includes an overhead door and all of the mounting hardware for the door. Virtually any useful criteria can be used to break a project down into ISOs. One example is to define each ISO to include objects that can be assembled and shipped to a construction site as a unit.

From the foregoing description of ISOs, it should be clear that each ISO can be understood to define a "component" of a construction project. Typically, a component defined by an ISO will include several smaller components which will correspond to objects (e.g., pipe fittings, vents, etc.) in a drawing file. However, it is not essential that an ISO include several objects. Indeed, it is even possible for an ISO to define a part of a construction project (e.g., a process) that does not correspond to a physical component of the construction project.

When extraction routine 166 generates a model file 170, the extraction routine 166 also writes data (e.g., an initial construction state) to database 136, using the assigned ISO numbers as identifiers to associate the stored data with the particular components of the construction project. The components represented in the model file are also associated with the respective ISO numbers, such that a viewer application can later retrieve updated data from database 136, and display each ISO of the model file based on the updated data, as will be described in greater detail below.

Extraction routine 166 also uses the ISO numbers as identifiers when generating image files 172. In particular, image files 172 are stored in files 140 of server 102, and links to those files are written to database 136, using the respective ISO numbers as associated identifiers. Typically, image files 172 will include particular views of an ISO from CAD application 164. However, extraction routine 166 may generate image files 172 via other means, including but not limited to scanning in hand drawn pictures or photos associated with an ISO.

Image files 172 can be used for any purpose, but are primarily intended to convey visual information regarding an ISO to users without the capability of viewing memory intensive model files. For example, it is convenient for a foreman on a construction sight to be able to view graphical representations of ISOs to, for example, correctly identify ISOs for data entry purposes. However, it is impractical to provide full model viewing capabilities on remote devices 114.

Figure 4:
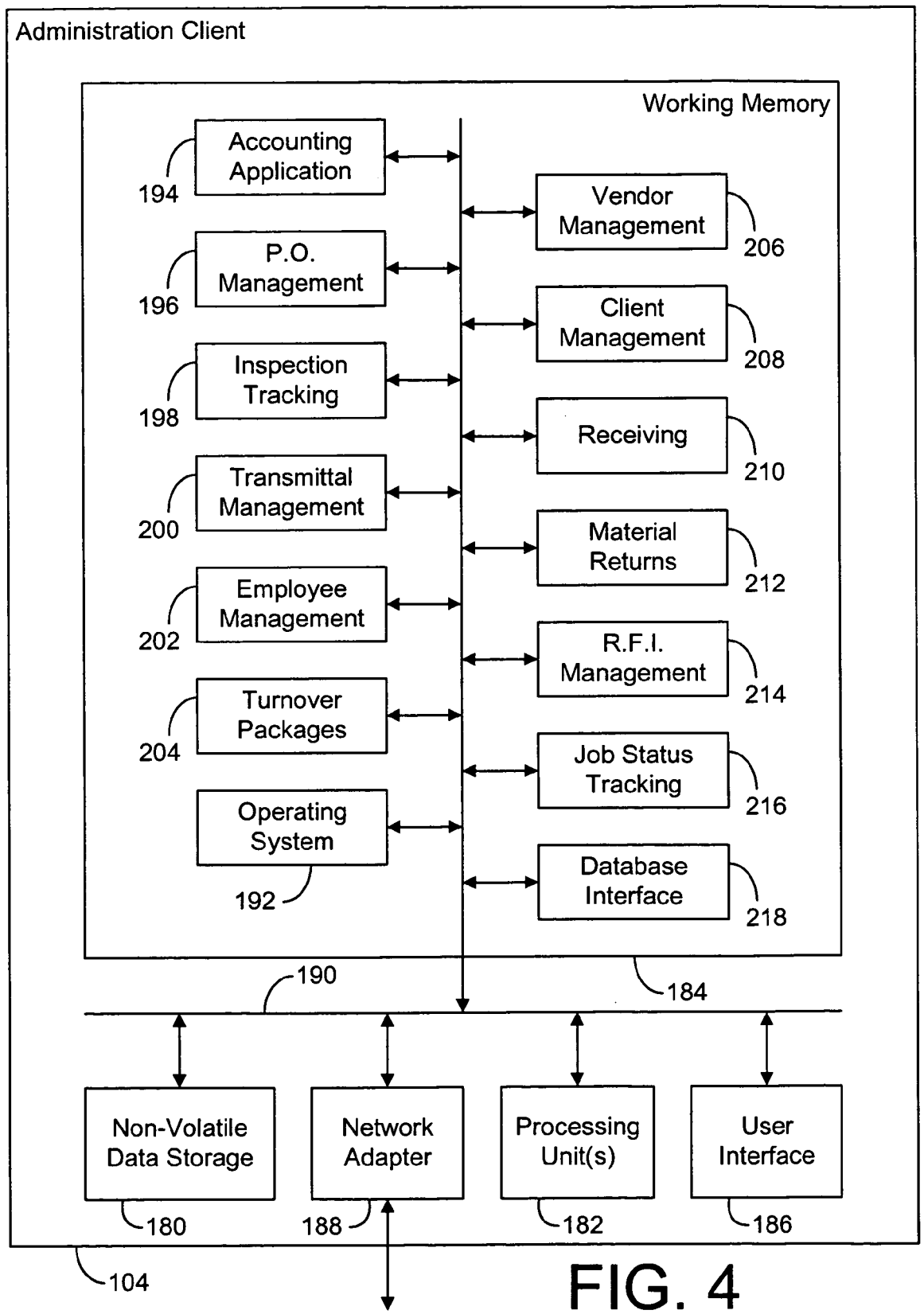
FIG. 4 is a block diagram showing an administration client of the system of FIG. 1 in greater detail.

FIG. 4 is a block diagram showing administration client 104 in greater detail to include non-volatile data storage 180, one or more processing units 182, working memory 184 (e.g., random access memory), a user interface 186, and a network adapter 188, all intercommunicating via an internal bus 190. Non-volatile data storage 180 stores data and code that is retained even when administration client 104 is powered down. Processing unit(s) 182 impart functionality to administration client 106 by processing the executable code stored in non-volatile data storage 180 and memory 184. Working memory 184 provides temporary storage for data and code being processed by processing units(s) 182. User interface 186 provides a means for a user to interact with administration client 104, and typically includes such devices as a keyboard, a monitor, a printer, a pointing device, and the like. Network adapter 188 facilitates communication with primary server 102, or other components of system 100, via internetwork 112 (FIG. 1).

As shown in FIG. 4, memory 184 includes an operating system 192, an accounting application 194, a purchase order management routine 196, an inspection tracking routine 198, a transmittal management routine 200, an employee management routine 202, a turnover packages routine 204, a vendor management routine 206, a client management routine 208, a receiving routine 210, a materials returns routine 212, a request for information (RFI) routine 214, a job status tracking routine 216, and a database interface 218. Accounting application 194 facilitates general accounting procedures such as accounts payable, accounts receivable, etc., but has the added capability of querying database 136, via database interfaces 218 and 138, such that client billing procedures can be based on job specific data such as percentage completion, and can provide job status reports that can be provided to clients to verify billing milestones. Further, accounting application 194 can track expenses, including but not limited to material costs, labor costs, etc., on a job-by-job, or even an ISO-by-ISO basis. Purchase order management routine 196 facilitates the issuance and tracking of purchase orders for required materials and supplies. Inspection tracking routine 198 tracks and records all required project inspections. Transmittal management routine 200 tracks and records transmittals to clients (e.g., drawings, specifications, inspection reports, etc. that are sent to clients). Employee management routine 202 facilitates the entry of employee data into database 136 and the generation of reports including work performed by employees on particular jobs. Turnover packages routine 204 generates detailed reports, on any desired aspect of a job, which are provided to clients during or upon completion of the job. Vendor management routine 206 facilitates the storage and retrieval of vendor information for vendors providing materials for a particular job. Client management routine 208 facilitates the storage and retrieval of information relating to the client (customer) for a particular job. Receiving routine 210 tracks the receipt of materials and supplies ordered for a particular job. Material returns routine 212 tracks the return of materials and supplies to vendors. RFI management routine 214 facilitates and tracks the generation of RFIs, transmittal of the RFIs to the clients, and receipt of the client's response. Job status tracking routine 216 facilitates entry and retrieval of information relating to the status of a job.

Each of the above-described routines has access to database 136, via database interface 218 and database API 138. Therefore, the various routines can provide near real-time information regarding any particular construction project that a company has undertaken. Further, the detail of the reporting is unprecedented in the prior art. For example, upon completion of a job, turnover packages can automatically generate a detailed report to be provided to the client. The report can include every detail of the project including, for example, the manufacturer of every component used, the date and a copy of every required inspection, a copy of every required certification, and so on. Further, reports detailing the user's (construction company's) costs can be instantly generated to an unprecedented level of detail, including, for example, which employees worked on each ISO, and for how long. The foregoing description of the functionality of the various administrative modules is general in nature. The full capability of the present invention will be apparent, however, in view of the detailed description of database 136 which follows with reference to FIGS. 11-58.

Figure 5:
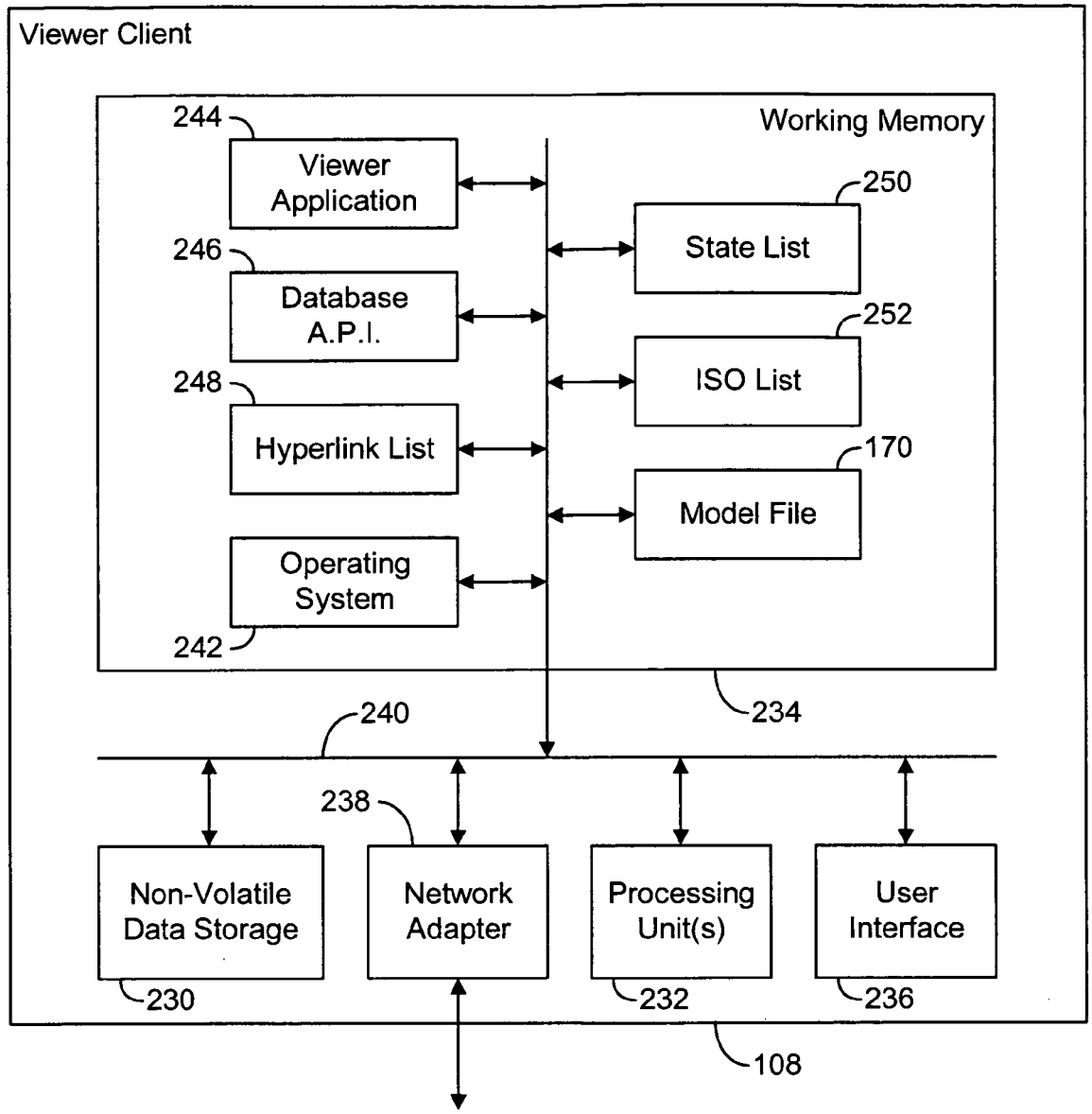
FIG. 5 is a block diagram showing a viewer client of the system of FIG. 1 in greater detail.

FIG. 5 is a block diagram showing viewer client 108 in greater detail to include non-volatile data storage 230, one or more processing units 232, working memory 234 (e.g., random access memory), a user interface 236, and a network adapter 238, all intercommunicating via an internal bus 240. Non-volatile data storage 230 stores data and code that is retained even when viewer client 108 is powered down. Processing unit(s) 232 impart functionality to viewer client 108 by processing the executable code stored in non-volatile data storage 230 and memory 234. Working memory 234 provides temporary storage for data and code being processed by processing units(s) 232. User interface 236 provides a means for a user to interact with viewer client 108, and typically includes such devices as a keyboard, a monitor, a printer, a pointing device, and the like. Network adapter 238 facilitates communication with primary server 102, or other components of system 100, via internetwork 112 (FIG. 1).

As shown in FIG. 5, memory 234 includes an operating system 242, a viewer application 244, a database API 246, a hyperlink list 248, a state list 250, and ISO list 252, and at least one model file 170. The primary purpose of viewer application 244 is to display model files 170 generated by extraction routine 166 (FIG. 1) in such a way that the displayed model file provides information to the user regarding the status of the job. Responsive to receiving input (e.g., a job identifier, model file selection, etc.) from a user via user interface 236, viewer application 244 retrieves an associated model file 170 from files 140. Next, viewer application 244 queries database 136, via database APIs 246 and 138, to retrieve a current construction state (e.g., in transit, installed, being inspected, etc.) associated with each ISO in model file 170. Then, viewer application displays the model file based on the retrieved states, such that the graphical representation of each ISO in the model file is indicative of the construction state of the component represented thereby. For example, a different display color can be associated with each particular construction state. Optionally, viewer application 244 can store and retrieve a list of display properties (e.g., line color, line type, etc.) to be associated with particular construction states.

Viewer application 244 can also display model file 170 in other useful ways, such as displaying only those ISOs that have a particular construction state. To do so, viewer application 244 queries database 136 for a state list 250 of all available states associated with the job represented by model file 170. Then, responsive to the user selecting one of the available states from state list 250, viewer application 244 queries database 136 to determine which of the ISOs are currently associated with the selected state. Then, viewer application 244 displays only those ISOs associated with the selected state.

Viewer application 244 can also display hyperlinks (and the linked files) associated with objects in model file 170. Responsive to a predetermined user input, viewer application 244 queries database 136 for a hyperlink list 248 of hyperlinks associated with the job represented by model file 170. Then, responsive to the user's selection of an object in model file 170, viewer application 244 presents the hyperlinks from hyperlink list 248 corresponding to the selected object. The user is then able to select a hyperlink from those presented to edit the hyperlink or to retrieve the linked file. Viewer application 244 can also receive new hyperlinks from a user, and write records to database 136 associating the new hyperlinks with ISOs of the job.

Viewer application can also be used to update the construction states of components of the job. Responsive to a predetermined user input, viewer application 244 queries database 136 for state list 250, which includes all of the available states for the particular job associated with model file 170, and for ISO list 252, which includes a list of all ISOs associated with the job. Then, responsive to the user's selection of a particular ISO from ISO list 252 (or the user's selection of the corresponding graphical object), viewer application 244 presents state list 250 to the user for the user's selection of a new state to be associated with the selected ISO. Upon the user's selection of a state from state list 250, viewer application writes a record to database 136 associating the selected ISO with the selected new state.

It should be noted that the above-described update functions of viewer application 244 can optionally be performed by job status tracking routine 216 (FIG. 4).

Figure 6:
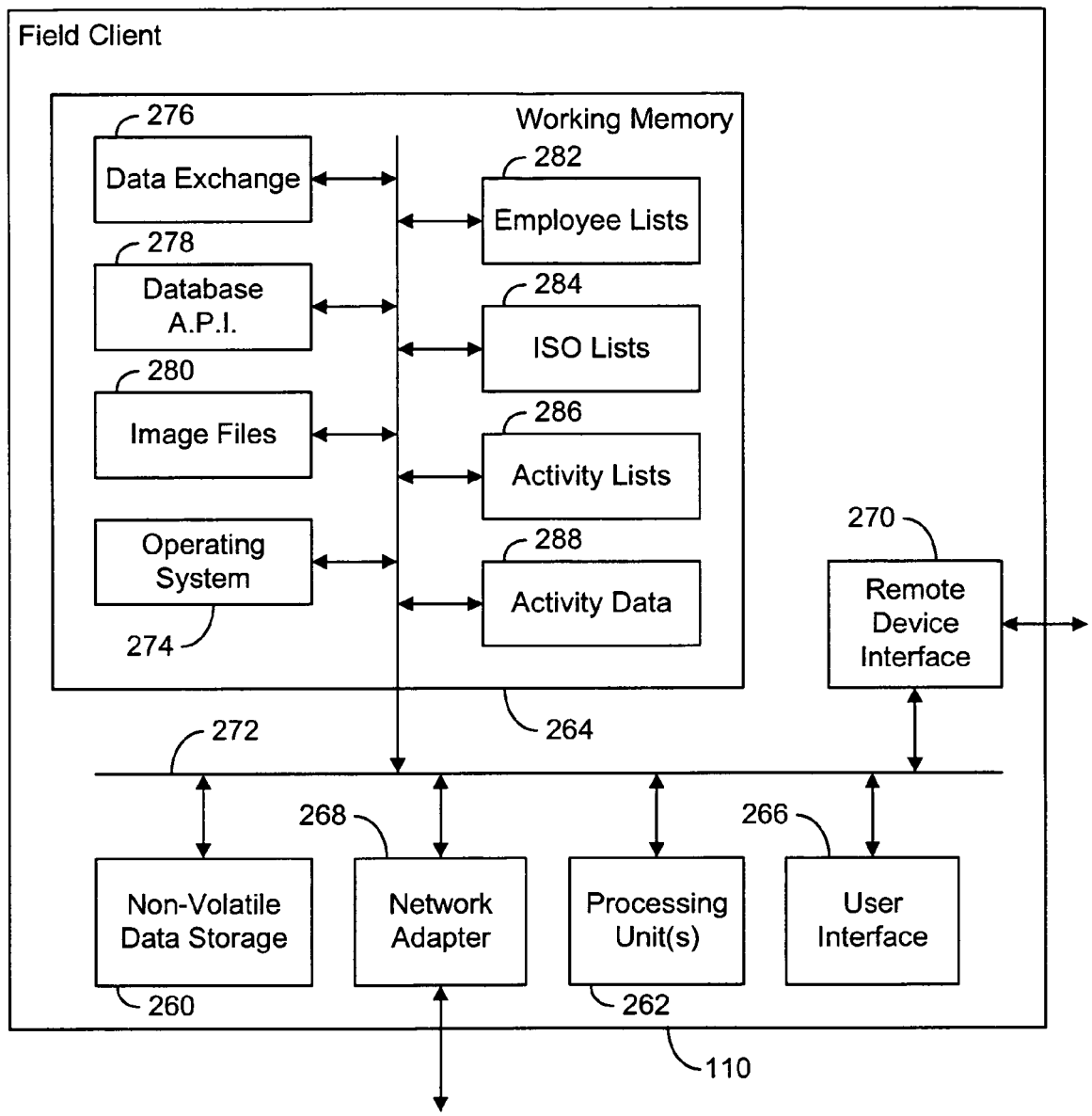
FIG. 6 is a block diagram showing a field client of the system of FIG. 1 in greater detail.

FIG. 6 is a block diagram showing field client 110 in greater detail to include non-volatile data storage 260, one or more processing units 262, working memory 264 (e.g., random access memory), a user interface 266, a network adapter 268, and a remote device interface 270, all intercommunicating via an internal bus 272. Non-volatile data storage 260 stores data and code that is retained even when field client 110 is powered down. Processing unit(s) 262 impart functionality to field client 110 by processing the executable code stored in non-volatile data storage 260 and memory 264. Working memory 264 provides temporary storage for data and code being processed by processing units(s) 262. User interface 266 provides a means for a user to interact with field client 110, and typically includes such devices as a keyboard, a monitor, a printer, a pointing device, and the like. Network adapter 268 facilitates communication with primary server 102, or other components of system 100, via internetwork 112 (FIG. 1). Remote interface device 270 provides a means for transferring data between remote devices 114 and field client 110, and can include a device cradle, an infrared link, a wireless network connection, or any other suitable data transfer means.

As shown in FIG. 6, memory 264 includes an operating system 274, a data exchange routine 276, a database API 278, image files 280, employee list 282, ISO lists 284, activity lists 286, and activity data 288. Data exchange routine 276 is operative to retrieve image files 280 from files 140 (FIG. 1), and to query database 136, via database APIs 278 and 138, for employee lists 282, ISO lists 284, and activity lists 286 associated with jobs for a particular site. Although employee lists 282, ISO lists 284, and activity lists 286 may each include several list associated with different jobs and/or sites, it is anticipated that the number of list will be confined to a single site, if not a single job within a site, such that each list may be only a single list.

Data exchange routine 276 provides image files 280, employee lists 282, ISO lists 284, and activity lists 286 to remote devices 114, via interface 270, to facilitate the entry of data into remote devices 114, as will be described below with reference to FIG. 7. Data exchange routine 276 is further operative to receive activity data 288 from remote devices 114, and to transfer the received activity data 288 to database 136. Activity data 288 generally relates to work performed on a job, and includes without limitation an ISO identifier indicative of the component upon which the work was performed, an employee identifier indicative of the worker who performed the work, a date value indicative of the date the work was performed, a time value indicative of the time duration of the work performed, an activity identifier indicative of the type of work that was performed on the component, and a state indicator indicative of any changed construction state of the component.

Figure 7:
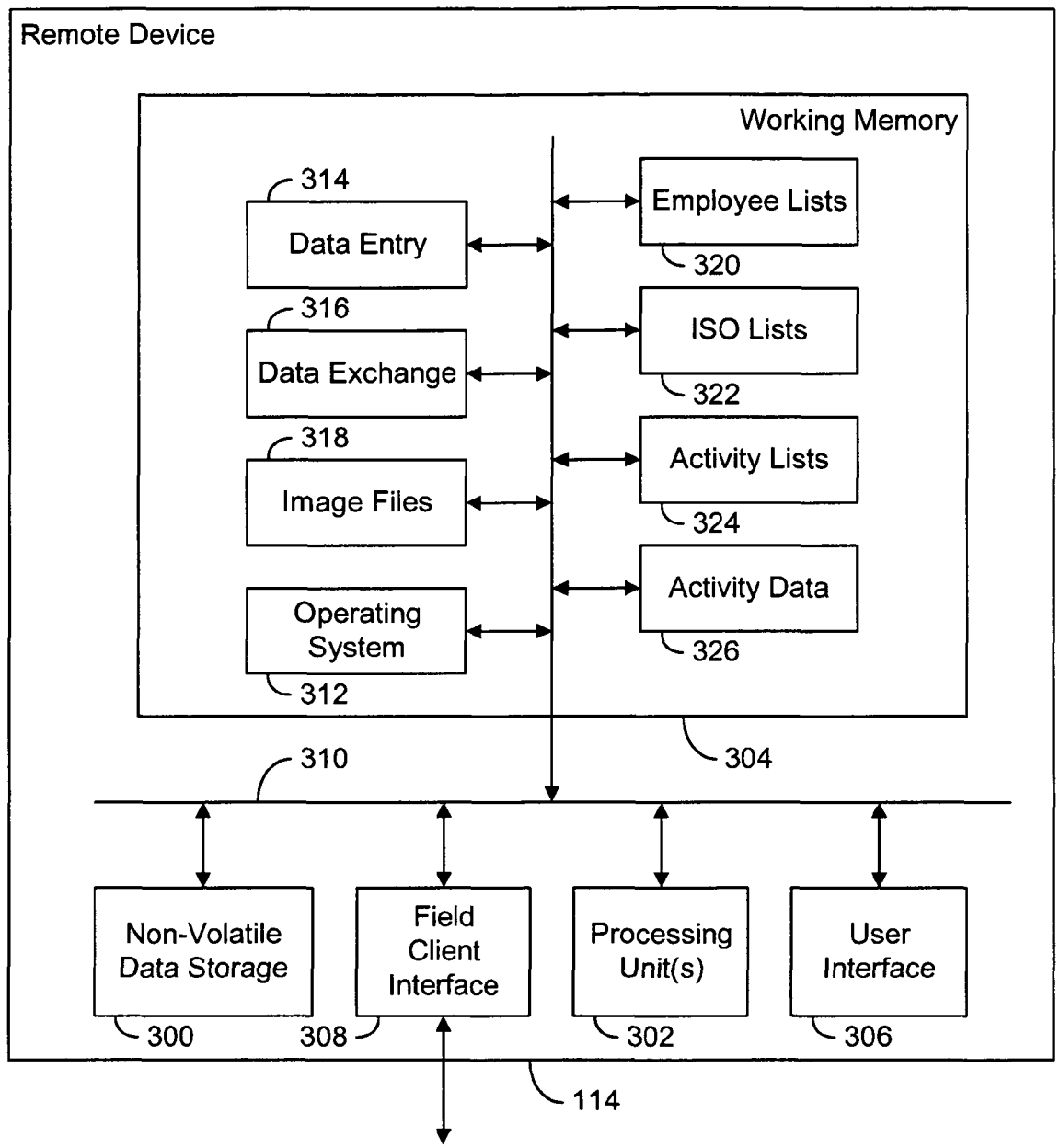
FIG. 7 is a block diagram showing a remote device of the system of FIG. 1 in greater detail.

FIG. 7 is a block diagram showing remote device 114 in greater detail to include non-volatile data storage 300, one or more processing units 302, working memory 304 (e.g., random access memory), a user interface 306, and a field client interface device 308, all intercommunicating via an internal bus 310. Non-volatile data storage 300 stores data and code that is retained even when remote device 114 is powered down. Processing unit(s) 302 impart functionality to remote device 114 by processing the executable code stored in non-volatile data storage 300 and memory 304. Working memory 304 provides temporary storage for data and code being processed by processing units(s) 302. User interface 306 provides a means for a user to interact with remote device 114. In embodiments where remote device 114 is a hand-held device, user interface 306 will likely include a touch screen display and a stylus, although other types of interface devices are certainly possible. Field client interface device 308 is complementary to remote device interface 270, and provides a means for transferring data between remote device 114 and field client 110. Therefore, field client interface device can also include a device cradle, an infrared link, or any other suitable data transfer means.

As shown in FIG. 7, memory 304 includes an operating system 312, a data entry routine 314, a data exchange routine 316, image files 318, employee lists 320, ISO lists 322, activity lists 324, and activity data 326. Data entry routine 314 facilitates the entry of activity data 326, via user interface 306, by a user. Data exchange routine 316 is similar to data exchange routine 276 of field client 110, and is operative to transfer data between remote device 114 and field client 110 in either direction.

Remote device 114 facilitates the collection of activity data 326 as follows. Initially, data exchange routine 316 receives image files 318, employee lists 320, ISO lists 322, and activity lists 324 from field client 110, via field client interface 308. Image files 318 are similar to image files 280 stored in field client 110, except that image files 318 need not include all of image files 280. Rather, it is anticipated that it will only be necessary to transfer a subset of image files 280 associated with one or more particular jobs to image files 318. However, this is not a limitation of the invention, and all of image files 280 can be transferred to image files 318 if needed. Similarly, employee lists 320, ISO lists 322, and activity lists 324 will include some or all of the list stored in employee lists 282, ISO lists 284, and activity lists 286.

Once employee lists 320, ISO lists 322, and activity lists 324 are transferred into remote device 114, data entry routine 314 uses the list to facilitate the entry of activity data 326 by a user. Data entry routine 314 presents the lists to the user via interface 306 (e.g., in a form with drop-down lists) so that the user can select an employee, an ISO identifier, and an activity type (e.g., welding, electrical installation, pipe fitting, etc.). Data entry routine 314 also facilitates the entry of a time value (indicative of the time worked) and a date value, and then writes the completed record to activity data 326. Data entry 314 also has the capability to display image files 318, which will be useful to the user in identifying and/or selecting the appropriate ISO numbers for data entries.

It is anticipated that a foreman or supervisor on the job site will continue to enter data in this manner as work is performed on components of the job for which he/she is responsible. Data entry routine 314 will accumulate the records in activity data 326 until such time as data exchange routine 316 is invoked to transfer activity data 326 to activity data 288 of field client 110, via field client interface 308. Although there is no requirement as to how often activity data 326 must be transferred, so long as memory 304 has sufficient capacity to store activity data 326, it is expected that it will be convenient to effect the data transfer at the end of each work day. Then, as soon as field client 110 writes activity data 288 to database 136, the entire enterprise will have the most current information possible regarding the status of the project.

It should be understood that list and data other than those specifically shown in FIG. 7 can be employed in remote device to facilitate any useful data entry. For example, a list of state indicators corresponding to predefined construction states can be presented to the user to facilitate the entry of records to update the current construction state of a component. Further, certain entries, for example the state change entry just described, will not necessarily require a value from each of the lists shown in FIG. 7. Thus, it should be clear that the particular types of data shown are not essential elements of the invention, and should not be construed as limitations.

Figure 8A:
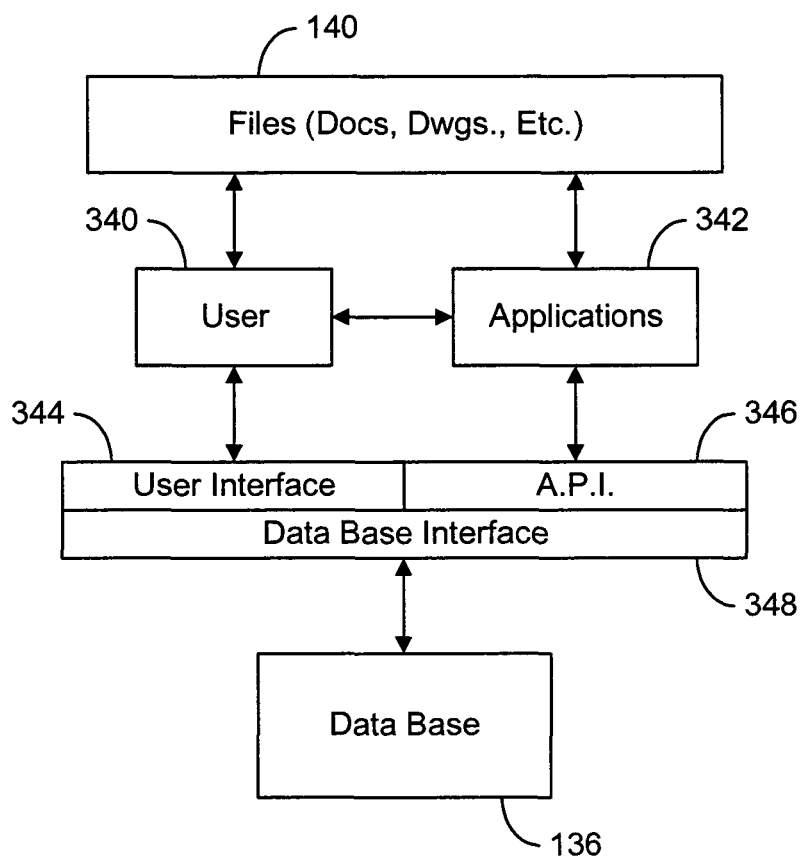
FIG. 8A is a block diagram illustrating a data interface according to one particular embodiment of the present invention.

FIG. 8A is a block diagram illustrating the flow of data according to one embodiment of the present invention. A users 340 can store and/or files in files 140 either directly (e.g., via administration client 104) or through one or more applications 342 (e.g., via extraction client 106 or viewer client 108). Similarly, user 340 can enter data into database 136 either directly or through an application. A user interface 344 is provided to facilitate direct data entry and retrieval by user 340, and an application program interface (API) 346 is provided to facilitate data entry and retrieval by application programs. Both user interface 344 and API 348 exchange data with database 136 via an underlying database interface 348.

User interface 344 includes any means whereby a user can enter data directly into or retrieve data from database 136. For example, typical database programs allow a user to enter data directly into the database tables, and also facilitate the creation of forms to facilitate the direct entry of data into the database. Further, these database programs facilitate the creation of reports to view the data in many useful ways. Accordingly, user interface 344 is understood to include without limitation such data entry forms and tables, and such reports. Of course, the particular content of the tables and forms, which will be described in greater detail with reference to FIGS. 11-58 and FIGS. 66-87, is considered to be an innovative aspect of the present invention.

The primary function of API 346 is to facilitate data entry and retrieval by extraction clients 106 and viewer clients 108. However, it should be understood that API 346 can also provide access to database 136 for applications other than those disclosed herein, and so is considered to be an innovative aspect of the present invention, which is not limited by the particular type application program using API 346. API 346 includes the following transactions.

AddISO

This transaction is used to add ISOs to database 136. The properties set in the request object are a model filename (with full directory path) and ISONumber. The ISO will be added to database 136 for the site and job indicated in the drawing file path, only if the ISO number does not already exist for that site and job.

AddISOHrs

This transaction is used to send timesheet information to database 136. Hours are stored in database 136 at the level of site number+job number+ISO+employee number+activity code+date. The properties set in the request object are the model filename (with full directory), ISO, employee number, activity code, date, regular hours, and overtime hours. The site+job+ISO must already exist in database 136 for this transaction to succeed. In addition, the employee number and activity code must exist in database 136. The ISO would have been placed there by extraction client 106, via the AddISO or AddDrawingObject transaction. The site, job, employee number and activity code are input via user interface 344. Note that the filename itself is not used by this transaction, only the site and job which are in the filename's directory. If there are already hours in database 136 for the key (site+job+ISO+employee number+activity code+date), then the hours sent will simply overwrite the previous hour value, and no error is returned.

DeleteISOHrs

This transaction is used by field clients 110 to delete all database 136 timesheet entries for a site+job, or a site+job+ISO, or a site+job+ISO+date, or a site+job+ISO+date+employee number. Which level of deletion is done depends on an enumerated type property DeleteType set in the request by the caller. This transaction can be used by field client 110 or remote device 114, for example, to "reset" the activity data entries in preparation for another send (another AddISOHrs), or if the wrong data was mistakenly sent.

The requestor sets the property DeleteType to indicate the level of deletion. The DeleteType settings (and associated properties to set) are as follows: bysitejob (drawingfile); bysitejobISO (drawingfile+ISONumber); bysitejobISODate (drawingfile+ISONumber+date); and bysitejobISODatePerson (drawingfile+ISONumber+date+employee number).

SetISOState

This transaction is used by remote device 114 or field client 110 to set a construction state for a site+job+ISO, as of a begin date and time. The begin date/time is intended to be when the ISO first entered that state. An ISO whose state has never been set is in the state 0 (undefined). If the site+job+ISO is not already in database 136, this transaction will fail. The properties set by the caller are filename, ISO, state, and AsofDate (which contains both a date and a time). Only the directory portion of the filename is used, to determine the site and job. The filename itself is not used by this transaction.

QueryISOState

This transaction is used by viewer client 108 to retrieve ISOs' state information from database 136. It will return an ISO(s) state as of the requested date and time. The request can be made for a single ISO, or all ISOs for a site+job, or all ISOs for a model drawing file. The requestor always sets the property AsOfDate (which contains both a date and a time) to the date and time for which the state information is requested. (i.e., query for an ISO state as of a date+time).

The requestor sets the property SelectionType to one of: bysitejob (to retrieve all ISOs for a site+job, i.e., all model drawing files within a directory); bydrawingfile (to retrieve all ISOs for a model drawing file); or bydrawingfileISO (to retrieve one specific ISO from a site+job). The properties the requestor sets to determine the selection set correspond to the SelectionType setting. The SelectionType settings (with the associated properties to set) are as follows: bysitejob (drawingfile); bydrawingfile (drawingfile); and bydrawingfileISO (drawingfile+ISONumber).

QueryISOHours

This transaction is used by viewer client 108 to retrieve an ISO's (or ISOs') total regular hours, total overtime hours and estimated hours from database 136. It will return the regular and overtime hours for an ISO(s) as of the requested date, along with the current estimated hours. The request can be made for a single ISO, or all ISOs in a model file, or all ISOs for a site+job. (i.e., all ISOs for all model files in a directory). The requestor sets the property AsOfDate to the date for which the hourly total is desired.

The requestor must also set the property SelectionType to one of: bysitejob (to retrieve ALL ISOs for a site+job); bydrawingfile (to retrieve ALL ISOs for a drawing file); or bydrawingfileISO (to retrieve one specific ISO from a drawing file). The properties the requestor sets to determine the selection set correspond to the SelectionType desired. The SelectionType settings (with the associated properties to set) are as follows: bysitejob (drawingfile); bydrawingfile (drawingfile); and bydrawingfileISO (drawingfile+ISONumber).

AddDrawingObject

This transaction will be used by extraction client 106 or viewer client 108 to add a single model file object, and its attachment files (e.g., hyperlinks), to database 136. Drawing file objects are keyed by site+job+drawing file+ObjectID. The calling program must ensure the object does not exist before it is added. The DeleteDrawingObject transaction can be used to do this.

This transaction will cause the ISO to be added, if it doesn't already exist, to an ISO master table of database 136, allowing other applications to do AddISOHrs and SetISOState transactions. Note that the same ISO cannot exist twice (i.e., in 2 model drawing files) for the same site+job. If the caller attempts to add the same ISO within a single site and job, for two different drawing files, the transaction will fail.

The properties which the requestor sets are: drawingFilename; ISONumber; ObjectID; and Attachment File (a collection of objects, one for each hyperlink defined for this drawingfile+objectID).

DeleteDrawingObjects

This transaction is used by viewer client 108 to delete all objects for a model drawing file from the database 136, or to delete one drawingfile+object from the database 136. The requestor sets the enumerated property deletetype to indicate which level of deletion is being done. As noted above, drawing objects must be explicitly deleted before they can be re-added. The most efficient way to delete all drawing objects from a file is to use this transaction, with deletetype set to bydrawingfile, rather than individually delete each drawing object with separate transactions. The requestor sets the property deletetype to indicate the level of deletion. The other properties which must be set correspond to the deletetype setting. The deletetype settings (with the associated properties to set) are as follows: bydrawingfile (drawingfile) and bydrawingfileobject (drawingfile+objectID).

DeleteDrawingObjectLink

This transaction will be used by viewer client 108 to delete just one attachment (link file) from a drawing object. The properties which the requestor sets are: drawingFilename; objectID; and LinkFileName (the attachment file name from AddDrawingObject).

QueryDrawingObjects

This transaction is used by viewer client 108 to retrieve data on drawing objects from database 136. Four different types of selection criteria are available. The requestor must set the property SelectionType to indication which is being used. This enumerated type SelectionType can be set to: bydrawingfile (to retrieve ALL objects for the drawing file); bydrawingfileISONumber (to retrieve all objects for an ISONumber); or bydrawingfileObjectID (to retrieve only one objectID). The properties the requestor sets to determine the selection criteria correspond to the SelectionType desired. The SelectionTypes (with associated properties to set) are as follows: bydrawingfile (drawingfile); bydrawingfileISO (drawingfile+ISONumber); and bydrawingfileObjectID (drawingfile+ObjectID).

QueryState

This transaction can be used by view client 108 or field client 110 to retrieve the description and current color setting for one state from database 136. States will be generally be referred to by an integer number within database 136, and in the API transactions described herein. However, for user display purposes, database 136 will also keep string descriptions corresponding to each numeric state. For example, State1 is "Material Ordered", State16 is "System in Startup Mode", etc. Some of these descriptions are editable by the user administrator of database 136. Also, new states of any integer number and description may be added by the user administrator. Each state also has an associated color, which is a 32 bit integer set by the caller with the SetStateColor transaction.

In order to provide the most recent state description and color viewer client 108 or field client 110, this transaction is used to return the current description and color for one requested state number. The requestor sets the property state number, which can be any valid predetermined state number (e.g., 0-16).

QueryStates

This transaction is used by viewer client 108 to retrieve all currently defined states from the database 136, or a single state from database 136. The latter provides the same functionality as QueryState, above. The requestor sets the property QueryStatesType to one of: OneState (to retrieve state information for just one state) or AllStates (to retrieve info on all states defined in database 136. If the requestor sets QueryStatesType to OneState, then the property state must also be set, to valid state number.

SetStateColor

This transaction is used by viewer client 108 to set the color associated with a given state. States will be generally be referred to by an integer number from 0 to 16. Color is also an integer property, of any value. The requestor sets the property statenumber, which in this particular example can be from 0 to 16, and the property color.

QuerySites

This transaction is used by viewer client 108 or field client 110 to retrieve the complete list of sites (e.g., construction locations) from database 136. The caller sets no properties before the call.

QueryJobs

This transaction is used by viewer client 108 or field client 110 to retrieve the complete list of jobs, for a single site, from database 136. The caller sets the property site number before the call.

CheckLogon

This transaction is used by viewer client 108 or field client 110 to see if their applications have been launched within the database 136 environment, and if so, which site the user which launched them is currently logged onto, and which job (within that site) is currently being referenced by that user. The caller sets no properties before executing this function, via its execute method.

Logon

This transaction is used by viewer client 108 or field client 110 to verify that a user has authorization to read and update database 136 for a particular site. The caller sets the properties site number, user, and password before the call, generally input from a user interface on the respective client system.

QueryISOs

This transaction is used by field client 110 to retrieve the complete list of ISOs for a site+job. The requester sets the drawingfile property before the call. Note that the filename itself is not used by this transaction, only the site and job which are in the filename's directory.

QueryEmployees

This transaction is used by field client 110 to retrieve the complete list of employees for a given site. The employee number supplied with the AddISOHours transaction (see above) must be a valid employee number. The requestor sets the drawingfile property before the call. Note that the filename itself is not used by this transaction, only the site which is in the filename's directory.

QueryLaborCodes (Activity Codes)

This transaction is used by field client 110 to retrieve a complete list of labor codes for a given site. The labor code supplied with the AddISOHours transaction must be NULL, or a valid labor code (activity identifier). The requestor sets the drawingfile property before the call. Note that the filename itself is not used by this transaction, only the site which is in the filename's directory.

As indicated above, API 346 can be used by applications other than those specifically mentioned herein. Additionally, other useful transactions can be defined within API 346, depending on the particular functionality of applications (e.g., accounting applications, report generating applications, etc.) used in conjunction with database 136.

Figure 8B:
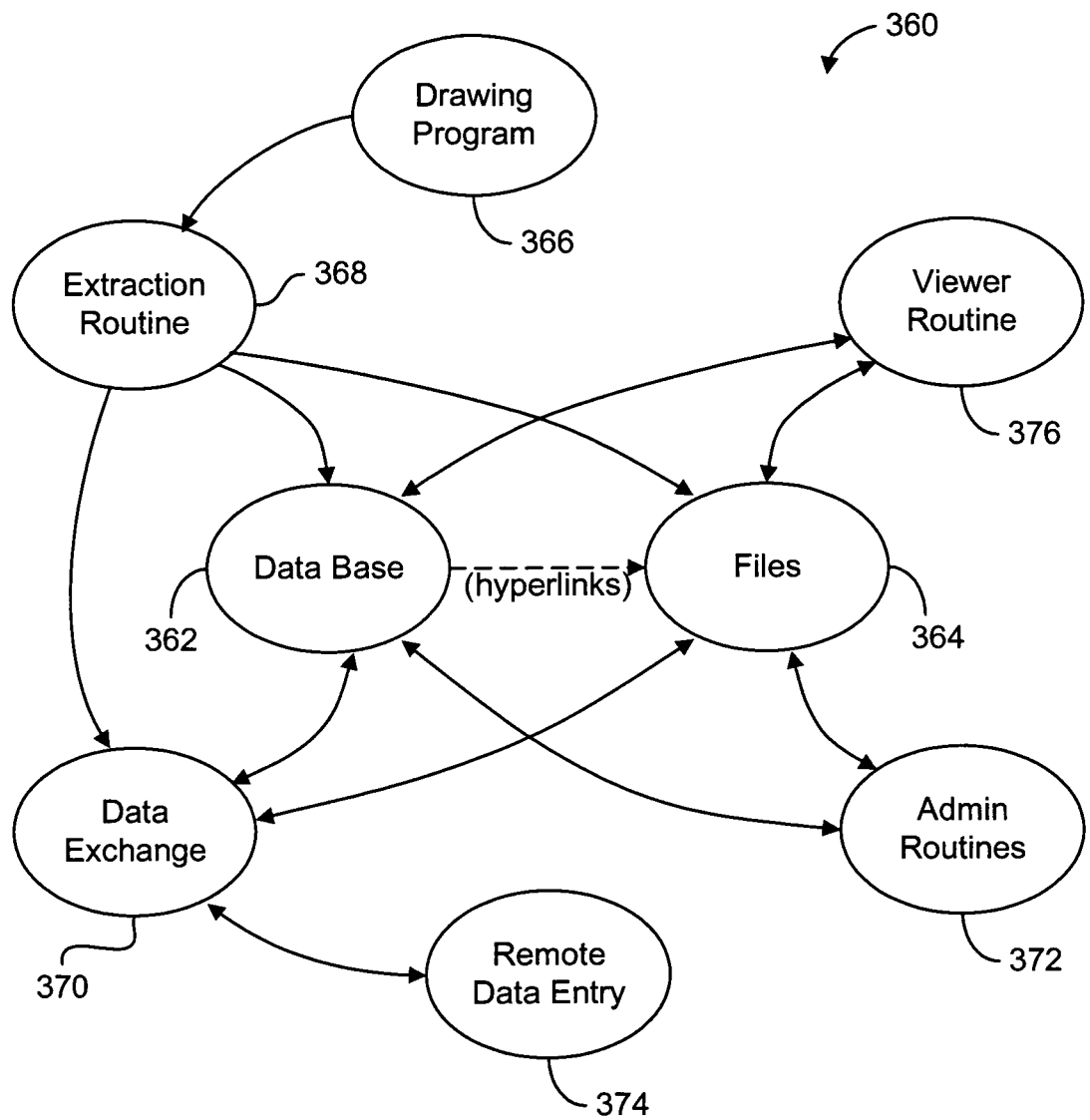
FIG. 8B is a relational diagram showing the relationship between various functions of the system of FIG. 1.

FIG. 8B is a relational diagram 360 illustrating the relationship between various processes according to one embodiment of the present invention. A database 362 and file repository 364 store the data and files used to manage various construction projects. Drawings for the construction projects are generated by a drawing program 366. An extraction routine 368 uses the drawings to define components of the project, to generate drawing and model files for the project, and to generate data related to the construction status of the defined components. Extraction routine 368 writes the model and drawing files to files 364, and writes the initial data to database 362. Hyperlinks and file path conventions relate the data in database 362 to the files in files 364. Optionally, extraction routine 368 can provide files (e.g., drawing files) directly to a data exchange routine 370.

Data in database 362 and files in files 364 are augmented and updated by data exchange process 370 and admin routines 372. Admin routines 372 can access database 362 and files 364 directly in order to add documents (e.g., purchase orders, shipping receipts, new drawings, etc.) to files 364 and data (employee data, activity codes, state codes, etc.) to database 362. Data exchange process 370 updates database 362 with data received from a remote data entry process 374.

Remote data entry process 374 collects data regarding work performed on components of construction projects, changes in the state of such components, and so on. The collected data is then transferred to data exchange process 370, which in turn transfers the data to database 362. Data exchange process 370 also facilitates the collection of data by remote data entry process 374, by retrieving lists (e.g., employee lists, activity codes, component identifiers, etc.) from database 362, and providing those lists to remote data entry process 374. Remote data entry process 374 then uses those lists to facilitate data entry. A viewer routine 376 retrieves model files from files 364, retrieves the updated data associated with the job that the model file represents from database 362, and then displays the model file based on the retrieved data.

Figure 9:
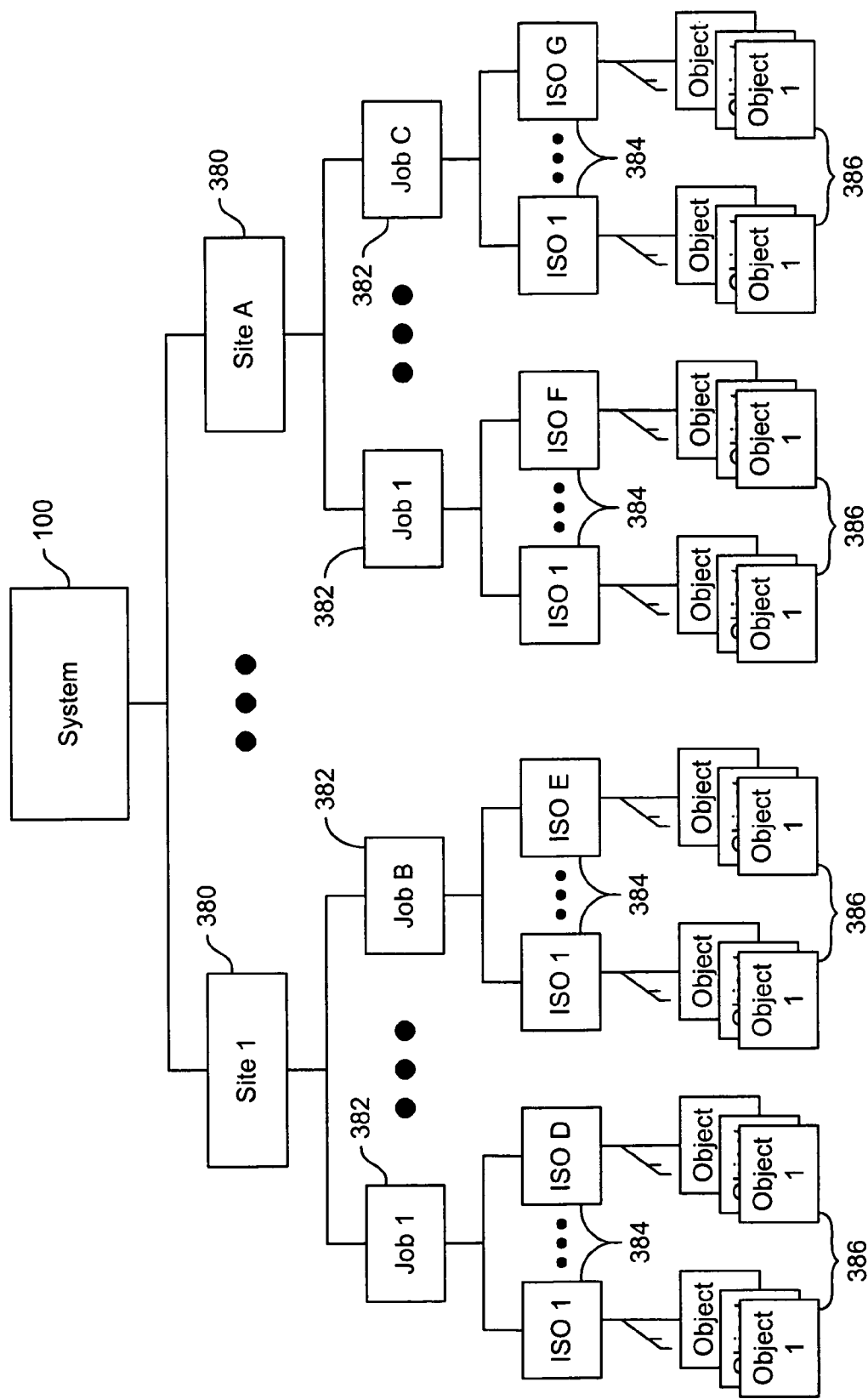
FIG. 9 is a diagram showing one organization of data used within system of FIG. 1.

FIG. 9 is a block diagram illustrating the hierarchical organization of physical models of the construction projects and, therefore, also of data within system 100. At the first level below the system level the data and files are associated with one of a plurality of sites 380. Generally, each site 380 corresponds to a particular construction site for a particular client, although the association of a site 380 with one particular physical location is not a requirement. Each site 380 includes one or more jobs 382. Jobs 382 are typically defined to include, for example, the plumbing system, the heating system, the electrical system, and so on. However, it should be understood, that any useful definition can be used. Each job 382 includes one or more ISOs, which generally represent components of the particular job 384. For example, an ISO 384 might be defined to include a boiler and an attached valve manifold. Again, any useful definition is acceptable. Finally, each ISO 384 can include one or more objects 386. An example of an object 386 might be a single valve of the valve manifold of the previous example. Again, any useful definition is acceptable.

Figure 10:
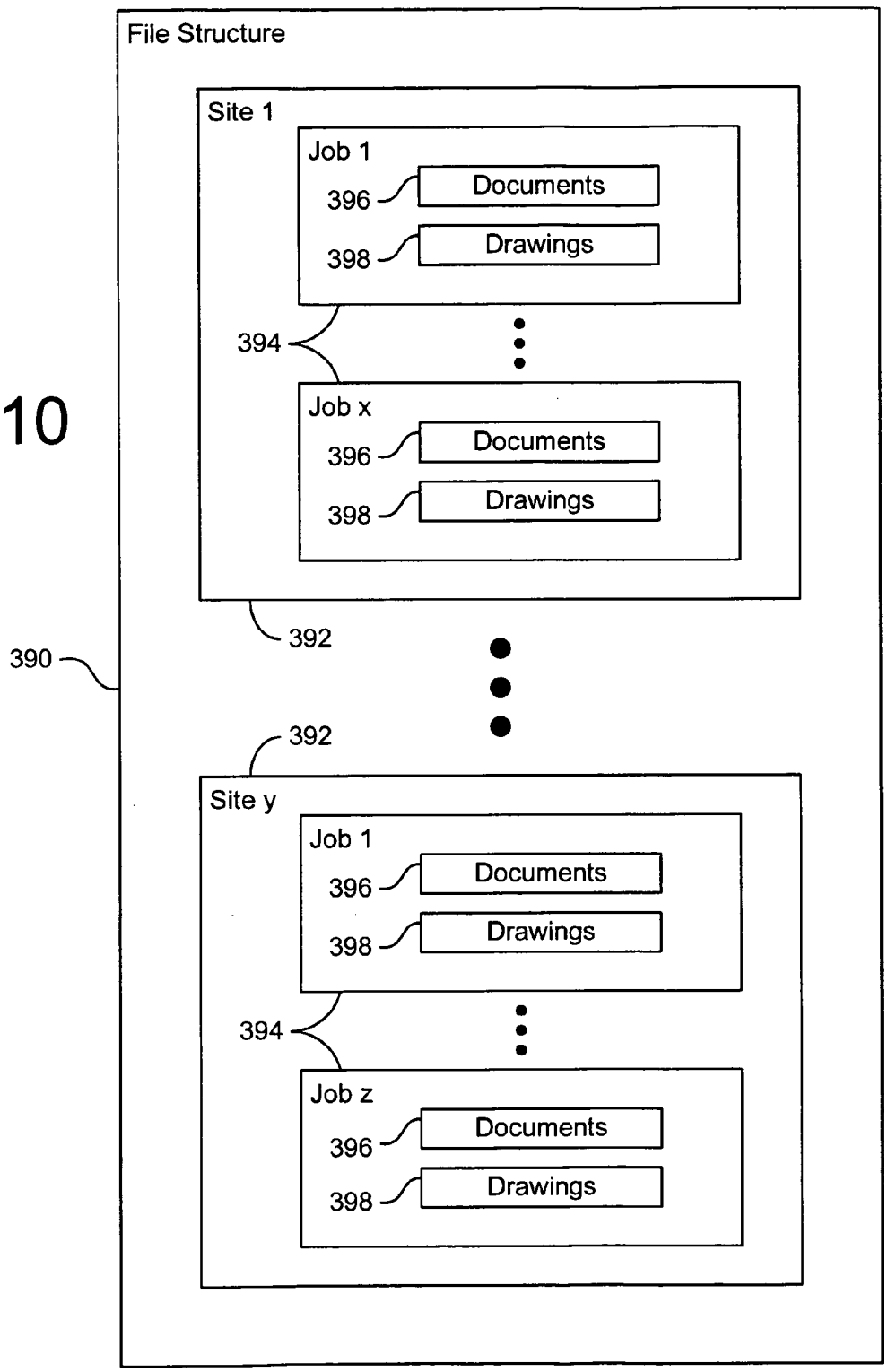
FIG. 10 is a diagram showing one file structure used within system of FIG. 1.

FIG. 10 is a diagram showing one suitable file structure 390 for files 140. File structure 390 includes a separate site directory 392 for each defined site. Each site directory 392 includes a separate job directory 394 for each job defined within the respective site. Each job directory 394 includes a documents directory 396 and a drawings directory 398. Document directories 396 store documents (e.g., purchase orders, RFIs, etc.) associated with the particular job corresponding to the job directory 394 in which the respective document directory 396 is located. Similarly, drawing directories 398 store drawing files (including model files) associated with the particular job corresponding to the job directory 394 in which the respective drawing directory 398 is located.

Note that file structure 390 is consistent with the hierarchical structure of the data shown in FIG. 9. This correlation provides an advantage in that the file path of a document or drawing file (e.g., \BaseDirectory\SiteX\JobY\Drawings\drawingfile.dwg) uniquely defines a particular job at a particular site. Therefore, as indicated above with reference to API 346 (FIG. 8A) the file path of a drawing/model file provides information useful in retrieving data associated with the drawing/model file from database 136.

Figure 11:
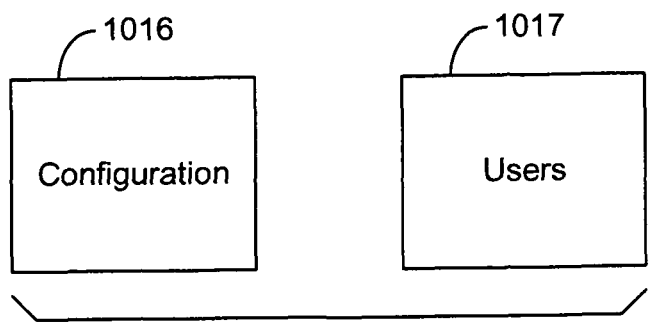
FIG. 11 shows a Configuration table and a Users table of the database of FIG. 1.

FIG. 11 shows a Configuration table 1016 and a Users table 1017 of database 136. Configuration table 1016 stores data generally related to configuring the overall operation and functionality of database 136. Users table 1017 stores data generally related to users who are authorized to access database 136. Because of the nature of the data stored in Configuration table 1016 and Users table 1017, no relationships between the records of the tables are defined.

Figure 12:
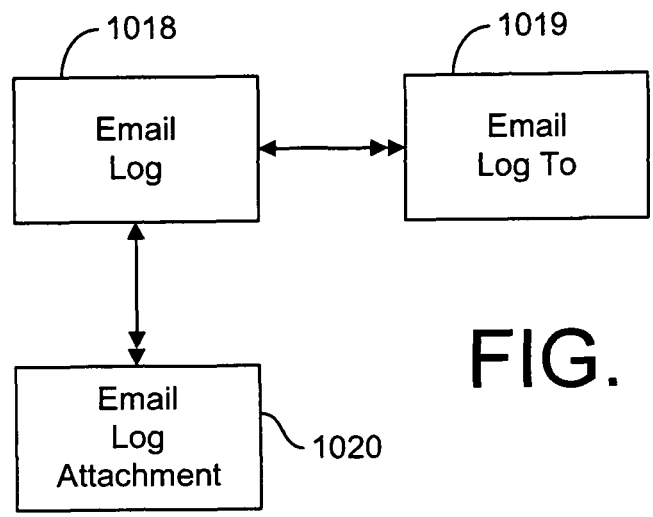
FIG. 12 illustrates the relationships between various tables of the database of FIG. 1.

FIG. 12 shows an Email Log table 1018, an Email Log To table 1019, and an Email Log Attachment table 1020 of database 136. Email Log table 1018 stores data defining individual email messages originating from within database 136. Email Log To table 1019 stores data related to the recipients of emails sent from within database 136. Finally, Email Log Attachment table 1020 stores data generally related to any attachments included with emails sent from within database 136.

The arrow heads of the relational connectors in the figures are intended to illustrate the type of relationship between the records and fields of the tables shown. In particular, a single arrowhead indicates a "one" relationship, whereas a double arrowhead indicates a "many" relationship. Thus, the records in Email Log table 1018 have a one-to-many relationship to the records of Email Log To table 1019. In other words, each record in Email Log table 1018 can correspond to many records in Email Log To table 1019. However, each record in Email Log To table 1019 will correspond to only one record in Email Log table 1018. Email Log table 1018 also has a one-to-many relationship with Email Log Attachment table 1020.

Figure 13:
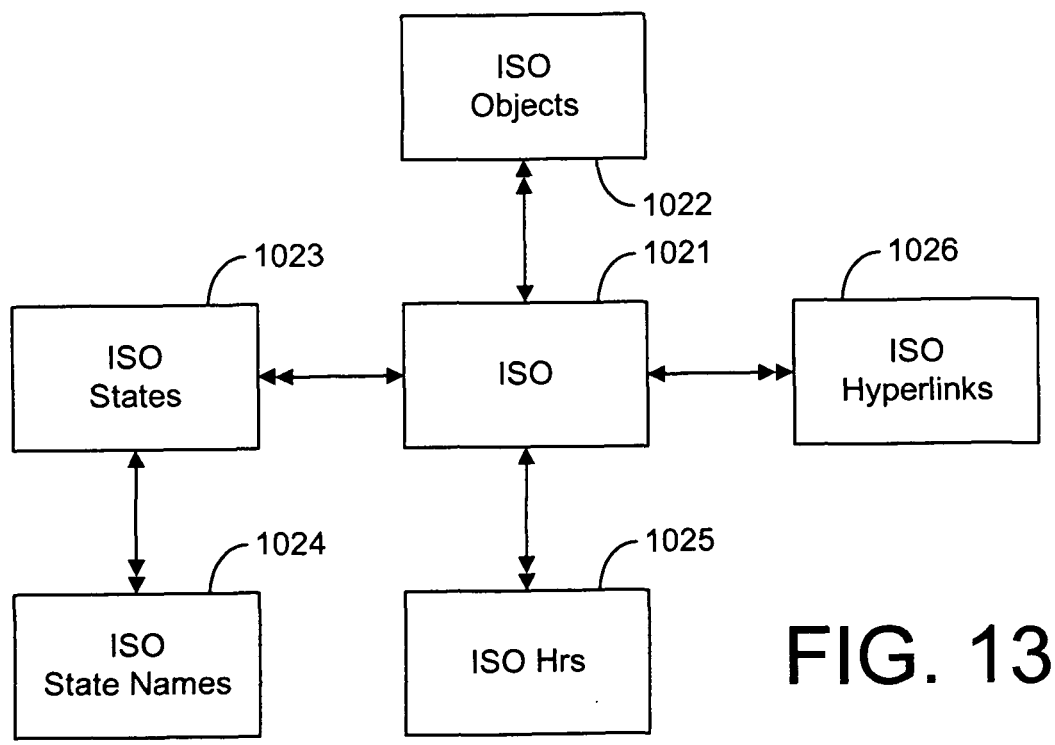
FIG. 13 illustrates the relationships between more tables of the database of FIG. 1.

FIG. 13 shows an ISO table 1021, an ISO Objects table 1022, an ISO States table 1023, an ISO State Names table 1024, an ISO Hrs table 1025, and an ISO Hyperlinks table 1026 of database 136. ISO table 1021 stores data generally related to the recordation of ISOs within database 136. ISO Objects table 1022 stores data generally relating to the categorization of ISO objects, and ISO States table 1023 stores data generally relating to the definition and recordation of states pertaining to the records stored in ISO table 1021. ISO State Narnes table 1024 stores data defining the properties of states defined in ISO States table 1023. ISO Hrs table 1025 stores data generally related to the workload invested in each record of ISO table 1021, and ISO Hyperlinks table 1026 stores data identifying hyperlink paths of files related to each record of ISO table 1021.

The tables of FIG. 13 have the following relationships. ISO table 1021 has a one-to-many relationship with each of ISO Objects table 1022, ISO Hyperlinks table 1026, and ISO Hrs table 1025. ISO table 1021 also has a one-to-many relationship with ISO States table 1023, and ISO states table 1023 has a one-to-many relationship with ISO State Names table 1024.

Figure 14:
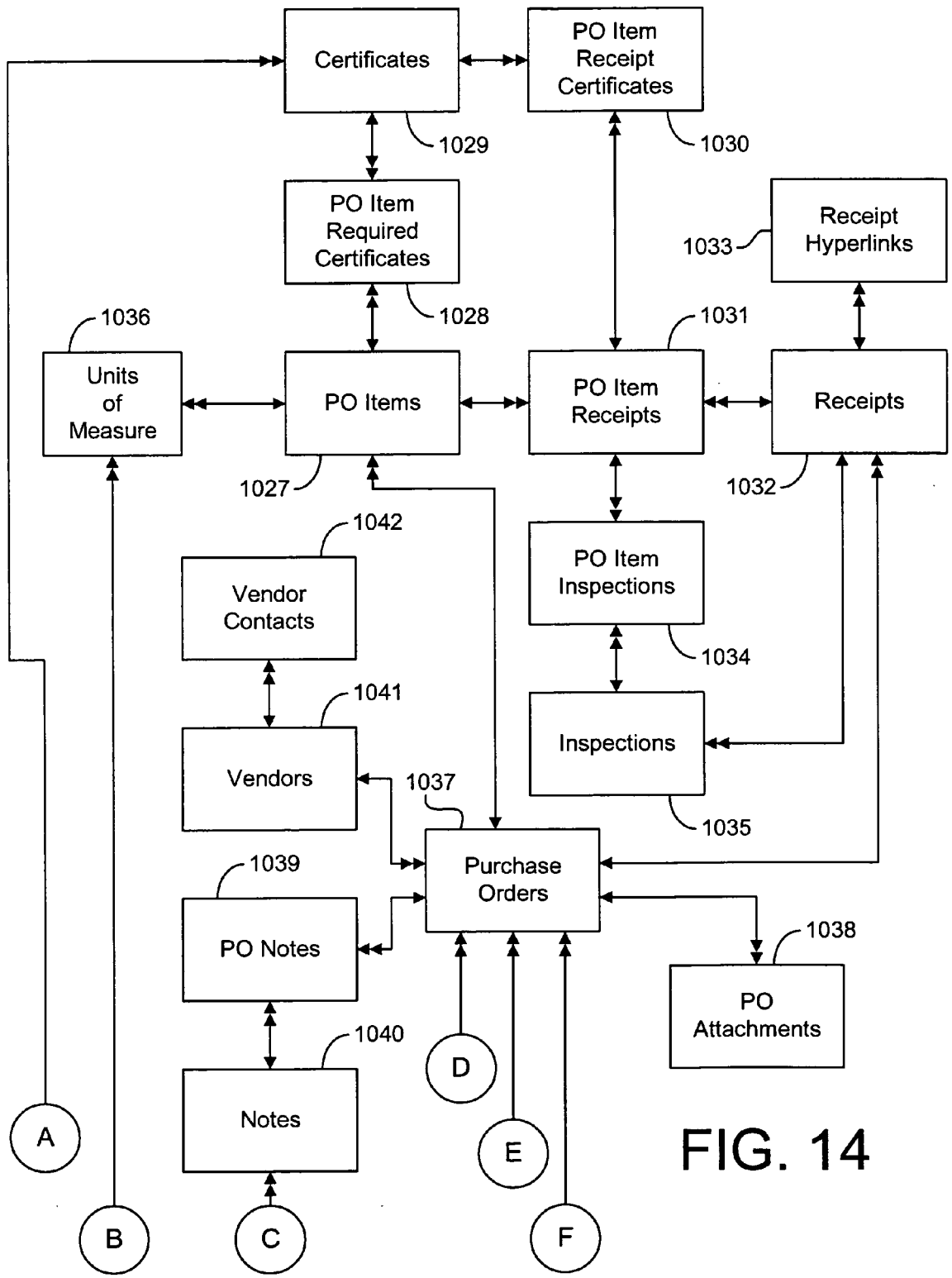
FIG. 14 illustrates the relationships between more tables of the database of FIG. 1.

FIG. 14 shows a PO Items table 1027, a PO Item Required Certificates table 1028, a Certificates table 1029, a PO Item Receipt Certificates table 1030, a PO Item Receipts table 1031, a Receipts table 1032, a Receipt Hyperlinks table 1033, a PO Item Inspections table 1034, an Inspections table 1035, a Units of Measure Table 1036, a Purchase Orders table 1037, a PO Attachments table 1038, a PO Notes table 1039, a Notes Table 1040, a Vendors table 1041, and a Vendor Contacts table 1042, of database 136.

Each table stores data related to the following generally described functions. PO Items table 1027 stores data generally defining purchase order line items, and PO Item Required Certificates table 1028 stores data indicating the certificates that are required by line items of purchase orders. Certificates table 1029 stores data defining certificates required for particular purchase order line items. PO Item Receipt Certificates table 1030 stores data generally indicating the status of certification of outstanding purchase order line items. PO Item Receipts table 1031 stores data generally relating to the receipt of individual items of purchase orders. Receipts table 1032 stores data generally relating to purchase order receipts and vendor invoice information, and Receipt Hyperlinks table 1033 stores information relating to the storage of electronic copies of receipts of the records stored in table 1032. PO Item Inspections table 1034 stores data generally related to the inspection of purchase order line items, and Inspections table 1035 stores data generally related to inspection data management. Units Of Measure table 1036 stores data defining quantities representing units of measurement. Purchase Orders table 1037 stores data generally defining purchase order records for job sites, and PO Attachments table stores data identifying attachments associated with the records of Purchase Orders table 1037. Additionally, PO Notes table 1039 store notes associated with the records of Purchase Orders table 1037, and Notes table 1040 stores data defining notes used at particular job sites and in purchase orders. Finally, Vendors table 1041 stores data relating to vendors supplying job sites, and Vendor Contacts table 1042 stores contact information for the vendors defined in the records of Vendors table 1041.

The following relationships exist between the tables of FIG. 14. The records in PO Items table 1027 have a one-to-many relationship with to the records in each of PO Item Required Certificates table 1028, PO Item Receipts table 1031, and Units Of Measure table 1036. The records in Certificates table 1029 have a one-to-many relationship with the records in each of PO Item Required Certificates table 1028 and PO Item Receipt Certificates table 1030. The records in PO Item Receipts table 1031 have a one-to-many relationship with the records in each of PO Item Receipt Certificates table 1030 and PO Item Inspections table 1034. The records stored in Purchase Orders table 1037 have a one-to-many relationship with the records stored in PO Items table 1027, PO Notes table 1039, PO Attachments table 1038, and Receipts table 1032. The records in Receipts table 1032 have a one-to-many relationship with the records in each of PO Item Receipts table 1031, Receipt Hyperlinks table 1033, and Inspections table 1035. The records in Inspections table 1035 have a one-to-many relationship with the records stored in PO Item Inspections table 1034. The records stored in Vendors table 1041 have a one-to-many relationship with the records stored in each of Vendor Contacts table 1042, and Purchase Orders table 1037. Finally, the records stored in Notes table 1040 have a one-to-many relationship with the records stored in PO Notes table 1039.

Figure 15:
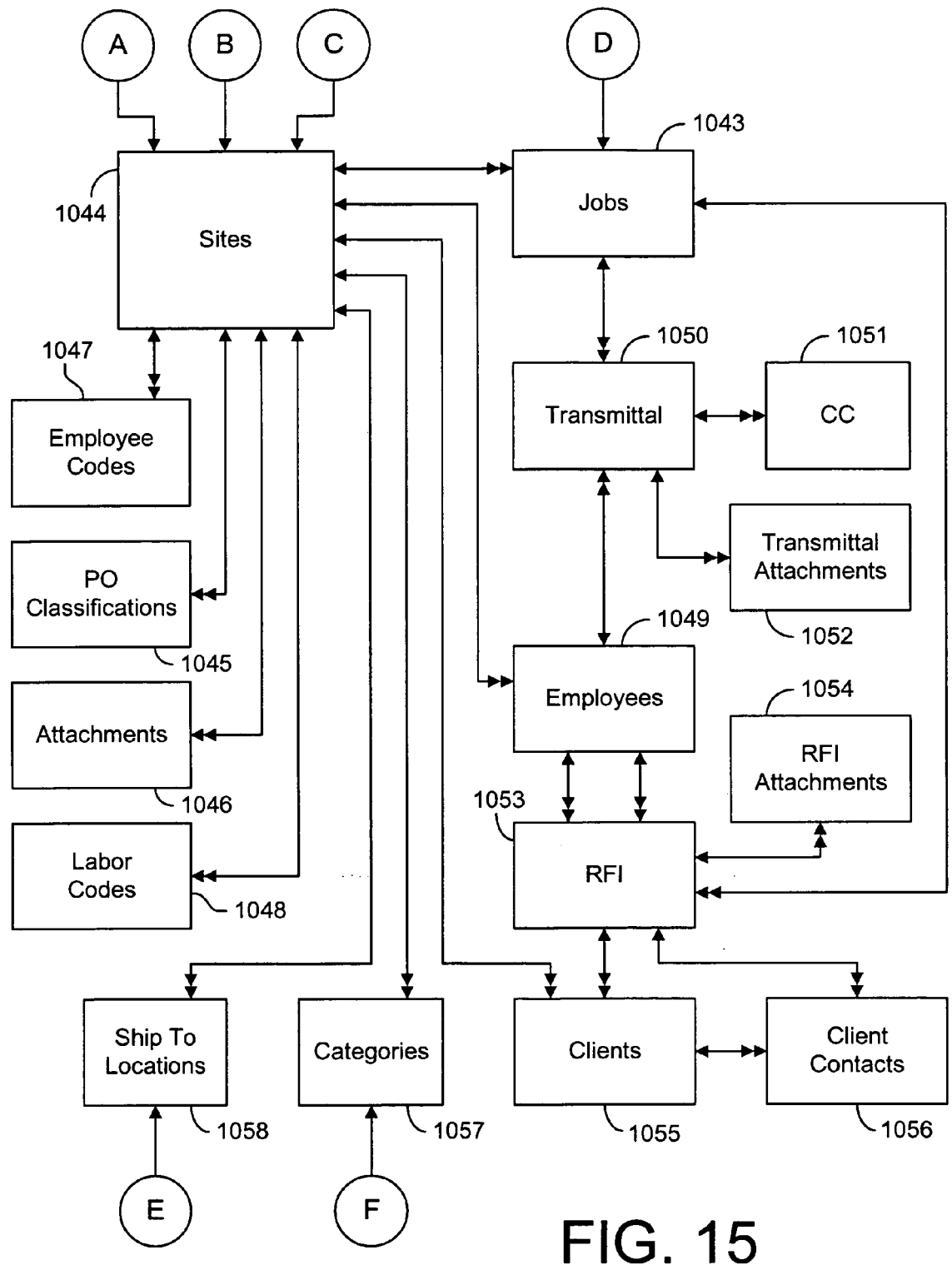
FIG. 15 illustrates the relationships between more tables of the database of FIG. 1.

FIG. 15 shows a Jobs table 1043, a Sites table 1044, a PO Classifications table 1045, an Attachments table 1046, an Employee Codes table 1047, a Labor Codes table 1048, an Employees table 1049, a Transmittal table 1050, a CC table 1051, a Transmittal Attachments table 1052, an RFI table 1053, an RFI attachments table 1054, a Clients table 1055, a Client Contacts table 1056, a Categories table 1057, and a Ship To Locations table 1058 of database 136.

Each table stores data related to the following generally described functions described functions. Jobs table 1043 stores data related to jobs associated with the company using database 136. Sites table 1044 stores data related to particular job sites. PO Classification table 1045 stores data classifying purchase orders and assigning particular values to those classifications. Attachments table 1046 stores data for tracking and organizing attachment records and their properties. Employee Codes table 1047 stores data categorizing employees with specialization codes, and Labor Codes table 1048 stores data categorizing labor according to code and description. Employees table 1049 stores data records of employees who are or have been employed by the company using database 136. Transmittal table 1050 stores data defining transmittal sheets that accompany data sent between Employees and/or outside sources. CC table 1051 stores data for providing copies of transmittals to selected individuals. Transmittal Attachments table 1052 stores data for identifying and tracking attachments to transmittals. RFI table 1053 stores data generally related to information for creating and processing Requests For Information (RFI). RFI Attachments table 1054 stores data for identifying and tracking attachments to requests for information records stored in RFI table 1053. Clients table 1055 stores data generally related to clients recognized by database 136, and Client Contacts table 1056 stores contact information for each of those clients. Categories table 1057 stores data relating to the definition and description of categories utilized by purchase orders at different job sites. Finally, Ship To Locations table 1058 includes shipping information for important locations.

The following relationships exist between the tables shown in FIG. 15. The records of Sites table 1044 have a one-to-many relationship with each of Jobs table 1043, Employees table 1049, Clients table 1055, Categories table 1057, Ship To Locations Table 1058, Labor Codes table 1048, Attachments table 1046, PO Classifications table 1045, and Employee Codes table 1047. The records in Employees table 1049 have a one-to-many relationship with the records of both Transmittal table 1050, and RFI table 1053. Additionally, the records of Jobs table 1043 have a one-to-many relationship with both Transmittal table 1050 and RFI table 1053. The records of Transmittal table 1050 have a one-to-many relationship with the records of both CC table 1051 and Transmittal Attachments table 1052. The records of RFI table 1053 have a one-to-many relationship with the records of each of Clients table 1055, RFI Attachments table 1054, and Client Contacts table 1056. Finally, the records of Clients table 1055 have a one-to-many relationship with the records of Client Contacts table 1056.

The following relationships exist between tables of FIGS. 14 and 15. The records of Sites table 1044 have a one-to-many relationship with each of Certificates table 1029 (line A), Units of Measure table 1036 (line B), and Notes table 1040 (line C). Additionally, the records of each of Jobs table 1043, Ship To Locations table 1058, and Categories table 1057 have a one-to-many relationship with the records of Purchase Orders table 1037 (lines D, E, and F, respectively).

Figure 16:
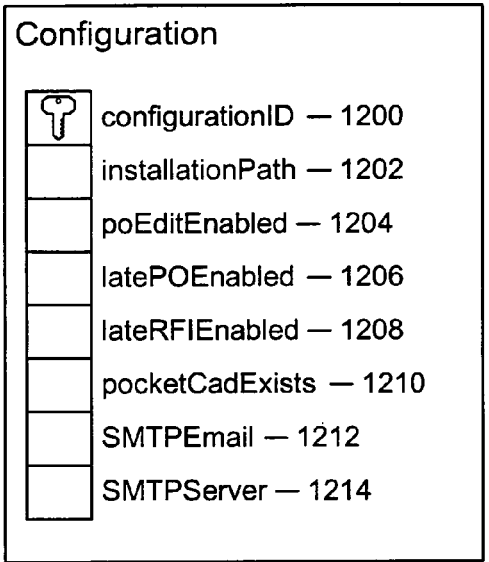
FIG. 16 shows the fields included in the Configuration table of FIG. 11.

FIG. 16 shows Configuration table 1016 in greater detail. Each record in Configuration table 1016 includes a "configurationID" field 1200, an "installationPath" field 1202, a "poEditEnabled" field 1204, a "latePOEnabled" field 1206, a "lateRFIEnabled" field 1208, a "pocketCadExists" field 1210, an "SMTPEmail" field 1212, and an "SMTPServer" field 1214. ConfigurationID field 1200 is the key field of Configuration table 1016 and includes data representing a unique identifier for each configuration record stored therein. InstallationPath field 1202 stores data representing the file path to the directory where database 136 is installed. Additionally, poEditEnabled field 1204 indicates if editing of issued purchase orders is allowed. PocketCADExists field 1210 stores data indicative of whether remote devices 114 are to be used with system 100. SMTPEmail field 1212 stores data representing the email address that will appear as the "sender" of any email originating from within database 136. Finally, SMTPServer field 1214 stores the SMTP hostname of the email server that will be used from within database 136 whenever email is sent.

Figure 17:
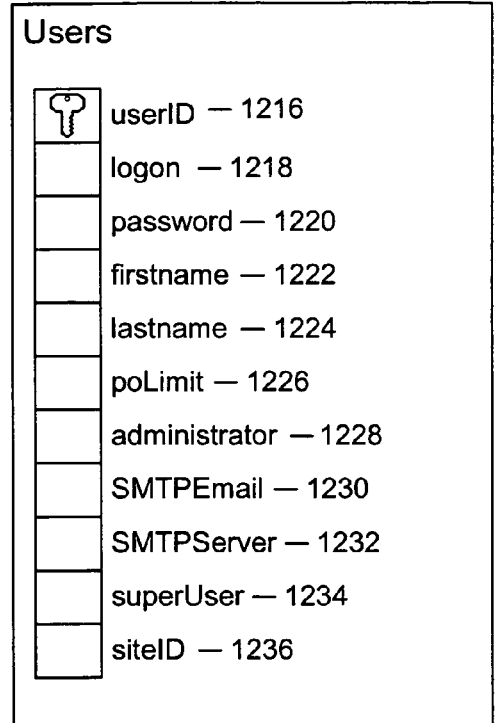
FIG. 17 shows the fields included in the Users table of FIG. 11.

FIG. 17 shows Users table 1017 in greater detail. Each record in Users table 1017 includes a "userID" field 1216, a "logon" field 1218, a "password" field 1220, a "firstname" field 1222, a "lastname" field 1224, a "poLimit" field 1226, an "administrator" field 1228, an "SMTPEmail" field 1230, an "SMTPServer" field 1232, a "superUser" field 1234, and a "siteID" field 1236. UserID field 1216 is the key field of Users table 1017 and includes data representing a unique identifier for each user record stored therein. Logon field 1218 stores data representing the logon name of each user of database 136, and password field 1220 stores data representing each user's password. Data representing the first and last names of each user of system 100 are stored in firstname field 1222 and lastname field 1224, respectively, and do not have to match the data stored in logon field 1218. Each user is given a purchase order limit that is stored in poLimit field 1226, and represents the maximum dollar amount of any single purchase order that the user is allowed to issue. Any purchase orders over the value stored in poLimit field 1226 will be saved as draft only. The administrator field 1228 stores data indicative of a user having administrator privileges, which include import and export functions and all functions in the administrator menu. Additionally, a user with administrator capabilities may add and change user information, but cannot assign or use "super-user" privileges. SMTPEmail field 1230 stores data representing the email address that appears as the "sender" of any email originating from within database 136. SMTPServer field 1232 stores the SMTP hostname of the email server that will be used by database 136. SuperUser field 1234 stores data indicative of a user having super-user status, enabling that user access to all sites on system 100. Users flagged as super users can create and change sites and have all administrator privileges. However, a user may not be flagged as a super user if they are already defined in two or more sites or until all individual site user records have been deleted. Finally, siteID field 1236 stores data uniquely identifying a job site related to a particular user.

Figure 18:
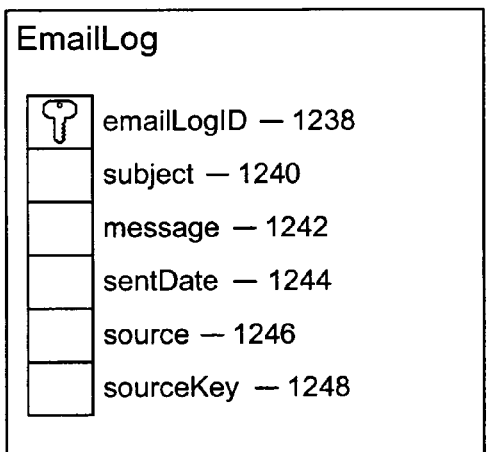
FIG. 18 shows the fields included in the Email Log table of FIG. 12.

FIG. 18 shows Email Log table 1018 in greater detail. Each record in Email Log table 1018 includes an "emailLogID" field 1238, a "subject" field 1240, a "message" field 1242, a "sentDate" field 1244, a "source" field 1246, and a "sourceKey" field 1248. EmailLogID field 1238 is the key field of Email Log table 1018 and includes data representing a unique identifier for each email record stored therein. Subject field 1240 stores subject data, and message field 1242 stores message data of a particular email associated with an emailLogID 1238. SentDate field 1244 stores data representing the date an email associated with an emailLogID 1238 was sent, and source field 1246 stores data identifying the source (e.g., a user, a network address, etc.) that the email came from.

Figure 19:
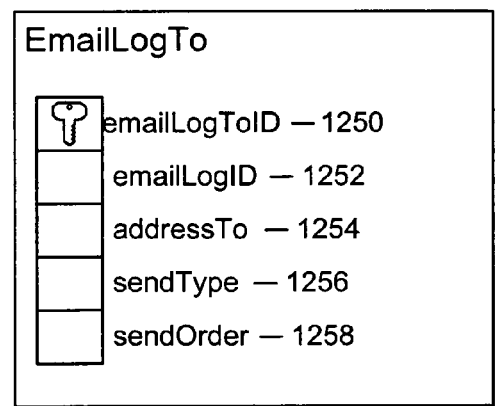
FIG. 19 shows the fields included in the Email Log To table of FIG. 12.

FIG. 19 shows Email Log To table 1019 in greater detail. Each record in Email Log To table 1019 includes an "emailLogToID" field 1250, an "emailLogID" field 1252, an "addressTo" field 1254, a "sendType" field 1256, and a "sendOrder" field 1258. EmailLogToID field 1250 is the key field of Email Log To table 1019 and includes data representing a unique identifier for each email log record stored therein. EmailLogID 1252 field uniquely identifies particular email records and includes the same data as emailLogID field 1238 of Email Log table 1018. AddressTo field 1254 stores the email address of the recipient associated with a particular emailLogToID record 1250.

Figure 20:
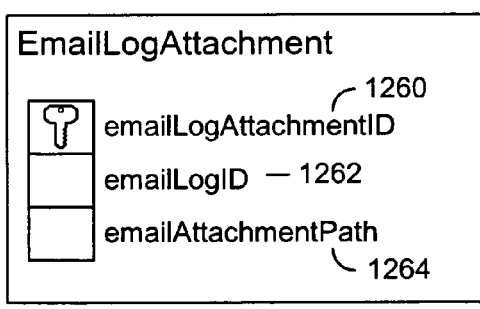
FIG. 20 shows the fields included in the Email Log Attachment table of FIG. 12.

FIG. 20 shows Email Log Attachment table 1020 in greater detail. Each record in Email Log Attachment table 1020 includes an "emailLogAttachmentID" field 1260, an "emailLogID" field 1262, and an "emailAttachmentPath" field 1264. EmailLogAttachmentID field 1260 is the key field of Email Log Attachment table 1020 and includes data representing a unique identifier for each email attachment record stored therein. EmailLogID field 1262 uniquely identifies particular email log records, and includes the same data as emailLogID field 1238 of table 1018. Finally, emailAttachmentPath field 1264 stores data identifying the directory path to an attachment (e.g., a file) included with an email associated with emailLogID field 1262.

Figure 21:
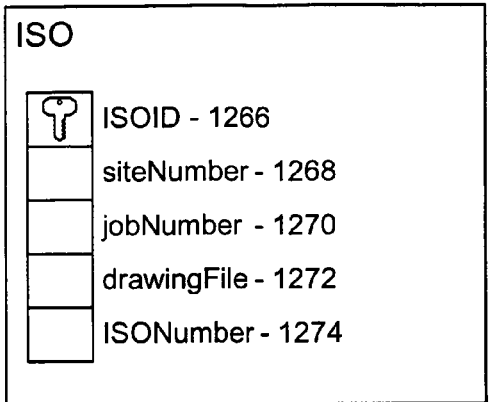
FIG. 21 shows the fields included in the ISO table of FIG. 13.

FIG. 21 shows ISO table 1021 in greater detail. Each record in ISO table 1021 includes an "ISOID" field 1266, a "siteNumber" field 1268, a "jobNumber" field 1270, a "drawingFile" field 1272, and an "ISONumber" field 1274. ISOID field 1266 is the key field of ISO table 1021 and includes data representing a unique identifier for each ISO record stored therein. The job and site numbers corresponding with a particular ISO record are stored in siteNumber field 1268 and jobNumber field 1270, respectively. Additionally, information indicative of a drawing file illustrating the particular ISO is stored in drawingFile field 1272. Finally, a reference number associated with a particular ISO record is stored in ISONumber field 1274.

Figure 22:
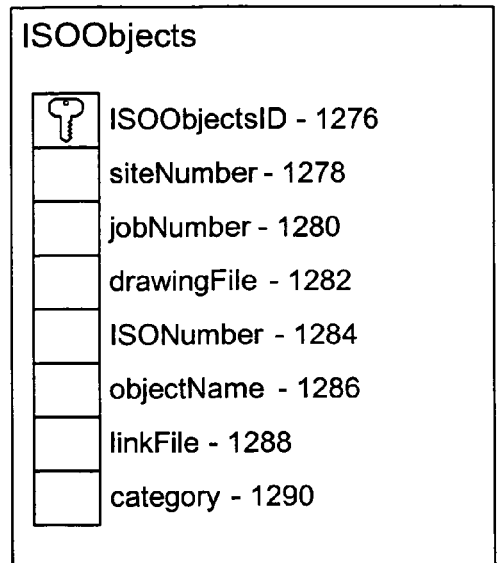
FIG. 22 shows the fields included in the ISO Objects table of FIG. 13.

FIG. 22 shows ISO Objects table 1022 in greater detail. Each record in ISO Objects table 1022 includes an "ISOObjectsID" field 1276, a "siteNumber" field 1278, a "jobNumber" field 1280, a "drawingFile" field 1282, an "ISONumber" field 1284, an "objectName" field 1286, a "linkfile" field 1288, and a "category" field 1290. ISOObjectsID field 1276 is the key field of ISO Objects table 1022 and includes data representing a unique identifier for each ISO object record stored therein. The site and job numbers using a particular ISO object are stored in siteNumber field 1278 and jobNumber field 1280, respectively. Additionally, information indicative of a drawing file illustrating a particular ISO object is stored in drawingFile field 1282, and a reference number associated with a particular ISO object is stored in ISONumber field 1284. The name of the ISO object, or component of the system, is stored in objectName field 1286. LinkFile field 1288 stores data indicating one or more files are linked to an ISO assembly. Finally, data indicative of the category (defined by the users of database 136) that the ISO component relates to is stored in category field 1290.

Figure 23:
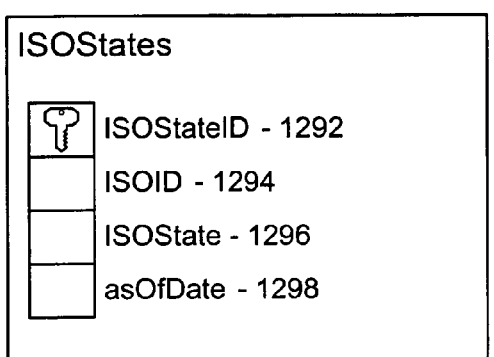
FIG. 23 shows the fields included in the ISO States table of FIG. 13.

FIG. 23 shows ISO States table 1023 in greater detail. Each record in ISO States table 1023 includes an "ISOStateID" field 1292, an "ISOID" field 1294, an "ISOState" field 1296, and an "asOfDate" field 1298. ISOStateID field 1292 is the key field of ISO States table 1023 and includes data representing a unique identifier for each ISO state record stored therein. ISOID field 1294 stores data uniquely identifying each ISO, or component, of a system. ISOState field 1296 correlates a particular ISO state with a record. There are 12 ISO states originally defined for use with database 136 and additional states can be added and modified as necessary. The following is a list of the pre-defined states: 0=Undefined; 1=Material Ordered; 2=Fabricated In Shop; 3=Fabricated In Field; 4=Shipped To Jobsite; 5=Received On Jobsite; 6=Spool or ISOs Installed; 7=Spools or ISOs Complete; 8=Ready for Testing; 9=System Being Tested; 10=System Being Flushed; and 11=System in Startup Mode. Finally, asOfDate field 1298 stores data indicative of the date as of which the record is current.

Figure 24:
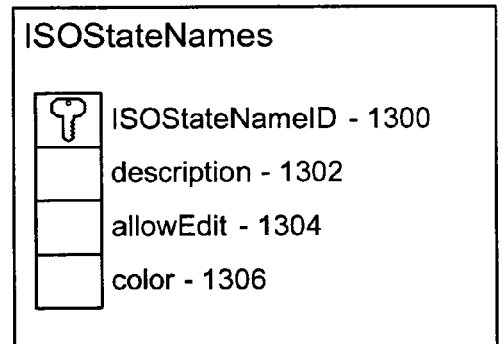
FIG. 24 shows the fields included in the ISO State Names table of FIG. 13.

FIG. 24 shows ISO State Names table 1024 in greater detail. Each record in ISO State Names table includes a "ISOStateNameID" field 1300, a "description" field 1302, an "allowEdit" field 1304, and a "color" field 1306. ISOStateNameID field 1300 is the key field of ISO State Names table 1024 and includes data representing a unique identifier for each ISO state name record stored therein. Description data of an ISO state can be stored in description field 1302, and a state name record can be edited if the data stored in allowEdit field 1304 authorizes such. Finally, the color identifying a particular state, as it will appear in computer drawings and models, is determined by the data stored in color field 1306.

Figure 25:
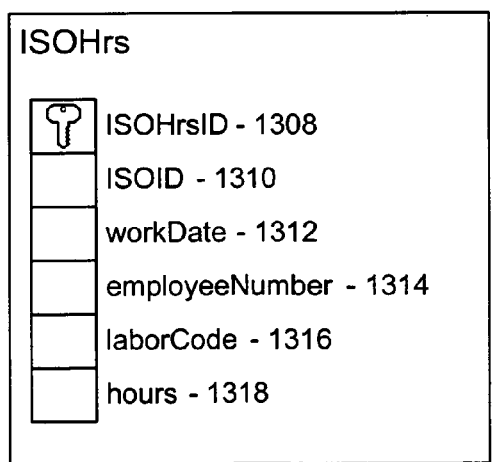
FIG. 25 shows the fields included in the ISO Hrs table of FIG. 13.

FIG. 25 shows ISO Hrs table 1025 in greater detail. Each record in ISO Hrs table 1025 includes an "ISOHrsID" field 1308, an "ISOID" field 1310, a "workDate" field 1312, an "employeeNumber" field 1314, a "laborCode" field 1316, and an "hours" field 1318. ISOHrsID field 1308 is the key field of ISO Hrs table 1025 and includes data representing a unique identifier for each ISO hours record stored therein. ISOID field 1310 stores data uniquely identifying a particular ISO in each record of table 1025. When an ISO is worked on, the date the work was done is recorded in workDate field 1312. The employee performing the work is recorded in employeeNumber field 1314. Additionally, the labor code associated with that employee is recorded in laborCode field 1316, and finally, the amount of hours spent working on the particular ISO is stored in hours field 1318.

Figure 26:
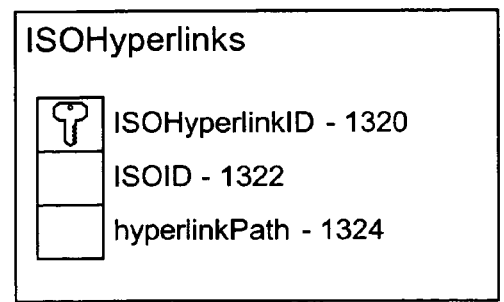
FIG. 26 shows the fields included in the ISO Hyperlinks table of FIG. 13.

FIG. 26 shows ISO Hyperlinks table 1026 in greater detail. Each record in ISO Hyperlinks table 1026 includes an "ISOHyperlinksID" field 1320, an "ISOID" field 1322, and a "hyperlinkpath" field 1324. ISOHyperlinkID field 1320 is the key field of ISO Hyperlinks table 1026 and includes data representing a unique identifier for each ISO hyperlink record stored therein. ISOID field 1322 stores data uniquely identifying an ISO associated with a particular record of table 1026. Finally, it is often useful to record a hyperlink to a file (e.g., a drawing, description file, etc.) associated with a particular ISO. Such a hyperlink is stored in hyperlinkPath field 1324.

Figure 27:
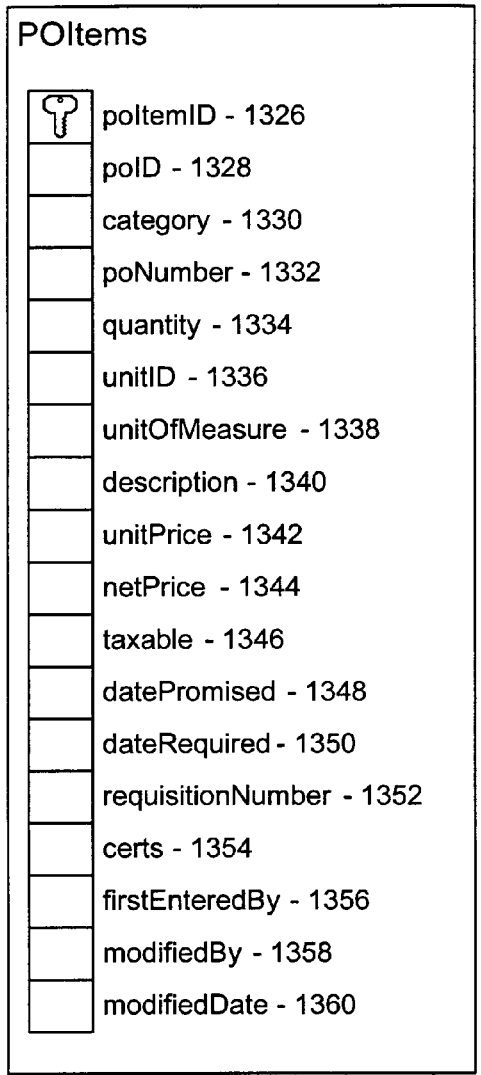
FIG. 27 shows the fields included in the PO Items table of FIG. 14.

FIG. 27 shows PO Items table 1027 in greater detail. Each record in PO Items table 1027 includes a "poItemsID" field 1326, a "poID" field 1328, a "category" field 1330, a "poNumber" field 1332, a "quantity" field 1334, a "unitID" field 1336, a "unitOfMeasure" field 1338, a "description" field 1340, a "unitPrice" field 1342, a "netPrice" field 1344, a "taxable" field 1346, a "datePromised" field 1348, a "dateRequired" field 1350, a "requisitionNumber" field 1352, a "certs" field 1354, a "firstEnteredBy" field 1356, a "modifiedBy" field 1358, and a "modifiedDate" field 1360.

The poItemID field 1326 is the key field of PO Items table 1027 and includes data representing a unique identifier for each line item of purchase orders stored therein. Data uniquely identifying each purchase order that a particular POItemID record is associated with is stored in poID field 1328. Data stored in category field 1330 an item 1326 with a particular category, and the poNumber field 1332 stores data identifying a reference number assigned a PO item 1326 based on its category. Quantity field 1334 stores data representing the quantity of a particular line item that is ordered, and recognizes up to two decimal places. Particular line items are purchased according to units of measure (e.g., individually, by the box, etc.), the data defining each is stored in unitOfMeasure field 1338. Each unit of measure is recognized by a unique identifier stored in unitID field 1336. Description field 1340 stores detailed description of the line item being purchased. Additionally, if a description of an item is too long to be entered into description field 1340, then a separate file may be attached as a description. UnitPrice field 1342 stores the price of the particular line item per unit of measure and netPrice field 1344 stores the produce of quantity field 1334 and unitPrice field 1342 for each line item record. Furthermore, taxable field 1346 indicates whether a particular line item is taxable. DatePromised field 1348 stores data indicating the date when a vendor has indicated that a line item will arrive at the job site, and dateRequired field 1350 retains data indicating the date a particular line item of a purchase order is required on a job site. Additionally, the requisition number for a particular line item is stored in optional requisitionNumber field 1352 and is used to sort and print PO line items by requisition number. Also, each line item requires certification up receipt. The number of particular certificates that a line item requires is stored in certs field 1354. Finally, firstEnteredBy field 1356 stores data indicating the person who first entered the line item record, modifiedBy field 1358 indicates who last modified the particular purchase order, and modifiedDate field 1360 indicates when the purchase order was last modified.

Figure 28:
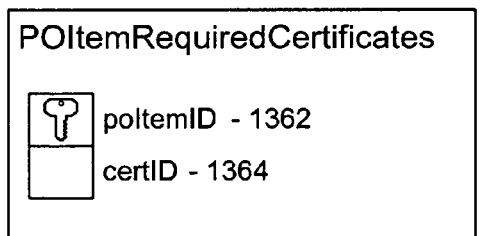
FIG. 28 shows the fields included in the PO Item Required Certificates table of FIG. 14.

FIG. 28 shows PO Item Required Certificates table 1028 in greater detail. Each record in PO Item Required Certificates table 1028 includes a "poItemID" field 1362 and a "certID" field 1364. The poItemID field 1362 is the key field of PO Item Required Certificates table 1028 and includes data representing a unique identifier for each PO item certificate record stored therein. Certificates required by a line item in poItemID field 1362 are uniquely identified by data stored in certID field 1364.

Figure 29:
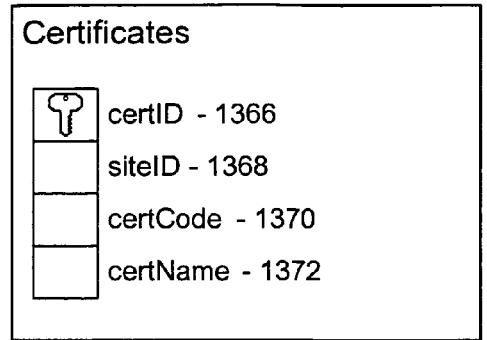
FIG. 29 shows the fields included in the Certificates table of FIG. 14.

FIG. 29 shows Certificates table 1029 in greater detail. Each record in Certificates table 1029 includes a "certID" field 1366, a "siteID" field 1368, a "certCode" field 1370, and a "certName" field 1372. CertID field 1366 is the key field of Certificates table 1029 and includes data uniquely identifying each certificate record stored therein. SiteID field 1368 uniquely identifies the job site requiring the certificate for a particular PO line item. CertCode field 1370 stores data identifying the certificate code associated with a particular record, and certName field 1372 retains data indicating the name of the certificate of a particular record.

Figure 30:
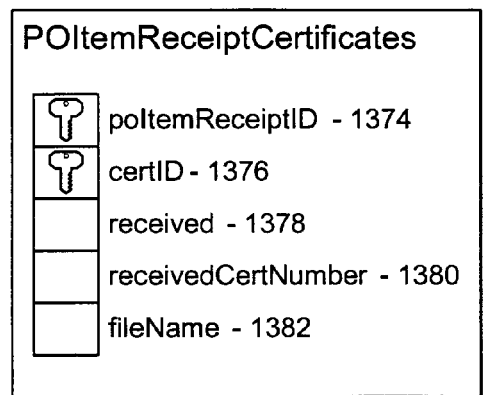
FIG. 30 shows the fields included in the PO Item Receipt Certificates table of FIG. 14.

FIG. 30 shows PO Item Receipt Certificates table 1030 in greater detail. Each record in PO Item Receipt Certificates table 1030 includes a "poItemReceiptID" field 1374, a "certID" field 1376, a "received" field 1378, a "receivedCertNumber" field 1380, and a "fileName" field 1382. Both poItemReceiptID field 1374 and certID field 1376 are key fields of PO Item Receipt Certificates table 1030 and, in combination, include data representing a unique identifier for each record stored therein. Received field 1378 includes data indicating whether or not a PO line item was issued the corresponding certificate, and receivedCertNumber field 1380 stores data indicating the certificate number of the issued certificate. Finally, if an electronic copy of the certificate was saved upon receipt (e.g., to a server), then fileName field 1382 includes data indicating the file name of the saved certificate.

Figure 31:
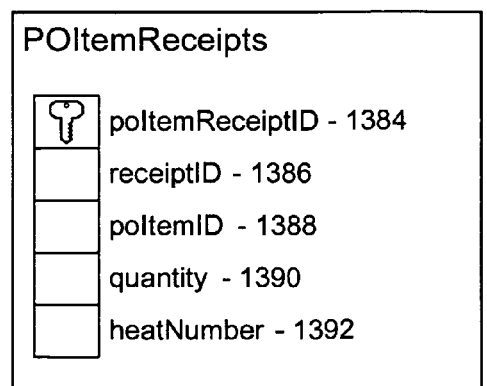
FIG. 31 shows the fields included in the PO Item Receipts table of FIG. 14.

FIG. 31 shows PO Item Receipts table 1031 in greater detail. Each record in PO Item Receipts table 1031 includes a "poItemsReceiptID" field 1384, a "receiptID" field 1386, a "poItemID" field 1388, a "quantity" field 1390, and a "heatNumber" field 1392. The poItemReceiptID field 1384 is the key field of PO Item Receipt table 1031 and includes data representing a unique identifier for each receipt record stored therein. ReceiptID field 1386 stores data uniquely corresponding to a receipt of a particular line item identified by poItemID field 1388. Additionally, the quantity of the line item received is stored in quantity field 1390, and finally, heatNumber field 1392 stores data indicating the heat or lot number of the received line item.

Figure 32:
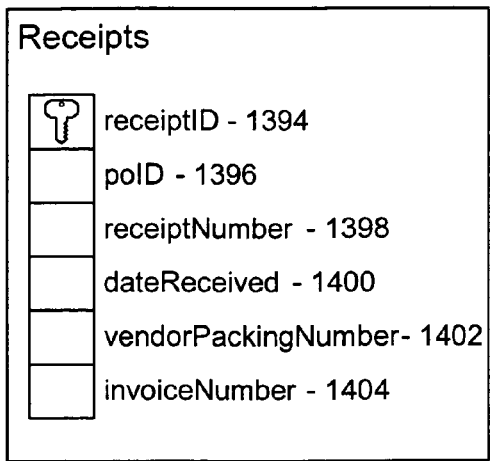
FIG. 32 shows the fields included in the Receipts table of FIG. 14.

FIG. 32 shows Receipts table 1032 in greater detail. Each record in Receipts table 1032 includes a "receiptID" field 1394, a "poID" field 1396, a "receiptNumber" field 1398, a "dateReceived" field 1400, a "vendorPackingNumber" field 1402, and an "invoiceNumber" field 1404. ReceiptID field 1394 is the key field of Receipts table 1032 and includes data representing a unique identifier for each receipt stored therein. Purchase orders are uniquely identified by poID field 1396, and each receipt is assigned a reference number (typically sequentially) that is recorded in receiptNumber field 1398. The date on which a purchase order is received is stored in dateReceived field 1400, and the vendor's packing number identifying the shipment, is stored in vendorPackingNumber field 1402. Finally, the vendor's invoice number is stored in invoiceNumber field 1404.

Figure 33:
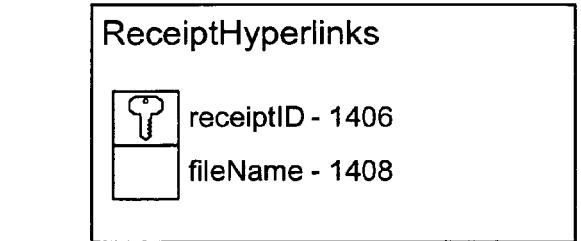
FIG. 33 shows the fields included in the Receipt Hyperlinks table of FIG. 14.

FIG. 33 shows Receipt Hyperlinks table 1033 in greater detail. Each record in Receipt Hyperlinks table 1033 includes a "receiptID" field 1406 and a "fileName" field 1408. ReceiptID field 1406 is the key field of Receipt Hyperlinks table 1033 and includes data representing a unique identifier for each receipt stored therein. If a copy of a receipt is saved electronically, then fileName field 1408 includes data indicating the file name of the saved receipt.

Figure 34:
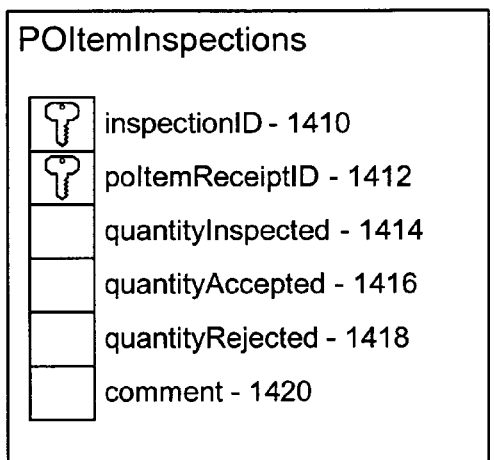
FIG. 34 shows the fields included in the PO Item Inspections table of FIG. 14.

FIG. 34 shows PO Item Inspections table 1034 in greater detail. Each record in PO Item Inspections table 1304 includes an "inspectionID" field 1410, a "poItemReceiptID" field 1412, a "quantityInspected" field 1414, a "quantityAccepted" field 1416, a "quarityRejected" field 1418, and a "comment" field 1420. Both inspectionID field 1410 and poItemReceiptID field 1412 are key fields of PO Item Inspections table and include data, that in combination, represent a unique identifier of each item inspection record stored therein. QuantityInspection field 1414 stores data indicative of the number of an item inspected. The number of items that passed inspection are stored as data in quantityAccepted field 1416. The difference of values stored in quantityInspected field 1414 and quantityAccepted field 1416 is stored in quantityRejected field 1418 and indicates the number of items that failed inspection. Any comments made by the inspector during inspection are stored in comment field 1420.

Figure 35:
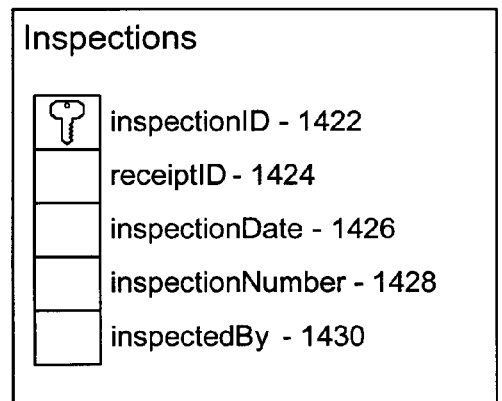
FIG. 35 shows the fields included in the Inspections table of FIG. 14.

FIG. 35 shows Inspections table 1035 in greater detail. Each record in Inspections table 1035 includes an "inspectionID" field 1422, a "receiptID" field 1424, an "inspectionDate" field 1426, an "inspectionNumber" field 1428, and an "inspectedBy" field 1430. InspectionsID field 1422 is the key field of Inspections table 1035 and includes data representing a unique identifier for each inspection record stored therein. ReceiptID field 1424 contains data representing a unique identifier of a particular receipt records of a purchase orders. The date an inspection was performed on the purchase order items is stored in inspectionDate field 1426, and inspectionNumber field 1428 stores data representative of a reference number identifying a particular purchase order inspection. Finally, data identifying the employee who conducted the inspection of the purchase order is stored in inspectedBy field 1430.

Figure 36:
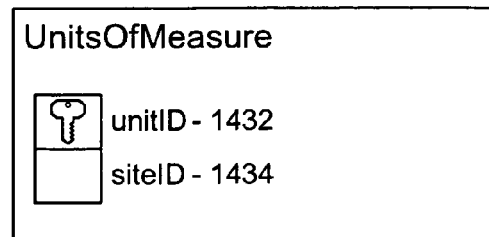
FIG. 36 shows the fields included in the Units of Measure table of FIG. 14.

FIG. 36 shows Units Of Measure table 1036 in greater detail. Each record in Units Of Measure table 1036 includes a "unitID" field 1432 and a "siteID" field 1434. UnitID field 1432 is the key field of Units Of Measure table 1036 and includes data representing a unique identifier for each units of measure record stored therein. Additionally, siteID field 1434 identifies the job site utilizing a particular unit of measure record.

Figure 37:
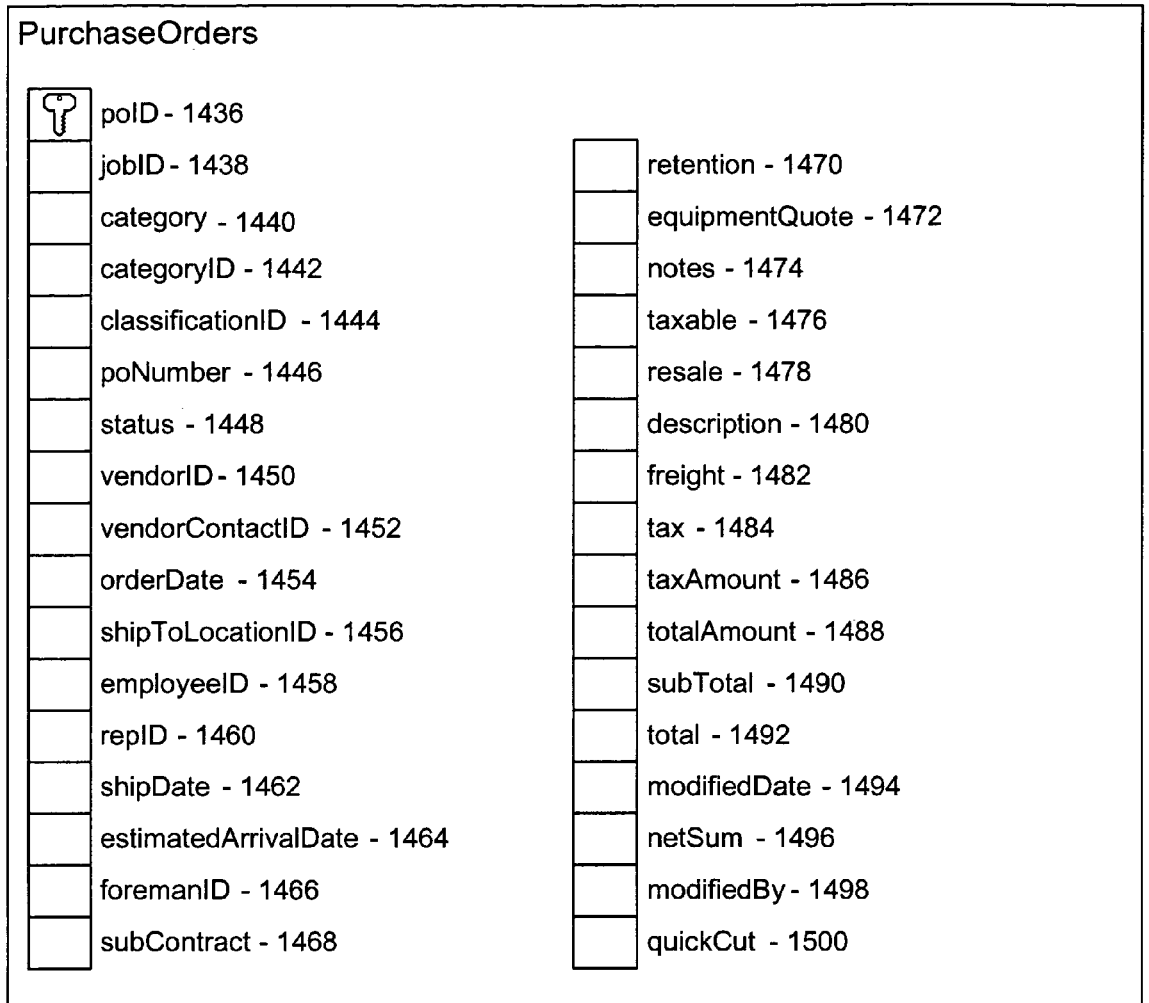
FIG. 37 shows the fields included in the Purchase Orders table of FIG. 14.

FIG. 37 shows Purchase Orders table 1037 in greater detail. Each record in Purchase Orders table 1037 includes a "poID" field 1436, a "jobID" field 1438, a "category" field 1440, a "categoryID" field 1442, a "classificationID" field 1444, a "poNumber" field 1446, a "status" field 1448, a "vendorID" field 1450, a "vendorContactID" field 1452, and an "orderDate" field 1454. Each record in table 1037 also includes a "shipToLocationID" field 1456, an "employeeID" field 1458, a "repID" field 1460, a "shipDate" field 1462, an "estimatedArrivalDate" field 1464, a "foremanID" field 1466, a "subContract" field 1468, a "retention" field 1470, an "equipmentQuote" field 1472, a "notes" field 1474, a "taxable" field 1476, a "resale" field 1478, a "description" field 1480, a "freight" field 1482, a "tax" field 1484, a "taxAmount" field 1486, a "subTotal" field 1490, a "total" field 1492, a "modifiedDate" field 1494, a "netSum" field 1496, a "modifiedBy" field 1498, and a "quickCut" field 1500.

The poID field 1436 is the key field of Purchase Orders table 1037 and includes data representing a unique identifier for each purchase order record stored therein. The job corresponding to a particular purchase order is stored in jobID field 1438. Additionally, purchase orders may be sorted into different categories with each category having a particular identifier. The category a particular purchase order is sorted into is stored in category field 1440, and data identifying the category is stored in categoryID field 1442. Each purchase order is given a classification which determines a purchase order's numbering sequence and maximum dollar amount. A purchase order's classification is uniquely identified by data stored in classificationID field 1444, and a reference number is given that purchase order and stored in poNumber field 1446. The status of the purchase order (e.g., draft, issued, void) is stored in status field 1448. VendorID field 1450 stores data uniquely identifying the vendor supplying the line items of a purchase order, and a contact representative of that vendor is uniquely identified by data stored in vendorContactID field 1452. The date of the purchase order is stored in orderDate field 1454, and the location the purchase order is to be shipped to is represented by identifier data stored in shipToLocationID field 1456. An employee responsible for the purchase order may be specified and is identified by the data stored in employeeID field 1458. Additionally, data identifying a representative of a vendor can be stored in repID field 1460. The ship date of the purchase order from the vendor is stored in shipDate field 1462, and its estimated arrival date at the ship location is stored in estimatedArrivalDate field 1464. An identifier identifying the foreman at the arrival location of the purchase order is stored in formanID field 1466. Any notes relating to the purchase order are stored in notes field 1474, and taxable field 1476 indicates if one or more line items of a purchase order is/are taxable. Resale field 1478 stores data indicating if the purchase order is resellable, and description field 1480 stores a written description of a purchase order record. Any freight cost incurred shipping the purchase order to the ship-to location is recorded in freight field 1482, and a tax percentage is recorded in tax field 1484 and is used to calculate a tax amount stored in taxAmount field 1486 equal to the product of the taxable dollar amount of the purchase order and the decimal value of tax field 1484. The totalAmount field 1488 stores the total cost of the purchase order (e.g., the sum of subTotal field 1490, taxAmount field 1486, and freight field 1482). SubTotal field 1490 stores the cost of the purchase order before taxes and freight costs are applied. Total field 1492 also stores the total dollar amount of the purchase order. If the purchase order is modified, the date of the most recent modification is stored in modifiedDate field 1494 and the person responsible for the modification is stored in modifiedBy field 1498.

Figure 38:
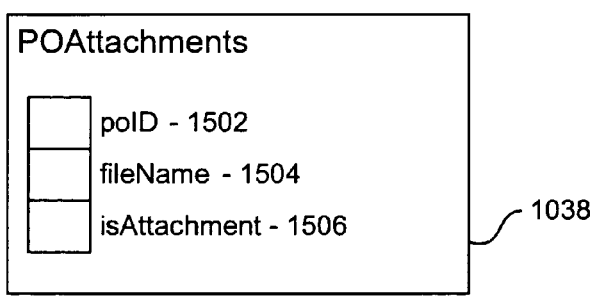
FIG. 38 shows the fields included in the PO Attachments table of FIG. 14.

FIG. 38 shows PO Attachments table 1038 in greater detail. Each record in PO Attachments table 1038 includes a "poID" field 1502, a "fileName" field 1504, and an "is Attachment" field 1506. Individual attachments correspond to a purchase order identified by the data stored in poID field 1502. The name of the attachment file corresponding to the purchase order is stored in fileName field 1504.

Figure 39:
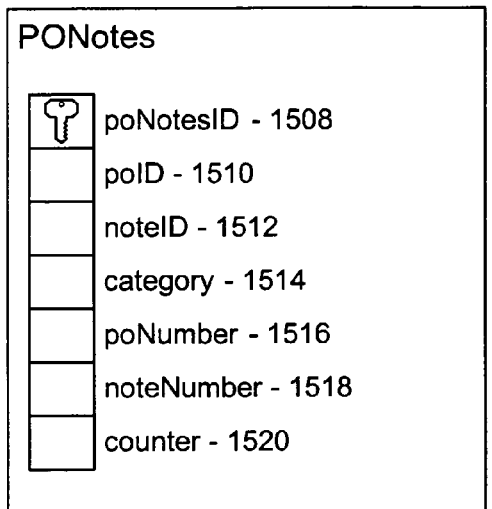
FIG. 39 shows the fields included in the PO Notes table of FIG. 14.

FIG. 39 shows PO Notes table 1039 in greater detail. Each record in PO Notes table 1039 includes a "poNotesID" field 1508, a "poID" field 1510, a "noteID" field 1512, a "category" field 1514, a "poNumber" field 1516, a "noteNumber" field 1518, and a "counter" field 1520. The poNotesID field 1508 is the key field of PO Notes table 1039 and includes data representing a unique identifier for each purchase order note record stored therein. Additionally, poID field 1510 stores data identifying a purchase order corresponding to a particular record, and noteID field 1512 stores data uniquely identifying a particular note. The category of the purchase order is stored in category field 1514, and a reference number of the purchase order, is stored in poNumber field 1516. NoteNumber field 1518 stores data identifying a reference number of a particular note.

Figure 40:
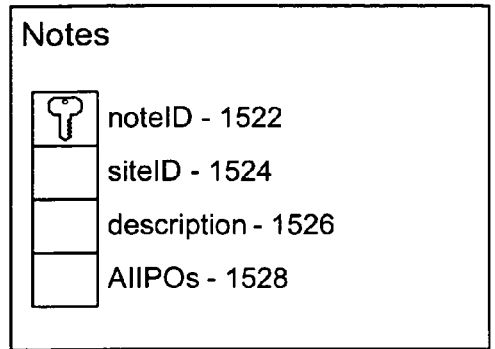
FIG. 40 shows the fields included in the Notes table of FIG. 14.

FIG. 40 shows Notes table 1040 in greater detail. Each record in Notes table 1040 includes a "noteID" field 1522, a "siteID" field 1524, a "description" field 1526, and an "AllPOs" field 1528. NoteID field 1522 is the key field of Notes table 1040 and includes data representing a unique identifier for each note stored therein. Data identifying the site the note is applied to is stored in siteID field 1524, and a description of the note is stored in description field 1526. Finally, AllPOs field 1528 stores data indicating if the note is applicable to all purchase orders.

Figure 41:
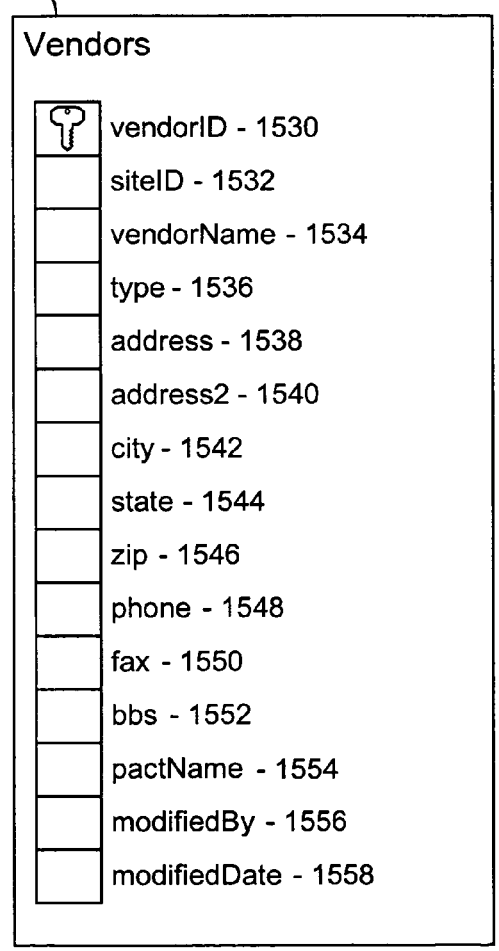
FIG. 41 shows the fields included in the Vendors table of FIG. 14.

FIG. 41 shows Vendors table 1041 in greater detail. Each record in Vendors table 1041 includes a "vendorID" field 1530, a "siteID" field 1532, a "vendorName" field 1534, a "type" field 1536, an "address" field 1538, an "address2" field 1540, a "city" field 1542, a "state" field 1544, a "zip" field 1546, a "phone" field 1548, a "fax" field 1550, a "bbs" field 1552, a "pactName" field 1554, a "modifiedBy" field 1556, and a "modifiedDate" field 1558. VendorID field 1530 is the key field of Vendors table 1041 and includes data representing a unique identifier for each vendor record stored therein. Data stored in each siteID field 1532 uniquely identifies the job site the vendor is distributing goods or services to. Additionally, the vendor's name is stored in vendorName field 1534, and type field 1536 stores data representing the type (classified by the user) of vendor. The vendor's multi-line address, including city, state and zip code are stored in address field 1538, address2 field 1540, city field 1542, state field 1544, and zip field 1546, respectively. Additionally, phone and fax numbers are stored in phone field 1548 and fax field 1550, respectively. Finally, the individual who last modified a particular vendor record is stored in modifiedBy field 1556, and the date of the modification is stored in modifiedDate field 1558.

Figure 42:
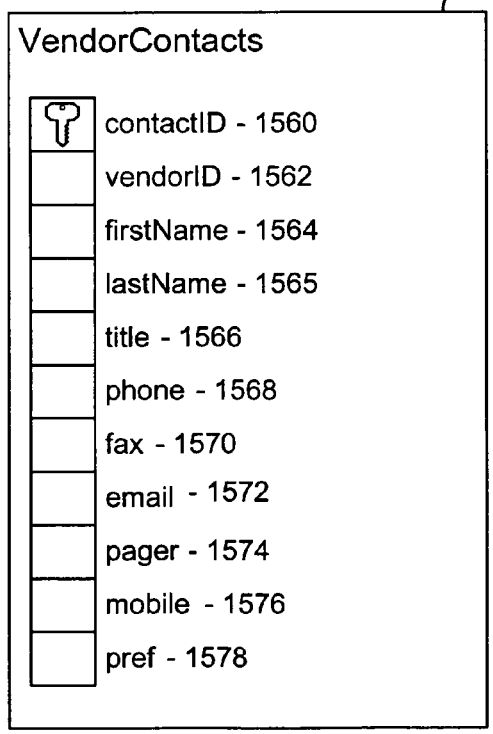
FIG. 42 shows the fields included in the Vendor Contacts table of FIG. 14.

FIG. 42 shows Vendor Contacts table 1042 in greater detail. Each record in Vendor Contacts table 1042 includes a "contactID" field 1560, a "vendorID" field 1562, a "firstName" field 1564, a "lastName" field 1565, a "title" field 1566, a "phone" field 1568, a "fax" field 1570, an "email" field 1572, a "pager" field 1574, a "mobile" field 1576, and a "pref" field 1578. ContactID field 1560 is the key field of Vendor Contacts table 1042 and includes data representing a unique identifier for each vendor contact record stored therein. VendorID field 1562 stores data identifying the vendor's contact. The contact's firstname, lastname and title are stored in firstName field 1564, lastName field 1565, and title field 1566, respectively. Additionally, the contact's phone, fax, pager, and mobile numbers are stored in phone field 1568, fax field 1570, pager field 1574, and mobile field 1576, respectively. The contact's email address is stored in email field 1574. Finally, pref field 1578 stores the preferred method of communicating with the contact.

Figure 43:
FIG. 43 shows the fields included in the Jobs table of FIG. 15.

FIG. 43 shows Jobs table 1043 in greater detail. Each record in Jobs table 1043 includes a "jobID" field 1580, a "siteID" field 1582, a "jobName" field 1584, a "description" field 1586, a "jobNumber" field 1588, an "address1" field 1590, an "address2" field 1592, a "city" field 1594, a "state" field 1596, a "zip" field 1598, a "phone" field 1600, a "fax" field 1602, an "hours" field 1604, a "scope" field 1606, a "contactArchitect" field 1608, a "contactElectrical" field 1610, a "contactGeneral" field 1612, a "contactStructural" field 1614, a "contactOther" field 1616, a "phoneArchitect" field 1618, a "phoneElectrical" field 1620, a "phoneGeneral" field 1622, a "phoneStructural" field 1624, and a "phoneOther" field 1626. Each record in table 1042 also includes a "repArchitect" field 1628, a "repElectrical" field 1630, a "repGeneral" field 1632, a "repStructural" field 1634, a "repOther" field 1636, a "detailingRequired" field 1638, a "detailingPiping" field 1640, a "detailingISO" field 1642, a "detailingSM" field 1644, a "detailingSMDL" field 1646, a "projectManagerID" field 1648, a "designerID" field 1650, a "teamLeaderID" field 1652, a "docControl" field 1654, a "validated" field 1656, a "firstInspectionPct" field 1658, a "secondInspectionPct" field 1660, a "thirdInspectionPct" field 1662, a "modifiedDate" field 1664, a "modifiedBy" field 1666, a "drawingPath" field 1668, a "jobBasePath" field 1670, a "receiptNumber" field 1672, a "certNumber" field 1674, and an "inspectionNumber" field 1676.

JobID field 1580 is the key field of Jobs table 1043 and includes data representing a unique identifier for each job record stored therein. Each record also includes siteID field 1582 storing data identifying the job sight, jobName field 1584 storing the job's name, description field 1586 storing a description of the job record, and jobNumber field 1588 storing a reference number assigned to the particular job. The address of the job having a multi-line address, city, state and zip code are stored in address1 field 1590, address2 field 1592, city field 1594, state field 1596, and zip field 1598, respectively. Additionally, the phone and fax numbers of the job site are stored in phone field 1600 and fax field 1602, respectively. Hours field 1604 stores data indicative of the number of work hours a particular job has accumulated, and scope field 1606 stores data indicating the extent or range to which a job will be performed.

Individual system information is also stored in the job records of table 1043. For architectural matters, a contact (e.g., a firm, a contractor, etc.) is stored in contactArchitect field 1608, the phone number of the contact is stored in phoneArchitect field 1618, and the representative of the contact is stored in repArchitect field 1628. The same data for electrical matters are stored in contactElectrical field 1610, phoneElectrical field 1620, and repElectrical field 1630, respectively. For general matters, the same information is stored in contactGeneral 1612, phoneGeneral field 1622, and repGeneral field 1632, respectively, and for structural matters information is stored in contactStructural field 1614, phoneStructural field 1624, and repStructural field 1634, respectively. For any other matter(s), to be determined by the user, the same information may be stored in contactOther field 1616, phone other field 1626, and repOther field 1636, respectively.

Other miscellaneous fields include designerID field 1650, which stores data uniquely identifying each designer. Each team leader is also uniquely identified by data stored in team-LeaderID field 1652. Also, firstInspectionPct field 1658, secondInspectionPct field 1660, and thirdInspectionPct field 1662 each store a value indicating what percentage of a line item requires inspection during a first, second, and third inspection, respectively. The default value is 100% of the received quantity for each inspection percentage. The most recent date a record was modified is stored in modifiedDate field 1664, and the person who modified the record is stored in modifiedBy field 1666. Furthermore, the path to the file (e.g., a CAD file) showing a job's status is stored in drawingPath field 1668, and the base or root directory in which files for a particular job are stored jobBasePath field 1670. Finally, each job record contains a certificate number and an inspection number, which are stored in certNumber field 1674 and inspectionNumber field 1676, respectively.

Figure 44:
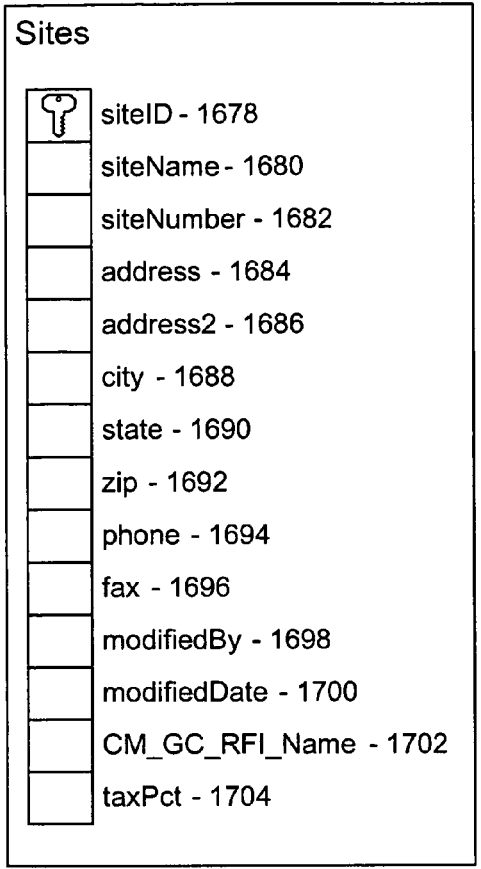
FIG. 44 shows the fields included in the Sites table of FIG. 15.

FIG. 44 shows Sites table 1044 in greater detail. Each record in Sites table 1044 includes a "siteID" field 1678, a "siteName" field 1680, a "siteNumber" field 1682, an "address" field 1684, an "address2" field 1686, a "city" field 1688, a "state" field 1690, a "zip" field 1692, a "phone" field 1694, a "fax" field 1696, a "modifiedBy" field 1698, a "modifiedDate" field 1700, a "CM_GC_RFI_Name" field 1702, and a "taxPCT" field 1704. SiteID field 1678 is the key field of Sites table 1044 and includes data representing a unique identifier for each site record stored therein. Each site's name and number are also stored for each record in table 1044 in siteName field 1680 and siteNumber field 1682, respectively. Each recorded site's multiline address, including city, state, and zip code are also stored in address field 1684, address2 field 1686, city field 1688, state field 1690, and zip field 1692. Each site's phone and fax numbers are stored in phone field 1694 and fax field 1696, respectively. Additionally, the person who made the last modification, as well as the date of the modification, are recorded in modifiedBy field 1698 and modifiedDate field 1700, respectively. Finally, taxPct field 1704 stores tax rate information for a particular site and is used as the default tax percentage in purchase orders related to that particular site.

Figure 45:
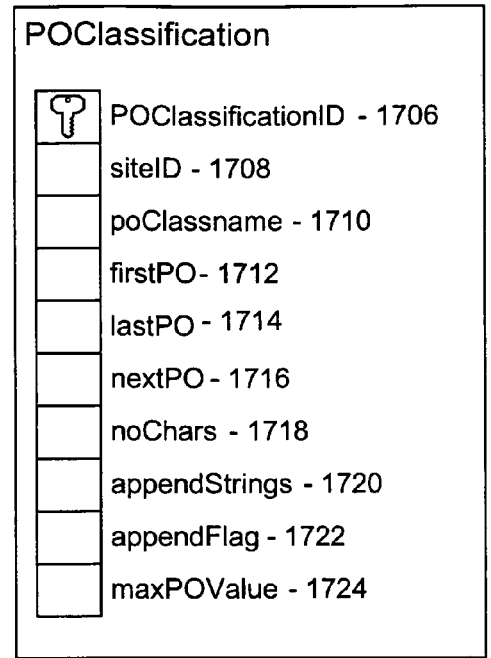
FIG. 45 shows the fields included in the PO Classifications table of FIG. 15.

FIG. 45 shows PO Classification table 1045 in greater detail. Each record in PO Classifications table 1045 includes a "POClassificationID" field 1706, a "siteID" field 1708, a "poClassname" field 1710, a "firstPO" field 1712, a "lastPO" field 1714, a "nextPO" field 1716, a "noChars" field 1718, an "appendStrings" field 1720, an "appendFlag" field 1722, and a "maxPOValue" field 1724. POClassificationID field 1706 is the key field of PO Classification table 1045 and includes data representing a unique identifier for each purchase order classification stored therein. SiteID field 1708 stores data uniquely identifying each job site, and poClassname field 1710 stores the classification name of each purchase order. FirstPO field 1712 stores pointer data to the first purchase order record of a classification, and similarly lastPO field 1714 stores pointer data to the last purchase order record of a classification, while nextPO field 1714 stores data to the next purchase order record of a classification. Finally, maxPOValue stores data setting a maximum dollar value of a purchase order classification.

Figure 46:
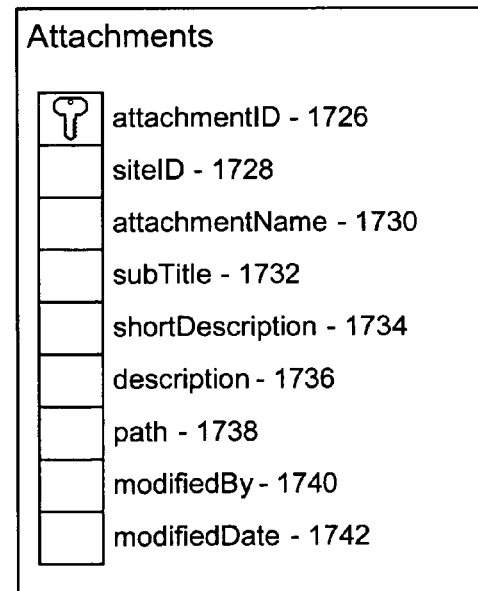
FIG. 46 shows the fields included in the Attachments table of FIG. 15.

FIG. 46 shows Attachments table 1046 in greater detail. Each record in Attachments table 1046 includes an "attachmentID" field 1726, a "siteID" field 1728, an "attachmentName" field 1730, a "subTitle" field 1732, a "shortDescription" field 1734, a "description" field 1736, a "path" field 1738, a "modifiedBy" field 1740, and a "modifiedDate" field 1742. AttachmentID field 1726 is the key field of Attachments table 1046 and includes data representing a unique identifier for each attachment record stored therein. Again, siteID field 1728 uniquely identifies a job site associated with a particular attachment record. Additionally, the attachment's title is stored in the attachmentName field 1730 and must be unique, while the attachment's sub-title, which contains additional title information, is stored in subTitle field 1732. An abbreviated description of the attachment can be optionally stored in shortDescription field 1734, while a longer description can be optionally stored in description field 1736. Data indicative of the file path to the directory where the attachment is located is stored in path field 1738. Finally, the last person to modify the attachment, as well as, the date the attachment was modified are stored in modifiedBy field 1740 and modifiedDate field 1742, respectively.

Figure 47:
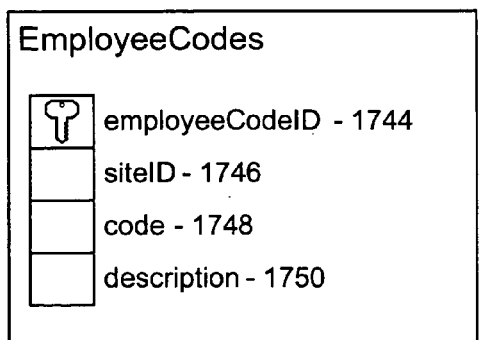
FIG. 47 shows the fields included in the Employee Codes table of FIG. 15.

FIG. 47 shows Employee Codes table 1047 in greater detail. Each record in Employee Codes table 1047 includes an "employeeCodeID" field 1744, a "siteID" field 1746, a "code" field 1748, and a "description" field 1750. EmployeeCodeID field 1744 is the key field of Employee Codes table 1047 and includes data representing a unique identifier for each employee code record stored therein. Particular job sites are identified by data stored in siteID field 1746, while particular employee codes are stored in code field 1748. Finally, a description of the employee code is stored in description field 1750.

Figure 48:
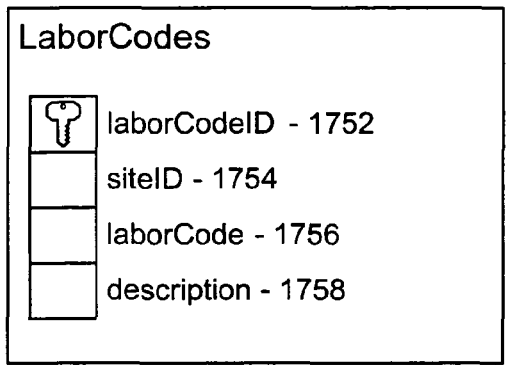
FIG. 48 shows the fields included in the Labor Codes table of FIG. 15.

FIG. 48 shows Labor Codes table 1048 in greater detail. Each record in Labor Codes table 1048 includes a "laborCodeID" field 1752, a "siteID" field 1754, a "laborCode" field 1756, and a "description" field 1758. LaborCodeID field 1752 is the key field of Labor Codes table 1048 and includes data representing a unique identifier for each labor code record stored therein. Particular job sites are uniquely identified by data stored in siteID field 1754, and laborCode field 1756 stores individual labor codes. Finally, a description of a particular labor code is stored in description field 1758.

Figure 49:
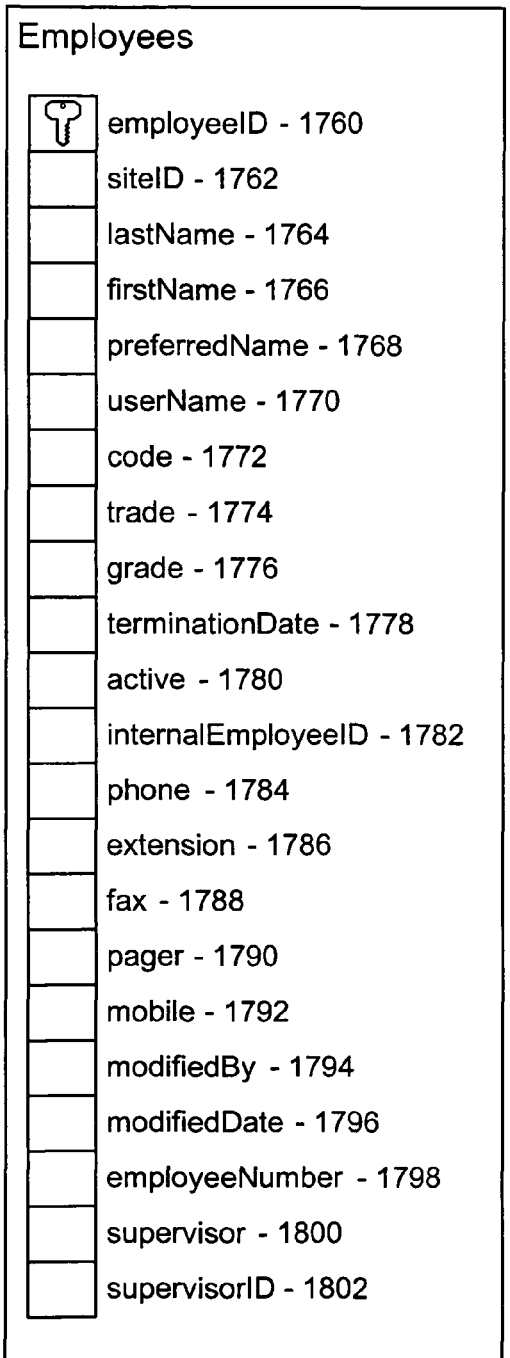
FIG. 49 shows the fields included in the Employees table of FIG. 15.

FIG. 49 shows Employees table 1049 in greater detail. Each record in Employees table 1049 includes an "employeeID" field 1760, a "siteID" field 1762, a "lastName" field 1764, a "firstName" field 1766, a "preferredName" field 1768, a "userName" field 1770, a "code" field 1772, a "trade" field 1774, a "grade" field 1776, a "terminationdate" field 1778, an "active" field 1780, a "internalEmployeeID" field 1782, a "phone" field 1784, an "extension" field 1786, a "fax" field 1788, a "pager" field 1790, a "mobile" field 1792, a "modifiedBy" field 1794, a "modifiedDate" field 1796, an "employeeNumber" field 1798, a "supervisor" field 1800, and a "supervisorID" field 1802.

EmployeeID field 1760 is the key field of Employees table 1049 and includes data representing a unique identifier for each employee stored therein. Particular job sites are uniquely identified by siteID field 1762. Personal information about the each employee, including their lastname, firstname, preferred name, and username are stored in lastName field 1764, firstName field 1766, preferredName field 1768, and userName field 1770, respectively. Additionally, the employee code of each employee is stored in code field 1772, their trade stored in trade field 1774, and their pay grade stored in grade field 1776. If an employee has been previously terminated, their termination date will be stored in terminationDate field 1778. If the employee is still employed, active field 1780 will indicate if that employee is active for work. If the employee is assigned an internal employee identification number by the company he/she works for, this number is stored in internalEmployeeID field 1782. Additionally, contact information for an employee, including phone number, extension, fax number, pager number, and mobile number are stored in phone field 1784, extension field 1786, fax field 1788, pager field 1790, and mobile field 1792, respectively. Furthermore, the person who made the most recent changes to an employee's record, as well as the date of the changes, are recorded in modifiedBy field 1794 and modifiedDate field 1796, respectively. An employee number is also assigned to each employee and is stored in employeeNumber field 1798. Finally, each employee's supervisor's name and that supervisor's identification number are stored in supervisor field 1800 and supervisorID field 1802.

FIG. 50 shows Transmittal table 1050 in greater detail. Each record in Transmittal table 50 includes a "transID" field 1804, an "employeeID" field 1806, a "toCompanyID" field 1808, a "toAttnID" field 1810, a "trandate" field 1812, a "jobID" field 1814, a "jobName" field 1816, a "subject1" field 1818, a "subject2" field 1820, a "herewith" field 1822, an "asRequested" field 1824, a "prints" field 1826, a "showDrawing" field 1828, a "specifications" field 1830, a "brochurs" field 1832, a "letter" field 1834, a "submittalData" field 1836, a "review" field 1838, an "approval" field 1840, a "yourFiles" field 1842, a "correction" field 1844, and a "signature" field 1846. Each record in Transmittal table 1050 also includes a "yourAction" field 1848, a "submittalOfPrice" field 1850, a "yourReply" field 1852, a "regularMail" field 1854, an "approved" field 1856, a "notApproved" field 1858, a "handDelivery" field 1860, a "proceedAsIndicated" field 1862, a "resubmit" field 1864, a "sendingOther" field 1866, a "forOther" field 1868, a "byOther" field 1870, a "submit" field 1872, a "forOtherString" field 1874, a "byOtherString" field 1876, a "sendingOtherString" field 1878, a "byNote" field 1880, a "byNoteString" field 1882, a "remark" field 1884, and a "transNumber" field 1886.

TransID field 1804 is the key field of Transmittal table 1050 and includes data representing a unique identifier for each transmittal record stored therein, and employeeID field 1806 identifies which employee is sending the transmittal. The company receiving the transmittal is uniquely identified by the data stored in toCompanyID 1808, and the person within that company receiving the transmittal is uniquely identified by toAttnID field 1810. The date of each transmittal record is stored in tranDate field 1812. Additionally, the job site and name from which the transmittal is originating are identified by jobID field 1814 and jobName field 1816, respectively. Each transmittal can contain a multi-line subject description, which is stored in subject1 field 1818 and subject2 field 1820. Finally, remark field 1884 stores any remarks or comments meant to accompany the transmittal when sent, and transNumber field 1886 stores data representing a reference number given a particular transmittal record.

"Sending" check fields of the transmittal include herewith field 1822 indicates an item is sent with the transmittal, and asRequested field 1824 indicates if the item is being set due to a request. Prints field 1826 indicates if prints are being sent with the transmittal, and showDrawing field 1830 indicates a show drawing is being sent. Specifications field 1830 indicates is a specification is being sent, brochurs field 1832 a brochure is being sent, letter field 1834 indicates a letter is being sent, and submittalData field 1836 indicates that submittal data is being sent. SendingOther field 1866, indicates that an item other than those listed in "sending" check fields is included with the transmittal, and sendingotherString field 1878 stores data for a description of the "other" item.

"For" check fields of the transmittal include review field 1838 indicating the sent item is for review, approval field 1840 indicates the sent item is for approval, yourFiles field 1842 indicates the item is for the receiver's files, correction field 1844 indicates the item is transmitted for correction, signature field 1846 indicates the item needs to be signed, YourAction field 1848 indicates the item is for the receiver's action, submittalOfPrice field 1850 indicates the transmitted item is a Submittal for price, and yourReply field 1852 stores indicates a reply is needed. ForOther field 1868 indicates if a miscellaneous "for" item is included in the transmission, and forOtherString field 1874 allows the sender of the transmittal to enter a description of that "for" item.

"By" check fields indicate methods of delivery of the transmittal and item(s) attached thereto. RegularMail field 1854 indicates that a transmittal was sent by regular mail (e.g., via the U.S. post office). HandDelivery field 1860 indicates if a transmittal was hand delivered to the recipient. ByOther field 1870 stores data indicating if the transmittal was sent via unconventional methods (e.g., any method besides regular mail or hand delivery), and byOtherString field 1878 stores a description the unconventional method used. Finally, byNote field 1880 stores data indicating a note is associated with a the By field, and byNoteString field 1882 stores a description of the "by" field note.

"Note" check fields identify some common notes associated with transmittals. Approved field 1856 and notApproved field 1858 store data indicating whether or not an item is approved, proceedAsIndicated field 1862 indicates the receiver should proceed as indicated (possibly in the remarks field), resubmit field 1864 indicates that the item attached to the transmittal needs to be resubmitted (possibly for approval), submit field 1872 stores data indicating to submit the item.

Figure 51:
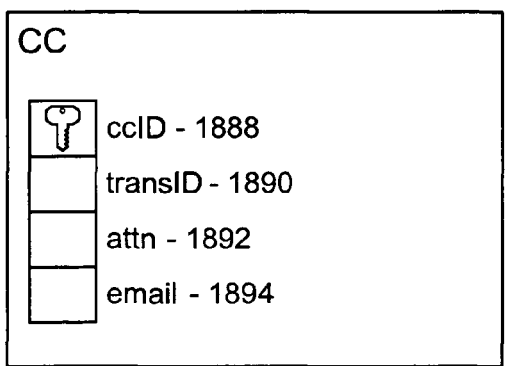
FIG. 51 shows the fields included in the CC table of FIG. 15.

FIG. 51 shows CC table 1051 in greater detail. Each record in CC table 1051 includes a "ccID" field 1888, a "transID" field 1890, an "attn" field 1892, and an "email" field 1894. CCID field 1888 is the key field of CC table 1051 and includes data representing a unique identifier for each carbon-copy record stored therein. Additionally, data uniquely identifying a transmittal is stored in each transID field 1890, and attn field 1892 stores data indicating who the copy is going to. Finally, email field 1894 stores an email address of the intended recipient of the transmittal.

Figure 52:
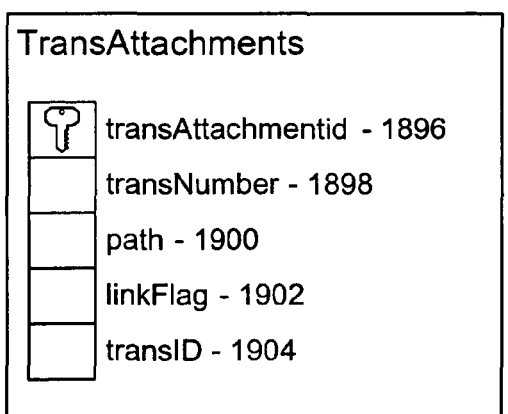
FIG. 52 shows the fields included in the Transmittal Attachments table of FIG. 15.

FIG. 52 shows Transmittal Attachments table 1052 in greater detail. Each record in Transmittal Attachments table 1052 includes a "transAttachmentID" field 1896, a "transNumber" field 1898, a "path" field 1900, a "linkFlag" field 1902, and a "transID" field 1904. TransAttachmentID field 1896 is the key field of Transmittal Attachments table 1052 and includes data representing a unique identifier for each transmittal attachment record stored therein. A transmittal reference number for a record is stored in transNumber field 1898, and data indicating a file path to the directory where the attachment is located is stored in path field 1900. Additionally, linkFlag field 1902 indicates that additional files that are not part of a transmittal are linked to the transmittal record. Finally, a transmittal associated with the attachment is uniquely identified by the data stored in transID field 1904.

Figure 53:
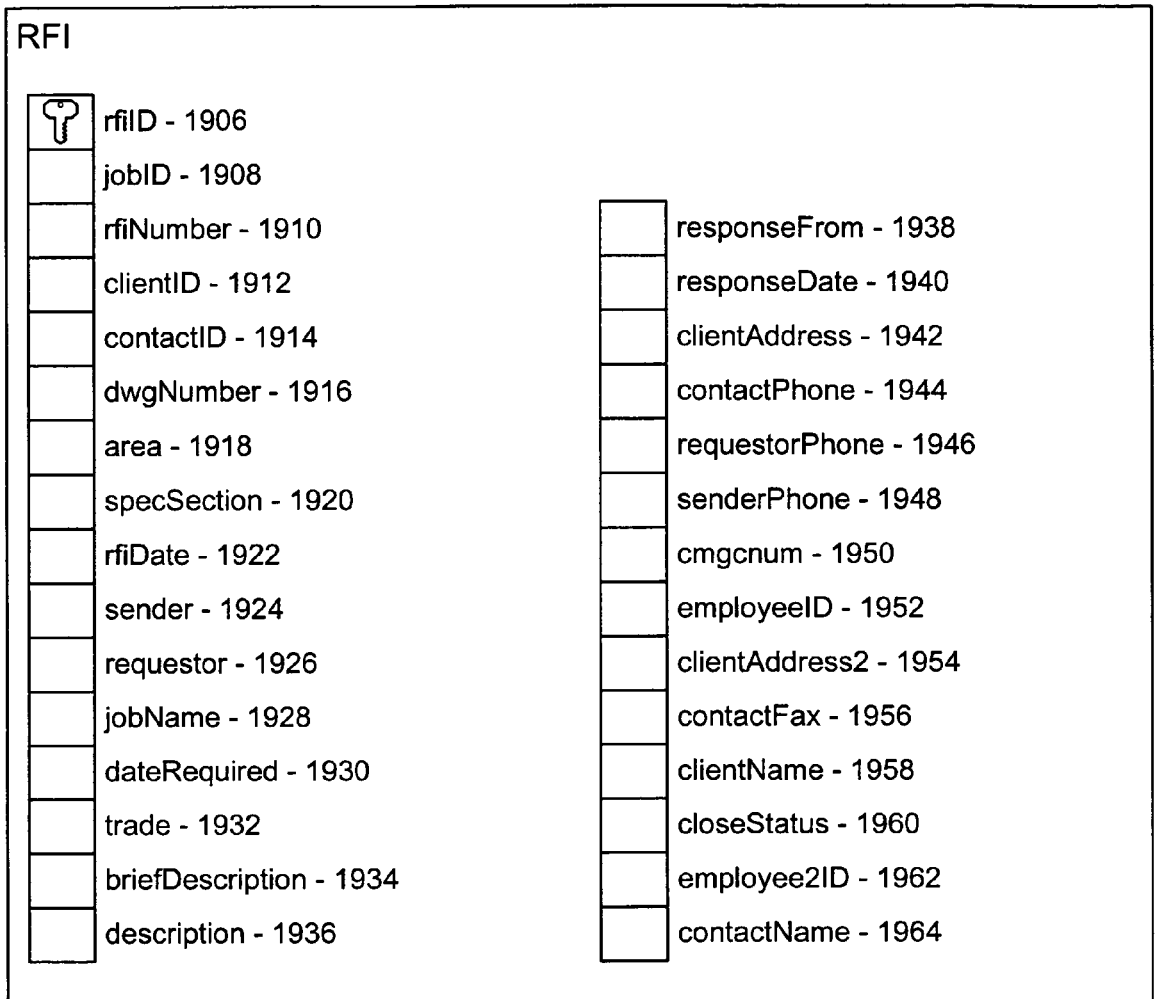
FIG. 53 shows the fields included in the RFI table of FIG. 15.

FIG. 53 shows Requests For Information (RFI) table 1053 in greater detail. Each record in RFI table 1053 includes an "RFIID" field 1906, a "jobID" field 1908, an "rfiNumber" field 1910, a "clientID" field 1912, a "contactID" field 1914, a "dwgNumber" field 1916, an "area" field 1918, a "specSection" field 1920, an "rfiDate" field 1922, a "sender" field 1924, a "requester" field 1926, a "jobName" field 1928, a "dateRequired" field 1930, a "trade" field 1932, a "briefdescription" field 1934, and a "description" field 1936. Each record of RFI table 1053 also includes a "responseForm" field 1938, a "responseDate" field 1940, a "clientAddress" field 1942, a "contactPhone" field 1944, a "requestorPhone" field 1946, a "senderPhone" field 1948, a "cmgcnum" field 1950, an "employeeID" field 1952, a "clientAddress2" field 1954, a "contactFax" field 1956, a "clientName" field 1958, a "closeStatus" field 1960, an "employee2ID" field 1962, and a "contactName" field 1964.

The key field of RFI table 1053 is rfiID field 1906, which includes data representing a unique identifier for each RFI record stored therein. The job associated with each RFI record is uniquely identified by the data stored in jobID field 1908. Additionally, each RFI item is identified by a particular reference number stored in rfiNumber field 1910. The client associated with each RFI item is uniquely identified by the data stored in clientID field 1912, and the contact associated with that client is uniquely identified by the data stored in contactID field 1914. The date that an RFI item was created is stored in rfiDate field 1922. Information indicative of the individual sending the request for information is stored in sender field 1924, and information indicative of the individual requesting the information is stored in requestor field 1926. JobName field 1928 stores the name of the job site associated with the RFI, and dateRequired field 1930 stores the date that the information must be received by. Trade field 1932 stores data indicative of the trade of the employee uniquely indicated by the data stored in employeeID field 1952. A short description of the RFI can be stored in briefdescription field 1934, while a more detailed, longer description of the RFI can be stored in description field 1936. ResponseFrom field 1938 stores data indicative of the individual that responded to the RFI, and responseDate field 1940 stores the date the response to the RFI was received by the requestor. The address of the client receiving the RFI and the phone number of the contact there are stored in clientAddress field 1942 and clientAddress2 field 1954, and contactPhone field 1944 respectively. The contact's fax number is stored in contactFax field 1956. The phone number of the individual making the request for information is stored in requestorPhone field 1946, while the phone number of the individual sending the RFI is stored in senderPhone field 1948. Additionally, the client's name is stored in clientName field 1958, and the contact's name is stored in contactName field 1964. CloseStatus field 1960 stores data indicative of the status (draft, issued, closed, etc.) of the RFI. Finally, employee2ID field 1962 stores data indicative of a second employee involved in the RFI.

Figure 54:
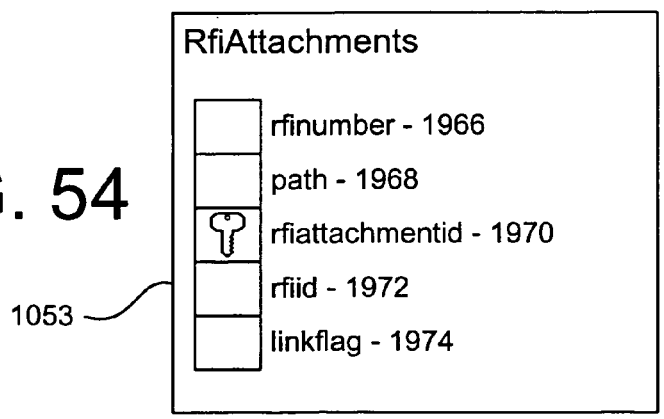
FIG. 54 shows the fields included in the RFI Attachments table of FIG. 15.

FIG. 54 shows RFI Attachments table 1054 in greater detail. Each record in RFI Attachments table 1054 includes an "rfiNumber" field 1966, a "path" field 1968, an "rfiAttachmentID" field 1970, an "rfiID" field 1972, and a "linkFlag" field 1974. The rfiAttachmentID field 1970 is the key field of RFI Attachments table 1054 and includes data representing a unique identifier for each RFI attachment record stored therein. The file path to the directory where a particular record's attachment is located is stored in path field 1968, while a reference number assigned to the RFI is stored in rfiNumber field 1966. Additionally, an RFI associated with a particular attachment is uniquely identified by data stored in rfiID field 1972. Finally, linkFlag field 1974 indicates that files are attached to the RFI record that aren't included in the RFI.

Figure 55:
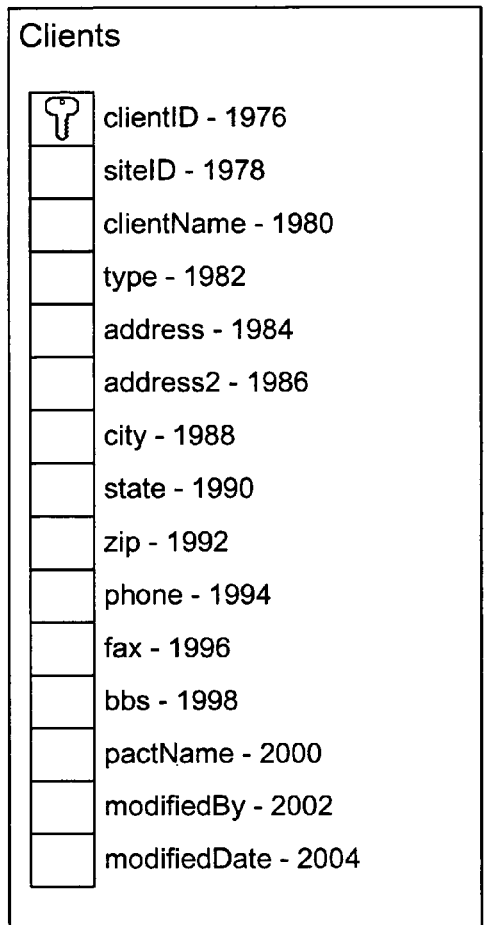
FIG. 55 shows the fields included in the Clients table of FIG. 15.

FIG. 55 shows Clients table 1055 in greater detail. Each record in Clients table 1055 includes a "clientID" field 1976, a "siteID" field 1978, a "clientName" field 1980, a "type" field 1982, an "address" field 1984, an "address2" field 1986, a "city" field 1988, a "state" field 1990, a "zip" field 1992, a "phone" field 1994, a "fax" field 1996, a "bbs" field 1998, a "pactName" field 2000, a "modifiedBy" field 2002, and a "modifiedDate" field 2004. ClientID field 1976 is the key field of Clients table 1055 and includes data representing a unique identifier for each client record stored therein. A job site associated with the client is uniquely identified by data stored in siteID field 1978. Additionally, the clients name and type are stored in clientName field 1980 and type field 1982, respectively. The clients multi-line address, including city, state, and zip code is also stored in address field 1984, address2 field 1986, city field 1988, state field 1990, and zip field 1992, respectively. The phone number and fax number of the client are stored in phone field 1994 and fax field 1996, respectively. Finally, the person making the last modification to a client record, and the date thereof, are stored in modifiedBy field 2002 and modifiedDate field 2004, respectively.

Figure 56:
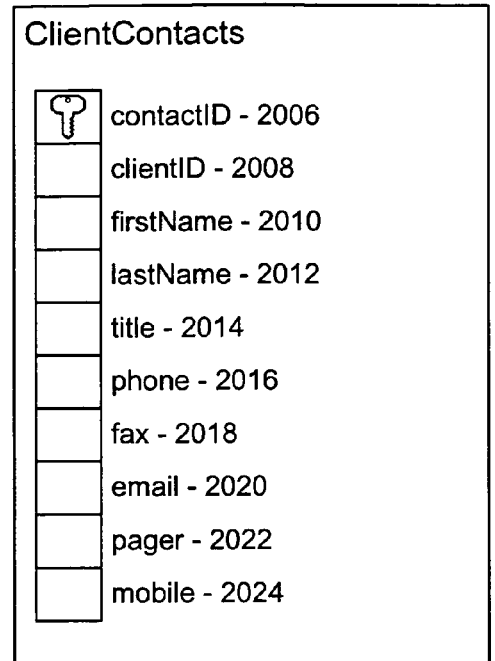
FIG. 56 shows the fields included in the Client Contacts table of FIG. 15.

FIG. 56 shows Client Contacts table 1056 in greater detail. Each record in Client Contacts table 1056 includes a "contactID" field 2006, a "clientID" field 2008, a "firstName" field 2010, a "lastName" field 2012, a "title" field 2014, a "phone" field 2016, a "fax" field 2018, an "email" field 2020, a "pager" field 2022, and a "mobile" field 2024. ContactsID field 2006 is the key field of Client Contacts table 1056 and includes data representing a unique identifier for each client contact record stored therein. Each record includes clientID field 2008 uniquely identifying a particular client. The client's firstname, lastname, and title are stored in firstName field 2010, lastName field 2012, and title field 2014, respectively. Additionally, the clients phone number, fax number, email address, pager number, and mobile phone number are stored in phone field 2016, fax field 2018, email field 2020, pager field 2022, and mobile field 2024, respectively.

Figure 57:
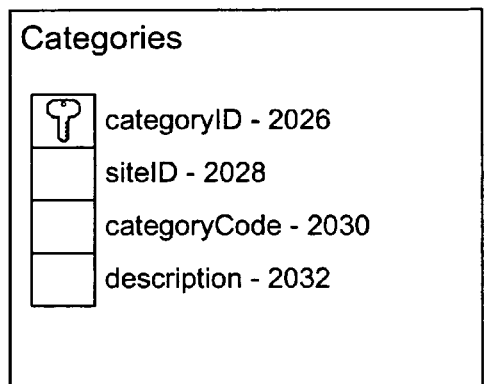
FIG. 57 shows the fields included in the Categories table of FIG. 15.

FIG. 57 shows Categories table 1057 in greater detail. Each record in Categories table 1057 includes a "categoryID" field 2026, a "siteID" field 2028, a "categorycode" field 2030, and a "description" field 2032. CategoryID field 2026 is the key field of Categories table 1057 and includes data representing a unique identifier for each category record stored therein. A particular job site is uniquely identified in each record by siteID field 2028. Additionally, a category code representing a particular category and that categories description are stored in categoryCode field 2030 and description field 2032, respectively.

Figure 58:
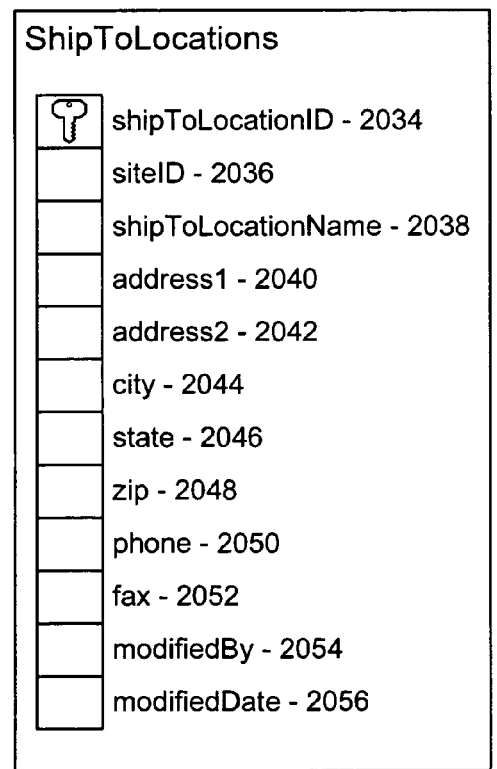
FIG. 58 shows the fields included in the Ship To Locations table of FIG. 15.

FIG. 58 shows Ship To Locations table 1058 in greater detail. Each record in Ship To Locations table 1058 includes a "shipToLocationID" field 2034, a "siteID" field 2036, a "shipToLocationName" field 2038, an "address1" field 2040, an "address2" field 2042, a "city" field 2044, a "state" field 2046, a "zip" field 2048, a "phone" field 2050, a "fax" field 2052, a "modifiedBy" field 2054, an a "modifiedDate" field 2056. ShipToLocationID field 2034 is the key field of Ship To Locations table 1058 and includes data representing a unique identifier for each shipping location record of table 1058. A particular job site is uniquely identified in each record by siteID field 2036. Additionally, the name of the each shipping location is stored in shipToLocationName field 2038. The multi-line address of the location, including city, state and zip code are stored in address1 field 2040 and address2 field 2042, city field 2044, state field 2046, and zip field 2048, respectively. The phone and fax numbers of the location are stored in phone field 2050 and fax field 2052. Finally, the person that modified the record and the date that the ship to location record was modified are stored in modifiedBy field 2054 and modifiedDate field 2056, respectively.

Figure 59:
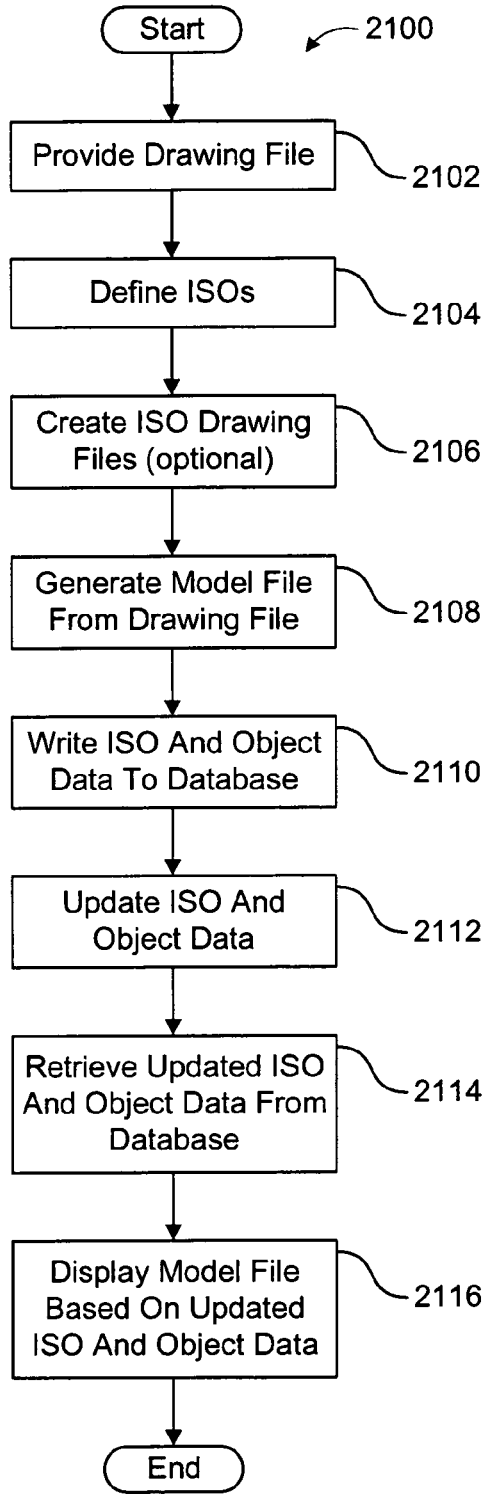
FIG. 59 is a flow chart summarizing one particular method of managing a construction project according to the present invention.

FIG. 59 is a flow chart 2100 summarizing one particular method of managing a construction project according to the present invention. In a first step 2102, a drawing file corresponding to the construction project is provided. Then, in a second step 2104, groups of objects within the drawing file (ISOs) are defined to correspond to components of the construction project. Next, in a third step 2106, a drawing file is created for each defined ISO. Then, in a fourth step 2108, a model file is generated from the drawing file, and in a fifth step 1210 data associated with the ISOs and objects of the drawing and/or model files is written to a database. Next, in a sixth step 2112, the ISO and object data in the data base is updated. Then, in a seventh step 2114, the updated ISO and/or object data is retrieved from the database, and in an eighth step 2116 the model file is displayed based on the updated ISO and/or object data. Then, method 2100 ends.

Figure 60:
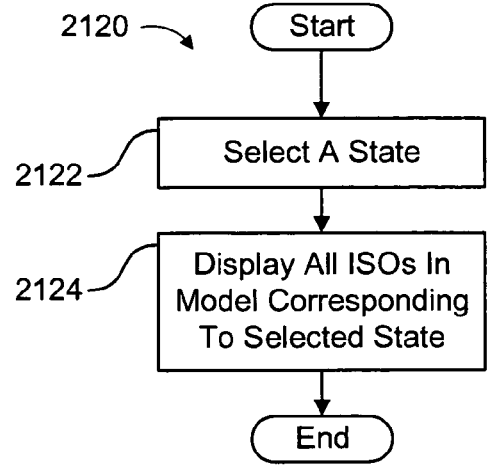
FIG. 60 is a flow chart summarizing one particular method of performing the eighth step (display model file) of the method of FIG. 59.

FIG. 60 is a flow chart summarizing one particular method 2120 of performing eighth step 2116 (display model file) of method 2100. In a first step 2122, a particular state is selected. Then, in a second step 2124 only those ISOs of the model file corresponding to the selected state are displayed. Then, method 2120 ends.

Figure 61:
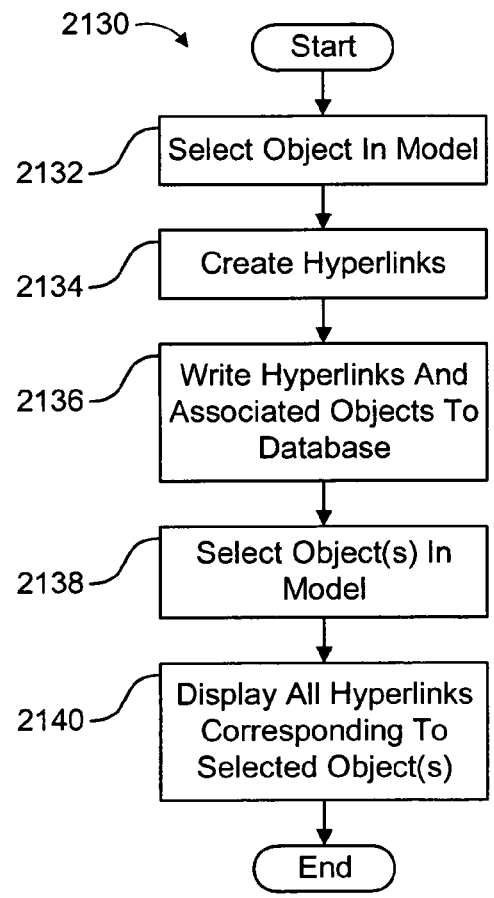
FIG. 61 is a flow chart summarizing one particular method of performing fifth step (write object data) and eighth step (display model file) of the method of FIG. 59.

FIG. 61 is a flow chart summarizing one particular method 2130 of performing fifth step 2110 (write data to database) and eighth step 2116 (display model file) of method 2100. In a first step 2132, an object is selected from the model file. Then, in a second step 2134, at least one hyperlink is created. In a third step 2136, a record associating the selected object and the hyperlink are written to a database. Next, in a fourth step 2138, an object is again selected from the model file. Then, in a fifth step 2140, the database is queried and all hyperlinks associated with the selected object are displayed. Then method 2130 ends.

Figure 62:
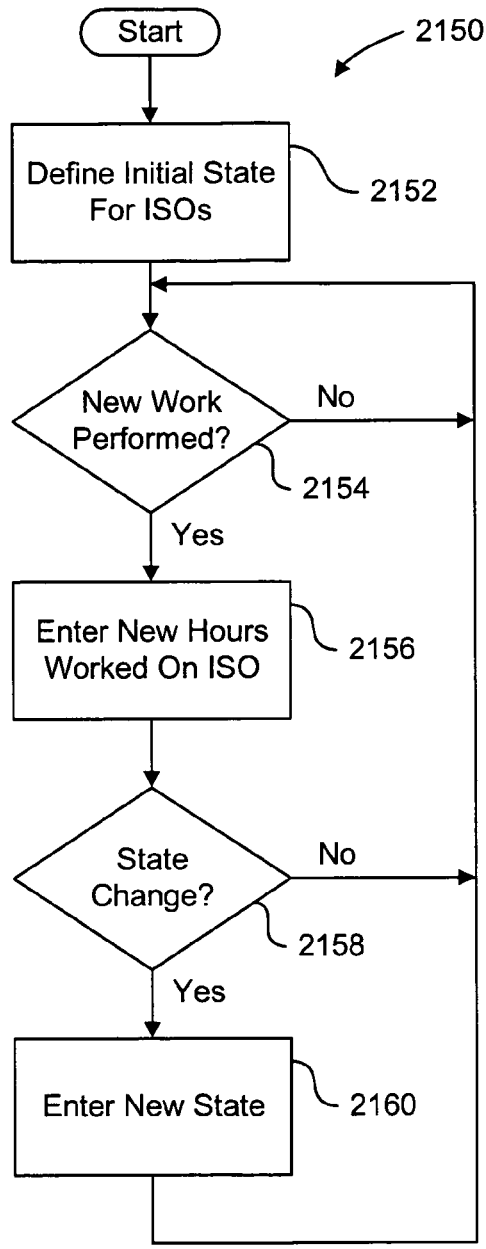
FIG. 62 is a flow chart summarizing one particular method of performing sixth step (update ISO and object data) of the method of FIG. 59.

FIG. 62 is a flow chart summarizing one particular method 2150 of performing sixth step 2112 (update ISO and object data) of method 2100 of FIG. 59. In a first step 2152, initial states are defined for the ISOs defined for a job. Then, in a second step 2154, it is determined whether any new work has been performed on any of the components of the construction project. If not, second step 2154 repeats until it is determined that new work has been performed on a component. Then, in a third step 2156, the amount of new work performed (e.g., a number of hours) is associated with the ISO corresponding to the component upon which the work was performed by writing a record to the database. Next, in a fourth step 2158 it is determined whether the work performed on the component resulted in a change in the state of the component (e.g., installation complete). If not, then method 2150 returns to second step 2154 until more work is performed on a component. If, however, a change in state has occurred, then in a fifth step 2160, a record is entered in the database associating an identifier of the component with the new state. Then, method 2150 returns to second step 2154 until more work is performed on a component.

Figure 63:
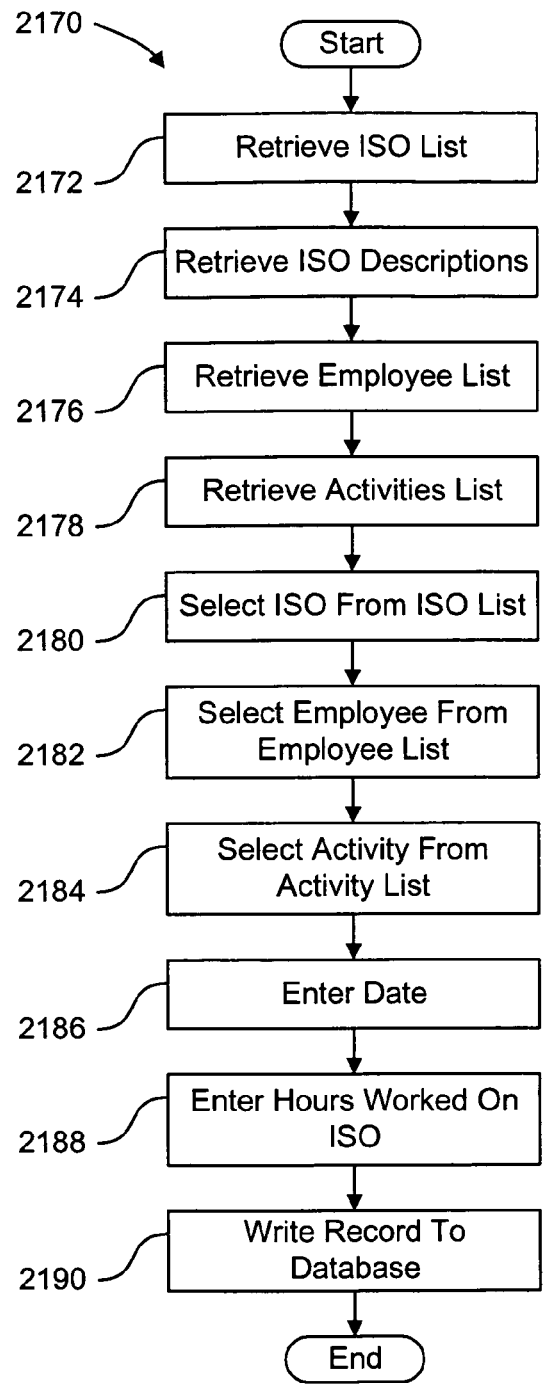
FIG. 63 is a flow chart summarizing one particular method of performing third step (enter new hours) of the method of FIG. 62.

FIG. 63 is a flow chart summarizing one particular method 2170 of performing third step 2156 (enter new hours) of method 2150 of FIG. 62. In a first step 2172, a list of component identifiers (ISOs) is retrieved. In a second step 2174, a list of descriptions associated with the ISOs in the ISO list is retrieved. Then, in a third step 2176, an employee list is retrieved. Next, in a fourth step 2178, an activities (e.g., labor codes and/or descriptions) list is retrieved.

The retrieved lists are then used to enter new hours. In a fifth step 2180, an ISO corresponding to a component of a construction project is selected from the ISO list. Then, in a sixth step 2182, an employee who has performed work on the component associated with the selected ISO is selected from the employee list. Next, in a seventh step 2184 an activity which the employee has performed on the component is selected from the activity list. Then, in an eighth step 2186 a date is entered, and in a ninth step 2188 a number of hours worked on the component by the employee is entered. Finally, in a tenth step 2190, a record is written to the database associating the selected ISO, the selected, employee, the selected activity, the entered date, and the entered number of hours. Then, method 2170 ends.

Figure 64:
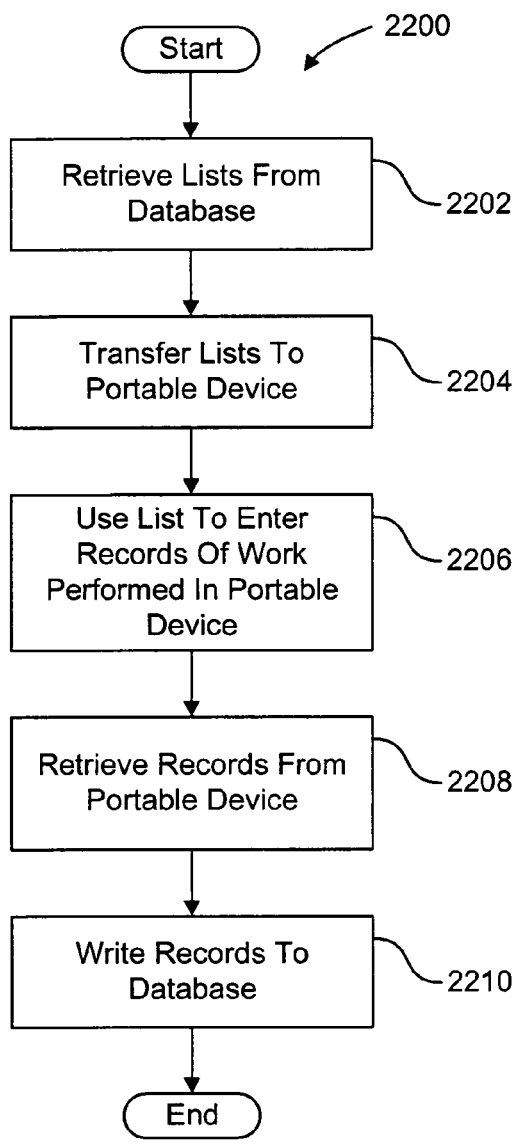
FIG. 64 is a flow chart summarizing another particular method of performing third step (enter new hours) of the method of FIG. 62.

FIG. 64 is a flow chart summarizing another particular method 2200 of performing third step 2156 (enter new hours) of method 2150 of FIG. 62. In a first step 2202, one or more lists are retrieved from a database. Then, in a second step 2204, the lists are transferred to a portable device. Next, in a third step 2206, the list are used to enter records of work performed into the portable device. Then, in a fourth step 2208, the entered records are retrieved from the portable device. Finally, in a fifth step 2210, the retrieved records are written to the database.

Figure 65:
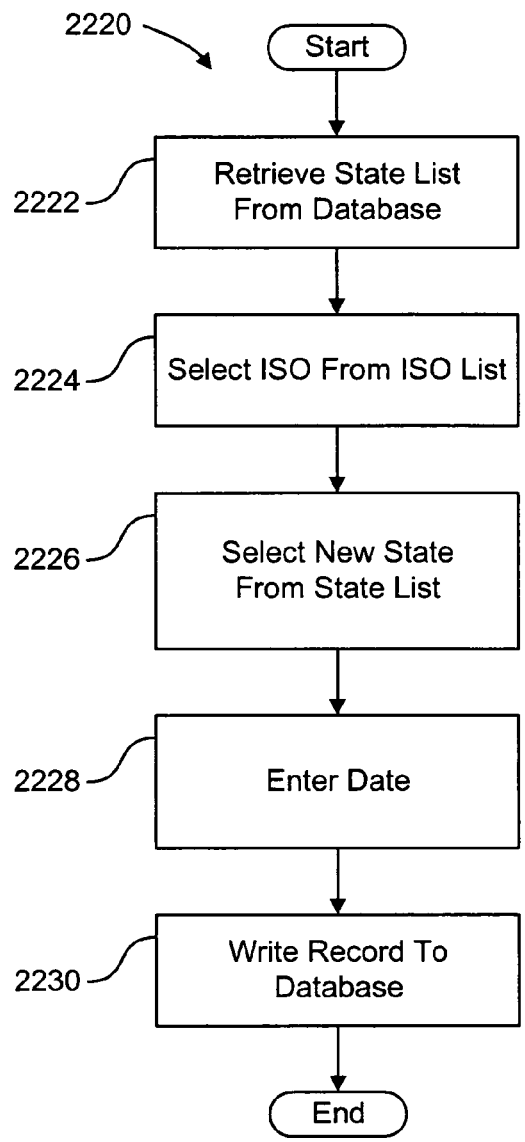
FIG. 65 is a flow chart summarizing one particular method of performing fifth step (enter new state) of the method of FIG. 62.

FIG. 65 is a flow chart summarizing one particular method 2220 of performing fifth step 2160 (enter new state) of method 2150 of FIG. 62. In a first step, 2222, a list of valid states is retrieved from a database. Next, in a second step 2224, an identifier (ISO) corresponding to the component whose state is to be updated is selected from a list of valid ISOs. Then, in a third step 2226, a state corresponding to the new state of the component is selected from the retrieved state list. In a fourth step 2228, a date value indicative of the date that the state of the component changed is entered. Then, in a fifth step 2230, a record associating the selected ISO, the selected state, and the entered date is written to the database, and method 220 ends.

In the foregoing descriptions of the flow charts are by way of example. It should be understood that many of the steps are optional, even if not explicitly so labeled. Therefore, unless explicitly stated, the individual steps of the described methods are not considered to be essential elements of the present invention. Further, it should be understood that the particular order of steps shown may in many cases be altered, without undermining the usefulness of the particular method. Therefore, unless explicitly stated, the particular order of steps shown should not be considered an essential element of the present invention.

Figure 66:
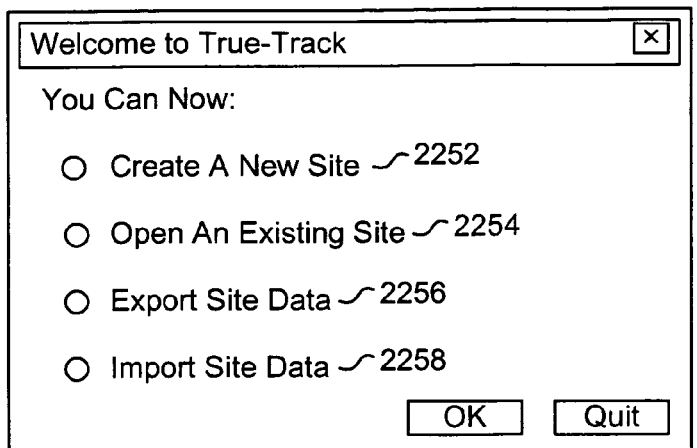
FIG. 66 shows portion of a graphical user interface of the present invention.

FIGS. 66-87 show components of a graphical user interface such as might be implemented as a part of user interface 344. FIG. 66 shows a screen 225 that is displayed to a user when the system is initially launched. Screen 2250 presents four choices to a user, who can provide input indicative of a selection via a pointing device, or the like. The selections include "Create A New Site" 2252, "Open An Existing Site" 2254, "Export Site Data" 2256, and "Import Site Data" 2258.

Responsive to the user selecting "Create A New Site" 2252, user interface 344 will either assign or solicit from the user a new, unique site ID for the new site, and presents a "Site Information" screen (FIG. 68) to solicit information about the new site from the user. Then, the new site data is written to database 136. If "Open An Existing Site" 2254 is selected, user interface solicits a site identifier from the user by, for example, presenting a list of site identifiers and associated descriptions from which the user can choose. Responsive to the user selecting "Export Site Data" 2256, user interface 344 solicits a site selection from the user and calls a routine that makes a copy of some or all of the records associated with the selected site for export. Responsive to the user selecting "Import Site Data" 2258, user interface 344 copes the records being imported to database 136.

Figure 67:
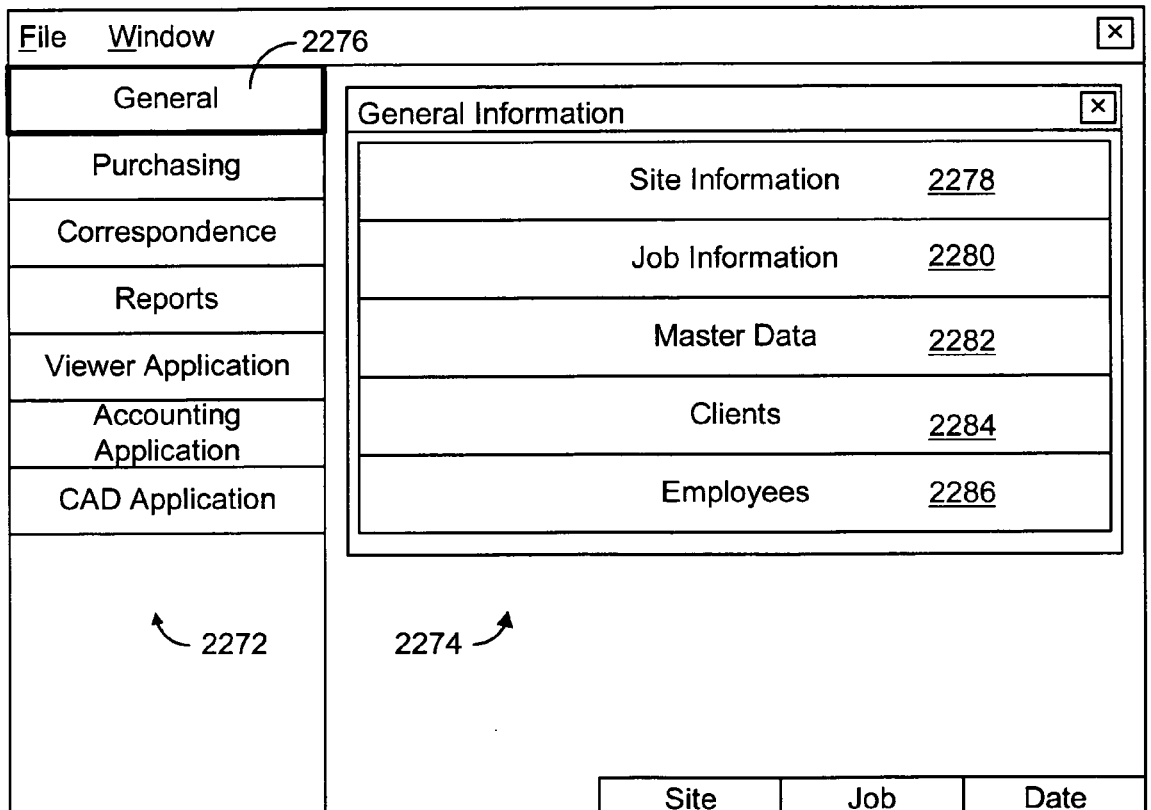
FIG. 67 shows another portion of a graphical user interface of the present invention.

FIG. 67 shows a general navigation screen 2270 that provides high level navigation through the graphical user interface of interface 344, once a particular site is open. The left side 2272 of screen 2270 displays a list of the groups of data input/retrieval screens that are available in user interface 344. When one of the groups is selected, the right side 2274 of screen 2270 displays a list of the particular screens that are included in the selected group. For example, in FIG. 67 the "General" group 2276 is selected (selection indicated by bold outline), and the right side 2274 of screen 2270 displays a list of the screens that are included in the "General" 2276 group. These screens include "Site Information" 2278, "Job Information" 2280, "Master Data" 2282, "Clients" 2284, and "Employees" 2286.

FIG. 68 shows a site information form 2290 that is displayed by user interface 344 when a user selects "Site Information" 2278 from screen 2270 (FIG. 67). Site information form 2290 includes a site name field 2292, an address field 2294, an address2 field 2296, a city field 2298, a state field 2300, a zip field 2302, a phone field 2304, and a fax field 2306. When site information form 2290 is opened, user interface 344 populates the fields of the form with data retrieved from sites table 1044 (FIG. 44). The user can then modify the data by typing in the fields, and can save the new data to database 136 by selecting save 2308.

Figure 69:
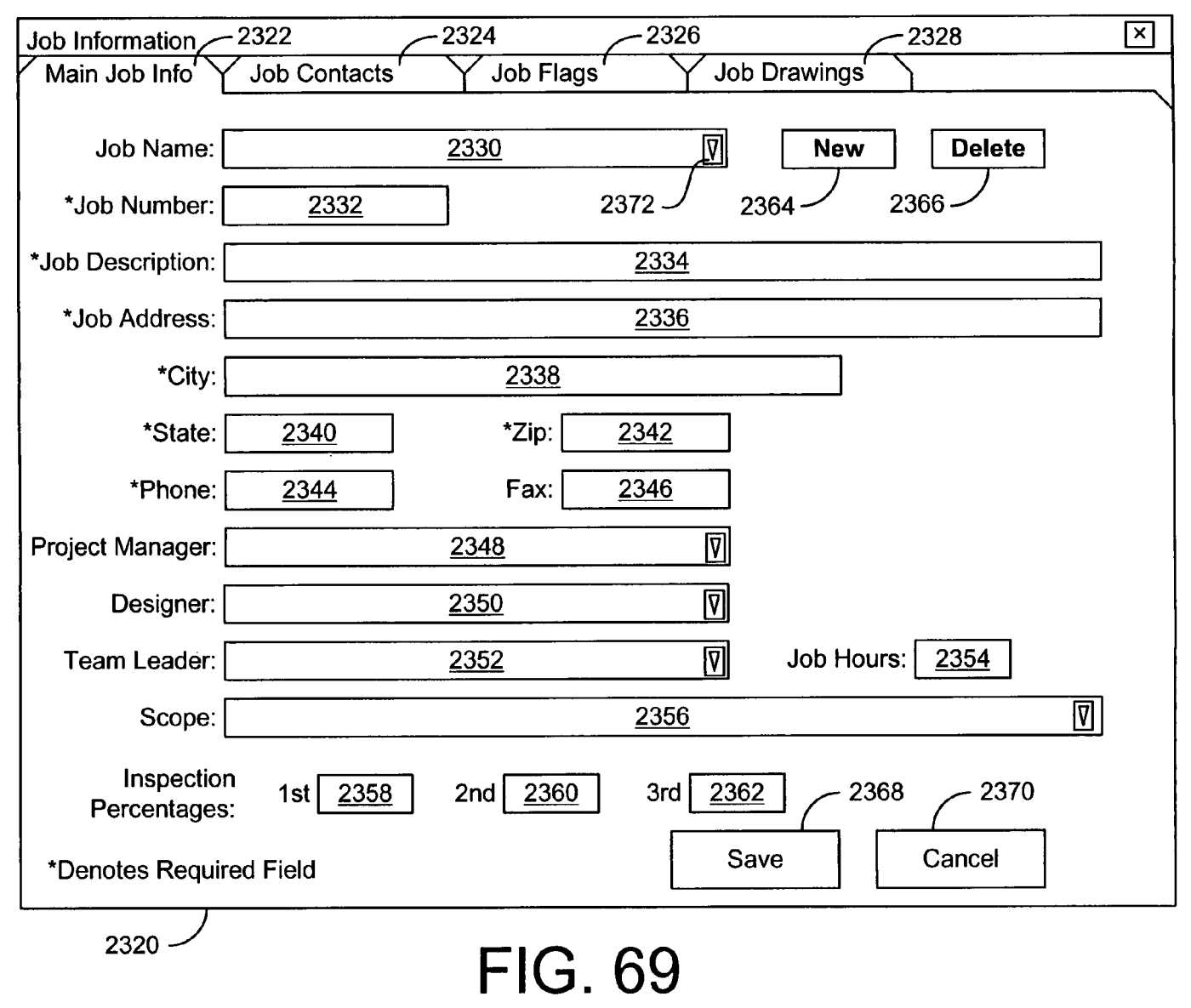

FIG. 69 shows a job information form 2320 that is displayed by user interface 344 when a user selects "Job Information" 2280 from screen 2270 (FIG. 67). Job information form 2320 includes four sub-screens which are selectable by "tabs" suggestive of file folder tabs. The sub-screens include "Main Job Info" 2322, "Job Contacts" 2324, "Job Flags" 2326, and "Job Drawings" 2328.

Main Job Info sub-screen 2322 is shown in FIG. 69 to include a job name field 2330, a job number field 2332, a job description field 2334, one or more job address fields 2336, a city field 2338, a state field 2340, a zip field 2342, a phone field 2344, a fax field 2346, a project manager field 2348, a designer field 2350, a team leader field 2352, a scope field 2356, a first inspection percentage field 2358, a second inspection percentage field 2360, a third inspection percentage field 2362, a new job button 2364, a delete button 2366, a save button 2368, and a cancel button 2370. The data fields of Main Job Info subscreen 2322 are initially populated for one of the jobs (e.g., the first job) associated with the current site from Jobs table 1043 (FIG. 43).

In order to view the data associated with another job, the user can select the drop-down menu button 2372 to be presented with a list of all jobs associated with the current site, and then select a job from that list. Interface 344 will then populate the data fields with data from table 1043 corresponding to the selected job.

The user can edit the main job info data by typing the new data directly into the fields that do not contain drop down menus. Drop down menus are provided in project manager field 2348, designer field 2350, team leader field 2352, and scope field 2356, because those fields require entry of values that must pre-exist in database 136. Once the data is edited, the user can save the edited data to database 136 by selecting save button 2368. If the user selects cancel button 2370, the edited data is not written to database 136.

If the user selects new job button 2364, interface will enter a record in Jobs table 1043 with a new, unique jobID, and the user can add/edit data using main job info sub-form 2322. Optionally, some of the data (e.g., address data, phone, fax, etc.) can be copied from the similar data for the current site by default. Once the new data is entered/edited, the new job record can be stored in table 1043 by selecting the save button 2368.

Figure 70:
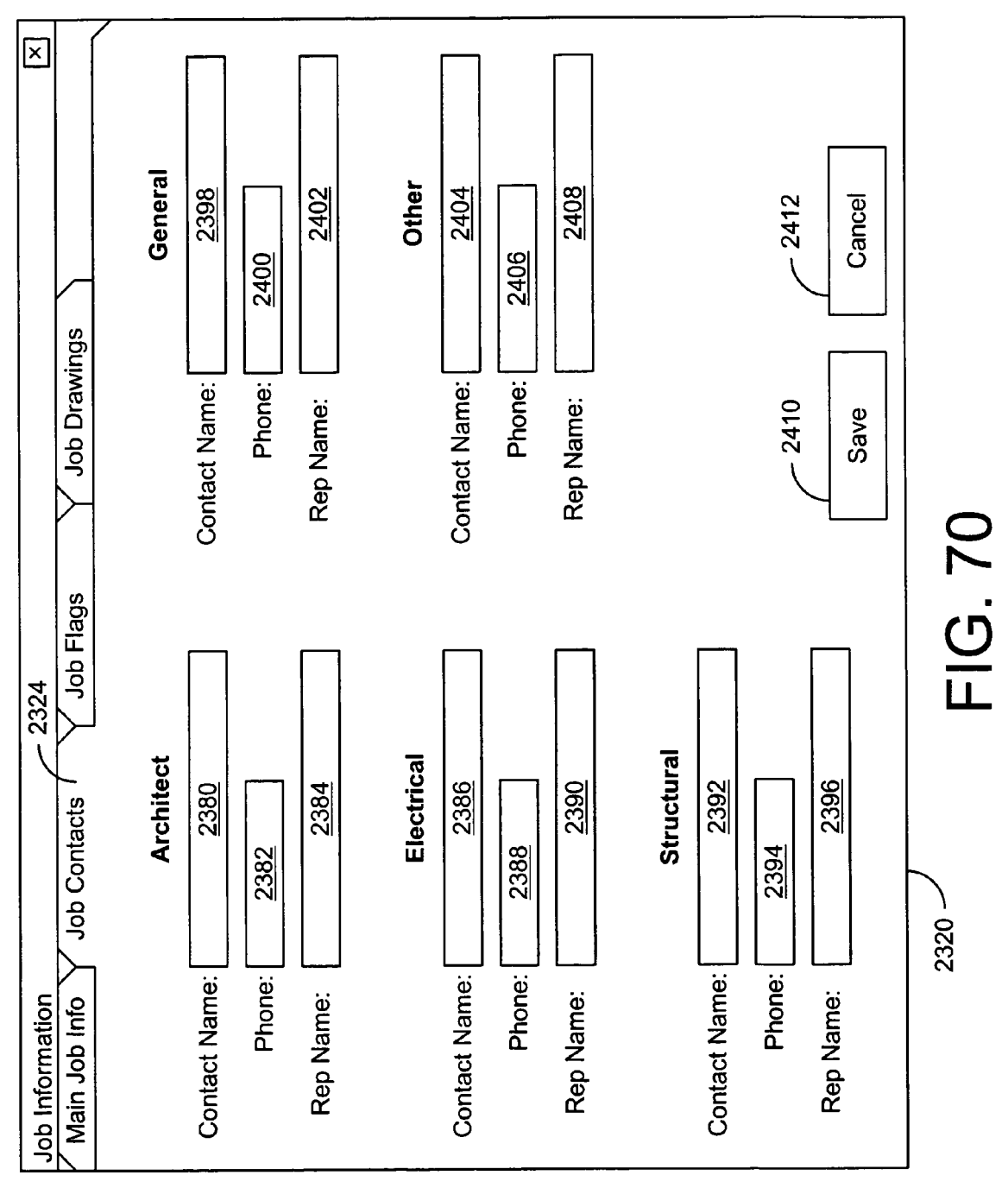

FIG. 70 shows Job Contacts sub-screen 2324 to include an architect contact field 2380, an architect phone field 2382, an architect representative field 2384, an electrical contact field 2386, an electrical phone field 2388, an electrical representative field 2390, a structural contact field 2392, a structural phone field 2394, a structural representative field 2396, a general contact field 2398, a general phone field 2400, a general representative field 2402, an other contact field 2404, an other phone field 2406, and an other representative field 2408. When Job Contacts sub-screen 2324 is opened, the data fields are populated with data from Jobs table 1043, using the jobID 1580 associated with the job selected in Main Job Info sub-screen 2322 (current job) to select the appropriate record. Data displayed in Job Contacts sub-form 2324 can be edited as described above, using save button 2410 or cancel button 2412 to save or discard the revisions, respectively.

Figure 71:
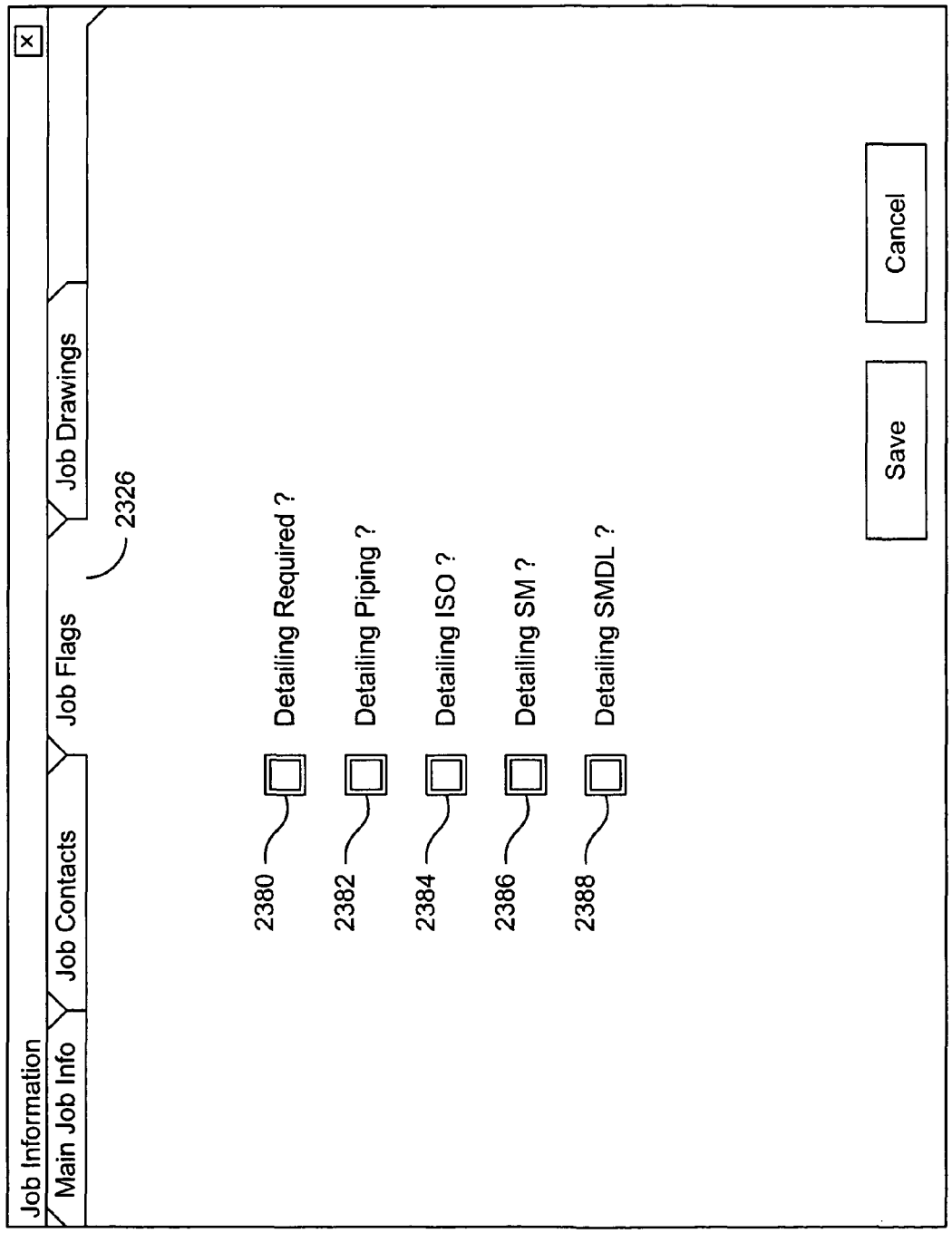
FIG. 71 shows another portion of a graphical user interface of the present invention.

FIG. 71 shows Job Flags sub-screen 2326 to include a detailing required check-box 2380, a detailing piping check-box 2382, a detailing ISO check-box 2384, a detailing SM check-box 2386, and a detailing SMDL check-box 2388. These check-boxes allow a user to set/change the associated detailing flags stored in Jobs table 1043 for the current job. The jobID associated with the current job is used to identify the appropriate record of table 1043 to update.

Figure 72:
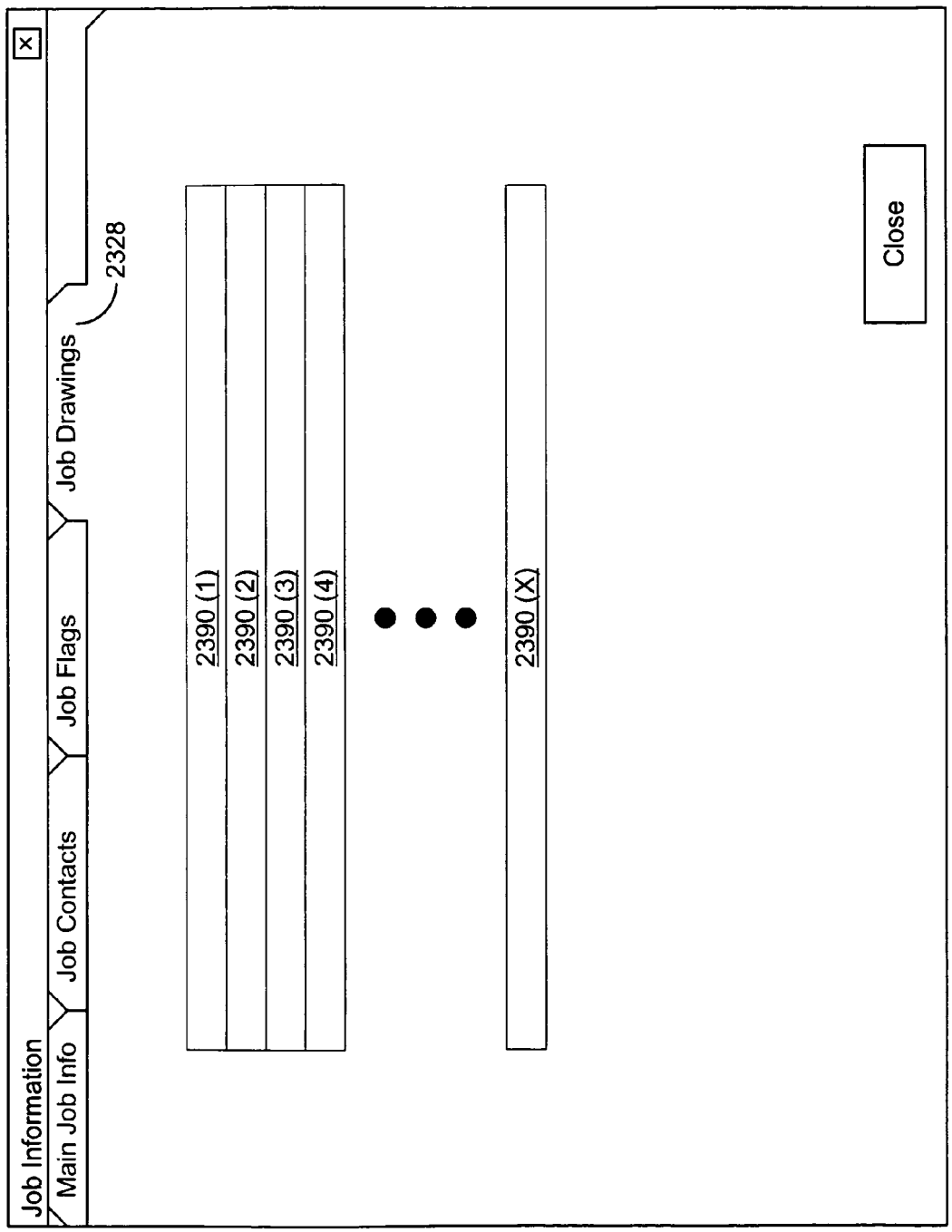
FIG. 72 shows another portion of a graphical user interface of the present invention.

FIG. 72 shows Job Drawings sub-screen 2328 to include a plurality of drawing file fields **2390(1-*x*). In this particular embodiment, drawing file fields 2390(1-*x*) are display only fields that display the file names of drawing and/or model files associated with the current job. Fields 2390(1-*x*) are populated with the names of files having one or more predefined extensions located in directory \BaseDirectory\current site\current job\drawings\. Optionally, a drawing files table (not shown) can be added to database 136** to track the drawing files associated with a particular job.

FIG. 73 shows a clients form 2400 that is displayed when Clients 2284 is selected from right side 2274 of screen 2270 (FIG. 67). Client form 2400 includes a client name field 2402, an address field 2404, an address2 field 2406, a city field 2408, a state field 2410, a zip field 2412, a phone field 2414, a fax field 2416, a type field 2418, a BBS field 2420, and a pact name field 2422. When a client is selected via drop down menu 2424, the data fields are populated with data corresponding to the selected client from Clients table 1055 (FIG. 55). The displayed client data can be edited, new client records can be added, and existing client records can be deleted as described above.

Clients form 2400 further includes a client contacts table 2426 near the bottom of screen 2400. Client contacts table 2426 is populated with data from ClientContacts table 1056 (FIG. 56), when clients screen 2400 is opened. New client contact records can be added to ClientContacts table 1056 by typing the indicated data into the first line of table 2426, and selecting the save button.

FIG. 74 shows an employees form 2440 that is displayed when Employees 2286 is selected from right side 2274 screen 2270 (FIG. 67). Employees form 2440 includes an employee name field 2442, a first name field 2444, a last name field 2446, a preferred name field 2448, a user name field 2450, a code field 2452, a trade field 2454, a grade field 2456, a termination date field 2458, an active check-box 2460, a phone field 2462, an extension field 2464, a fax field 2466, a mobile field 2468, and a pager field 2470. When an employee is selected via drop-down menu 2472, the data fields are populated with data from Employees table 1049 (FIG. 49), using the employeeID 1760 corresponding to the selected employee to retrieve the correct record. The displayed employee data can be edited, new employee records can be added, and existing employee records can be deleted as described above.

Figure 75:
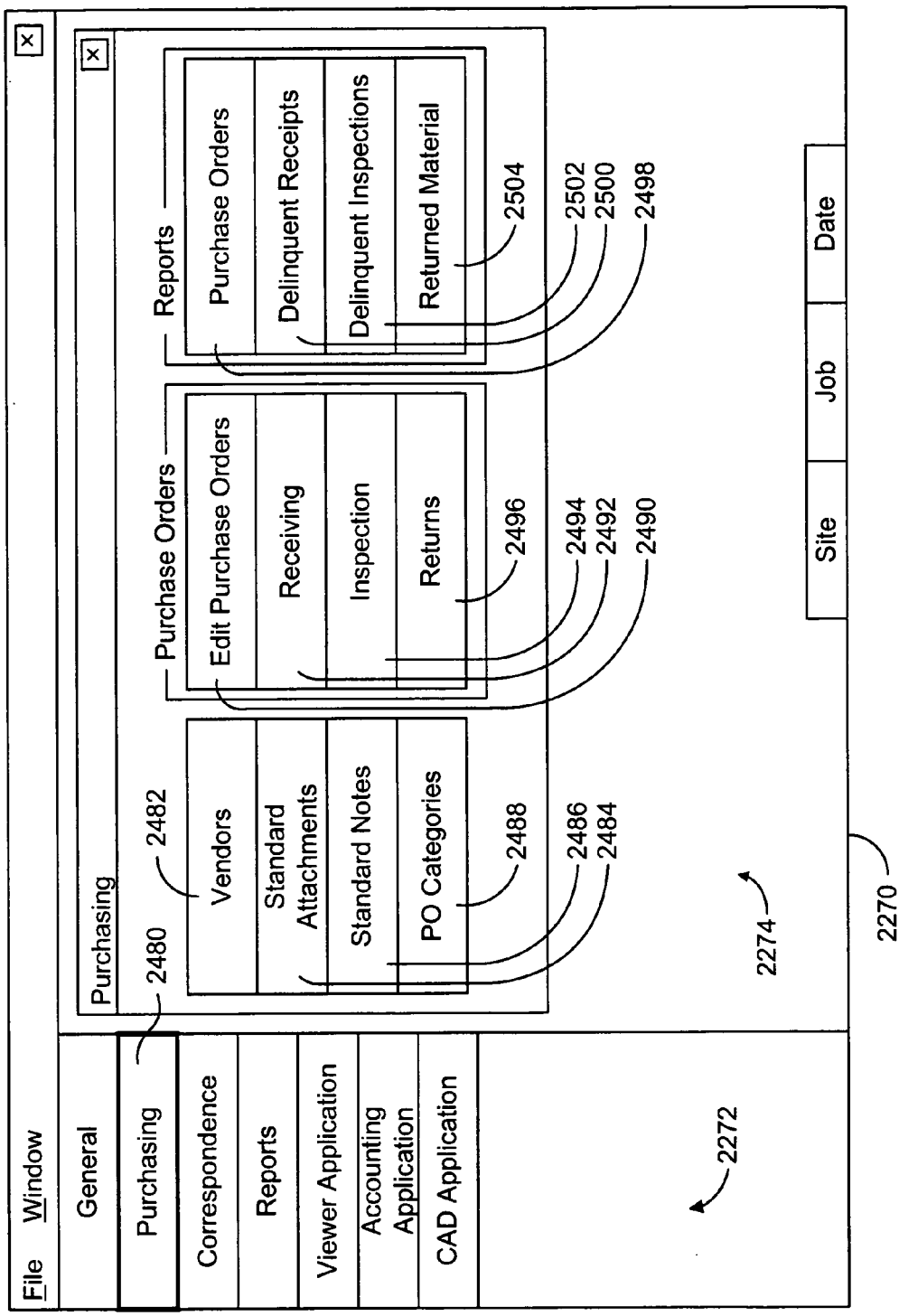
FIG. 75 shows another portion of a graphical user interface of the present invention.

FIG. 75 shows navigation screen 2270 when the purchasing group 2480 is selected, which causes a list of the screens included in the purchasing group 2480 to be displayed on the right side 2274 of screen 2270. The listed screens are generally divided into three groups. The first group includes vendors 2482, standard attachments 2484, standard notes 2486, and purchase order (PO) categories 2488. The second group relates generally to purchasing, and includes edit purchase orders 2490, receiving 2492, inspection 2494, and returns 2496. The third group relates generally to reports, and includes purchase orders 2498, delinquent receipts 2500, delinquent inspections 2502, and returned material 2504.

FIG. 76 shows a vendors form 2510 that is displayed when vendors 2482 is selected from the right side 2274 of navigation screen 2270. Vendors form 2510 includes a vendor name field 2512, an address field 2514, an address2 field 2516, a city field 2518, a state field 2520, a zip field 2522, a phone field 2524, a fax field 2526, a type field 2528, a BBS field 2530, and a pact name field 2532. When a vendor is selected via drop down menu 2534, the data fields are populated with data corresponding to the selected vendor from Vendors table 1041 (FIG. 41). The displayed vendor data can be edited, new vendor records can be added, and existing vendor records can be deleted as described above.

Vendors form 2510 further includes a client contacts table 2536 near the bottom of screen 2510. Vendor contacts table 2536 is populated with data from VendorContacts table 1042 (FIG. 42), when vendor screen 2510 is opened. New vendor contact records can be added to VendorContacts table 1042 by typing the indicated data into the first line of table 2536, and selecting the save button 2538.

FIG. 77 shows a standard attachments form 2550 that is displayed when standard attachments 2484 is selected from the right side 2274 of navigation screen 2270. Standard attachments form 2550 includes an attachment name field 2552, a title field 2554, a subtitle field 2556, a short description field 2558, a description field 2560, and a path field 2562. When an attachment is selected via drop-down menu 2564, the data fields are populated with data corresponding to the selected attachment from Attachments table 1046 (FIG. 46). The displayed standard attachment data can be edited, new standard attachment records can be added, and existing standard attachment records can be deleted as described above.

FIG. 78 shows a standard notes form 2570 that is displayed when standard notes 2486 is selected from the right side 2274 of navigation screen 2270. Standard notes form 2570 allows the user to set up short notes that can be included for printing on specified purchase orders. Unlike standard attachments, which are entirely separate documents, standard notes include text that can be printed directly on a purchase order. Standard notes form 2570 includes an active notes field 2572 and an edit note field 2574. When an active note is selected via drop down menu 2576, the edit note field 2574 is populated with the data from the description field 1526 of the record from Notes table 1040 (FIG. 40) corresponding to the selected note. The displayed note data can be edited, new standard note records can be added, and existing standard note records can be deleted as described above.

FIG. 79 shows a purchase order categories form 2580 that is displayed when PO Categories 2488 is selected from the right side 2274 of navigation screen 2270. Purchase order categories form 2580 allows a user to set up standard categories or part classifications for purchase orders, and includes a categories field 2582, a category ID field 2584, and a category description field 2586. Typical categories include without limitation plumbing, piping, refrigeration, sheet metal, and project management. When an existing category is selected via drop-down menu 2588, the data fields are populated with data from a record of Categories table 1057 (FIG. 57) corresponding to the selected category. The displayed data can be edited, new category records can be added, and existing category records can be deleted as described above.

FIG. 80 shows a PO classifications form 2590 that can be used to set up purchase order classifications. PO classification facilitate the definition of separate PO numbering sequences for each site. This is useful, for example, to differentiate normal purchase orders from higher value purchase orders. Each PO classification has its own numeric sequence, its own maximum monetary value, and can include a string identifier either appended or prepended to the PO number to easily identify the classification. PO classifications form 2590 includes a PO classifications field 2592, a PO classification name field 2594, a first PO number field 2596, a last PO number field 2598, a next PO number field 2600, a string identifier field 2602, an append identifier field 2604, a prepend identifier field 2608, and a maximum PO value field 2610. When an existing PO classification is selected via drop-down menu 2612, the fields of PO classification form 2590 are populated with data from a record of POClassification table 1045 (FIG. 45) corresponding to the selected PO classification. The displayed data can be edited, new PO classification records can be added, and existing PO classification records can be deleted as described above.

Figure 81:
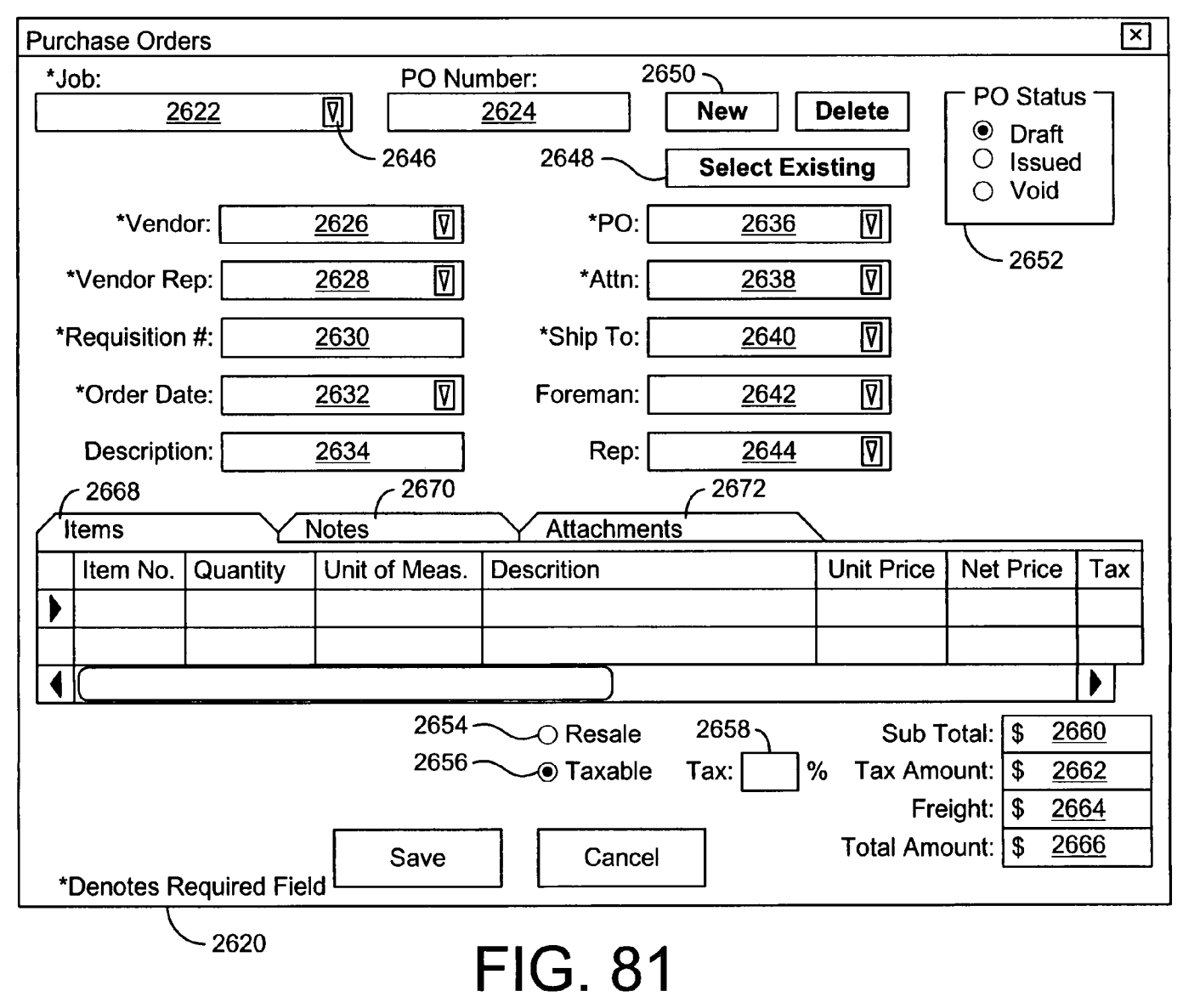

FIG. 81 shows a purchase orders form 2620 that is displayed when Edit Purchase Orders 2490 is selected from the right side 2274 of navigation screen 2270. Purchase orders form 2620 includes a job field 2622, a PO number field 2624, a vendor field 2626, a vendor rep field 2628, a requisition number field 2630, and order date field 2632, a description field 2634, a PO field 2636, an attention field 2638, a ship to field 2640, a foreman field 2642, and a rep field 2644. Because all purchase orders are associated with a particular job, a user begins working with purchase orders form 2620 by selecting an existing job via drop-down menu 2646. In order to view or edit an existing purchase order, a select existing button is selected, which causes a list of purchase orders associated with the selected job to be displayed to the user. When the user selects one of the existing purchase orders, the data fields (including those not yet described) are populated with data from a record from PurchaseOrders table 1037 (FIG. 37) corresponding to the selected purchase order.

In order to generate a new purchase order, the user selects the new button 2650, which causes the next available purchase order number to be entered into PO number field 2624, and clears the remaining data fields (except for job field 2622) so that the data for the new purchase order can be entered by the user. As indicated above, the user is generally free to enter any desirable data into fields without a drop-down menu. However, drop-down menus are provided for fields that require data values that pre-exist in database 136.

Purchase orders form 2620 further includes PO status indicators 2652, a resale indicator 2654, a taxable indicator 2656, a tax rate field 2658, a subtotal field 2660, a tax amount field 2662, a freight field 2664, and a total amount field 2666. Each of these indicators/fields correspond to fields in the records of PurchaseOrders table 1037.

Purchase orders form 2620 further includes a plurality of tabbed tables including an items table 2668, a notes table 2670, and an attachments table 2672. Items table 2668 is used to add and/or view line items that have been added to the current purchase order. Although only a portion of items table 2668 is shown, it should be understood that the fields of items table 2668 correspond to the fields of the records of POItems table 1027 (FIG. 27). Similarly, notes table 2670 is used to view and/or add notes to the current purchase order, and attachments table 2672 is used to view and/or add attachments to the current purchase order. Although the contents of notes table 2670 and attachments table 2672 are not shown, it should be understood that the fields of notes table 2670 and attachments table 2672 correspond to the fields of the records of PONotes table 1039 (FIG. 39) and POAttachments table 1038 (FIG. 38), respectively.

Figure 82:
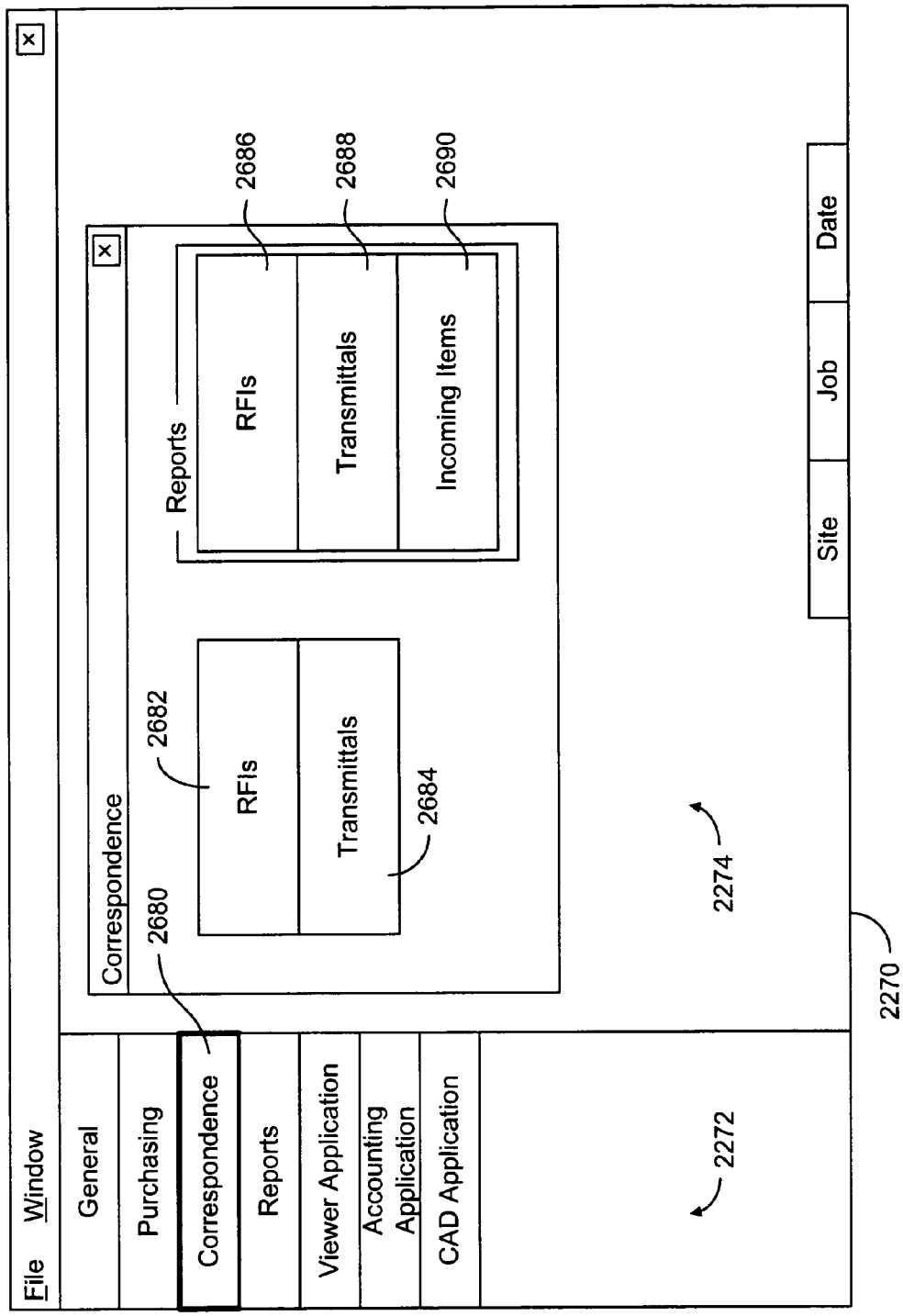
FIG. 82 shows another portion of a graphical user interface of the present invention.

FIG. 82 shows navigation screen 2270 when correspondence group 2680 is selected, which causes a list of the screens included in the correspondence group 2680 to be displayed on the right side 2274 of screen 2270. The listed screens are divided into two groups. The first group corresponds to forms for handling RFIs 2682 and transmittals 2684. The second group includes selections to generate reports related to RFIs 2686, transmittals 2688, and incoming items 2690.

Figure 83:
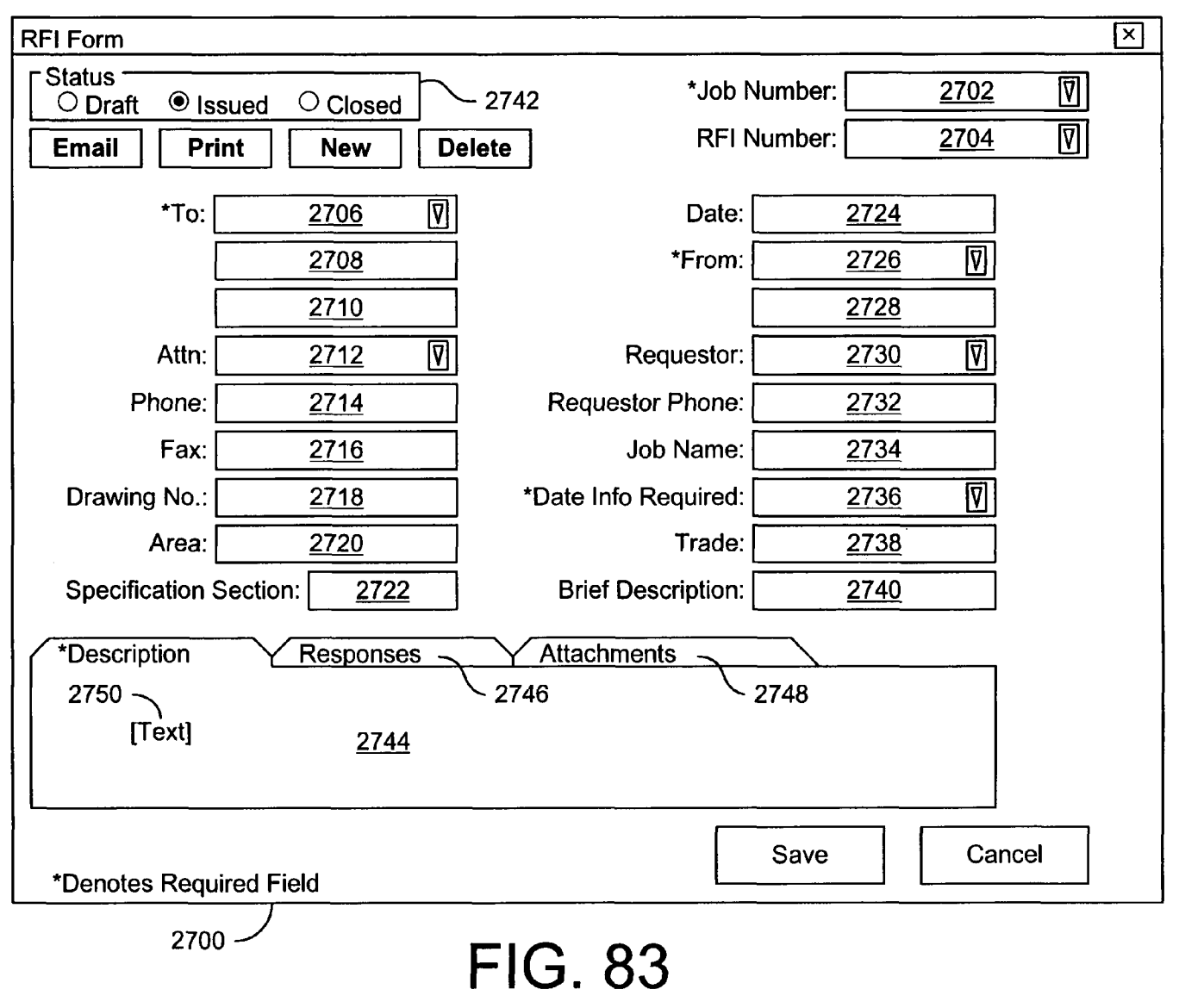

FIG. 83 shows an RFI (request for information) form 2700 that is displayed when the user selects RFIs 2682 from the left side 2274 of navigation screen 2270. RFI form 2700 is used to enter and/or view requests for information made to clients, and includes a job number field 2702, an RFI number field 2704, a to field 2706, to address fields 2708 and 2710 (not labeled), an attention field 2712, a phone field 2714, a fax field 2716, a drawing number field 2718, an area field 2720, a specification section field 2722, a date field 2724, a from (sender) field 2726, a sender phone field 2728 (not labeled), a requestor field 2730, a requestor phone field 2732, a job name field 2734, a date info required field 2736, a trade field 2738, a brief description field 2740, and status indicators 2742. These data fields and status indicators correspond to the fields of the records of RFI table 1053 (FIG. 53).

RFI form 2700 also includes a description tab 2744, a responses tab 2746, and an attachments tab 2748. Description tab 2744 includes one large text field that includes the substantive text of the information request. Text field 2750 corresponds to description field 1936 of RFI table 1053.

Figure 84:
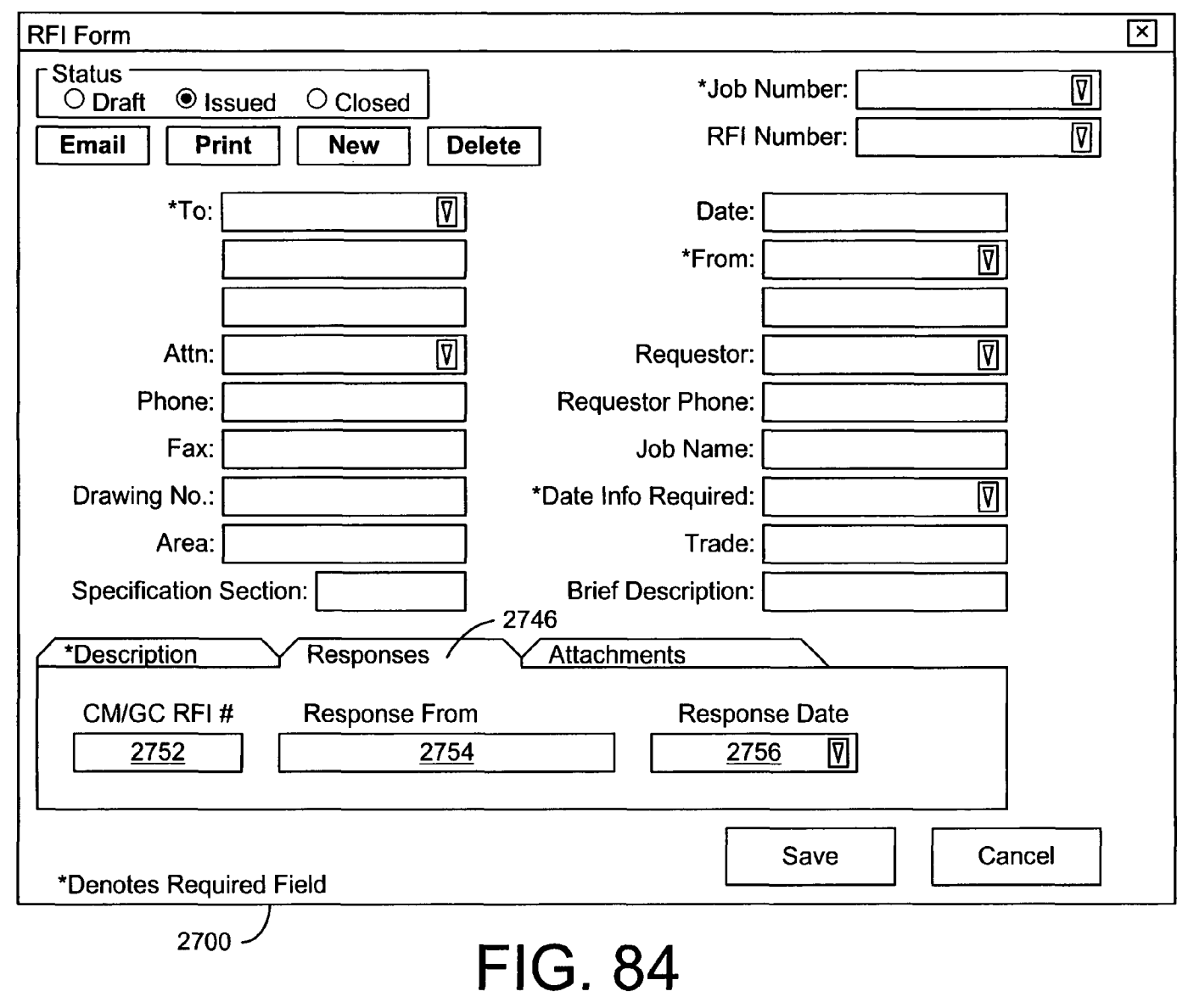

FIG. 84 shows RFI form 2700 when responses tab 2746 is selected. Responses tab 2746 is used to enter/retrieve responses received, and includes a CM/GC RFI number field 2752, a response from field 2754, and a response date field 2756. These fields correspond to the like fields of RFI table 1053.

Figure 85:
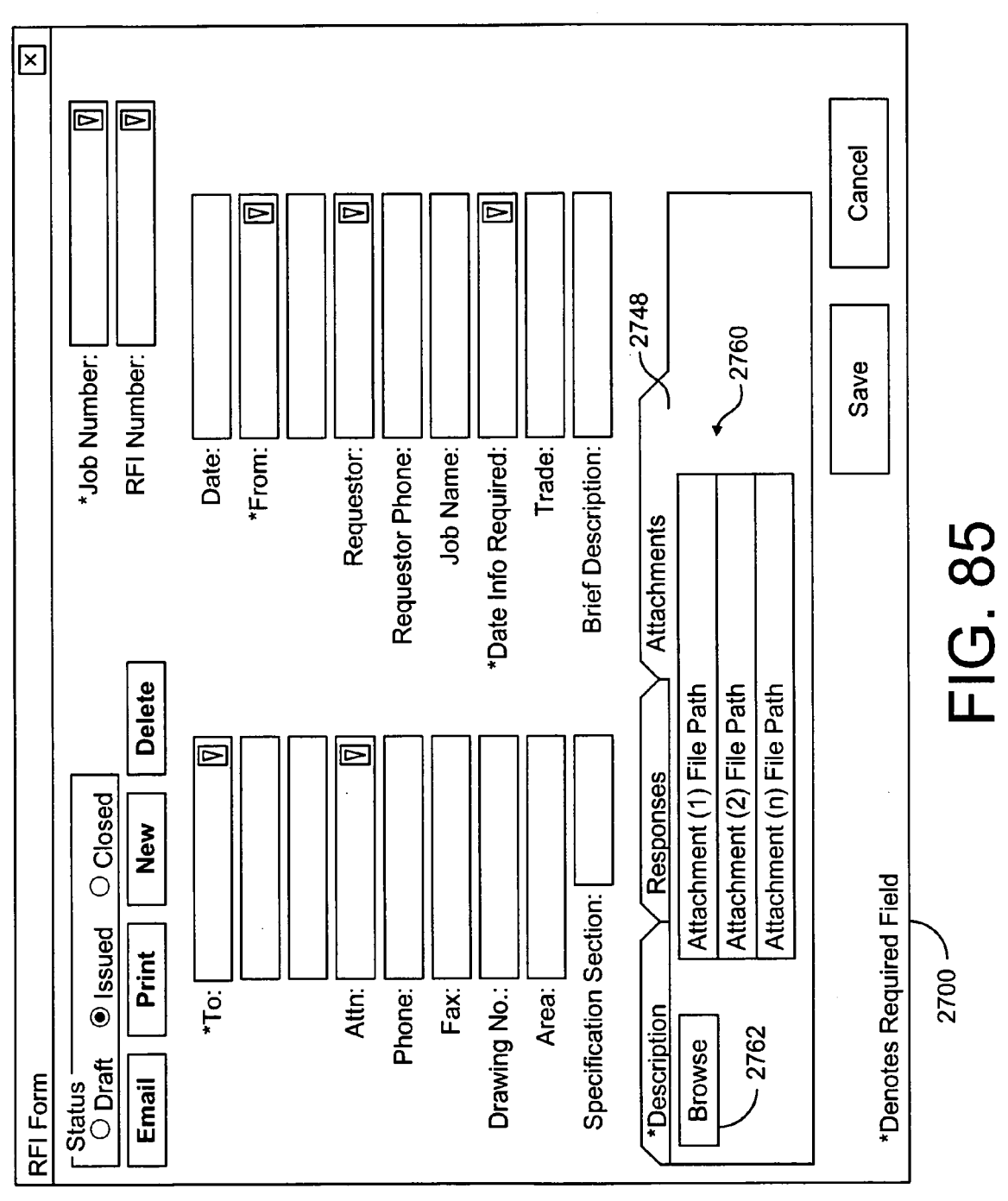

FIG. 85 shows RFI form 2700 when attachments tab 2748 is selected. Attachments tab 2748 is used to review and/or add attachments to the current RFI, and includes a plurality of attachment file path fields 2760. Attachments tab 2748 further includes a browse button 2762 which launches a file browser, whereby the user can search for files to be attached to the current RFI. The attached filepaths displayed in fields 2760 are stored in and/or retrieved from RfiAttachments table 1054 (FIG. 54).

Figure 86:
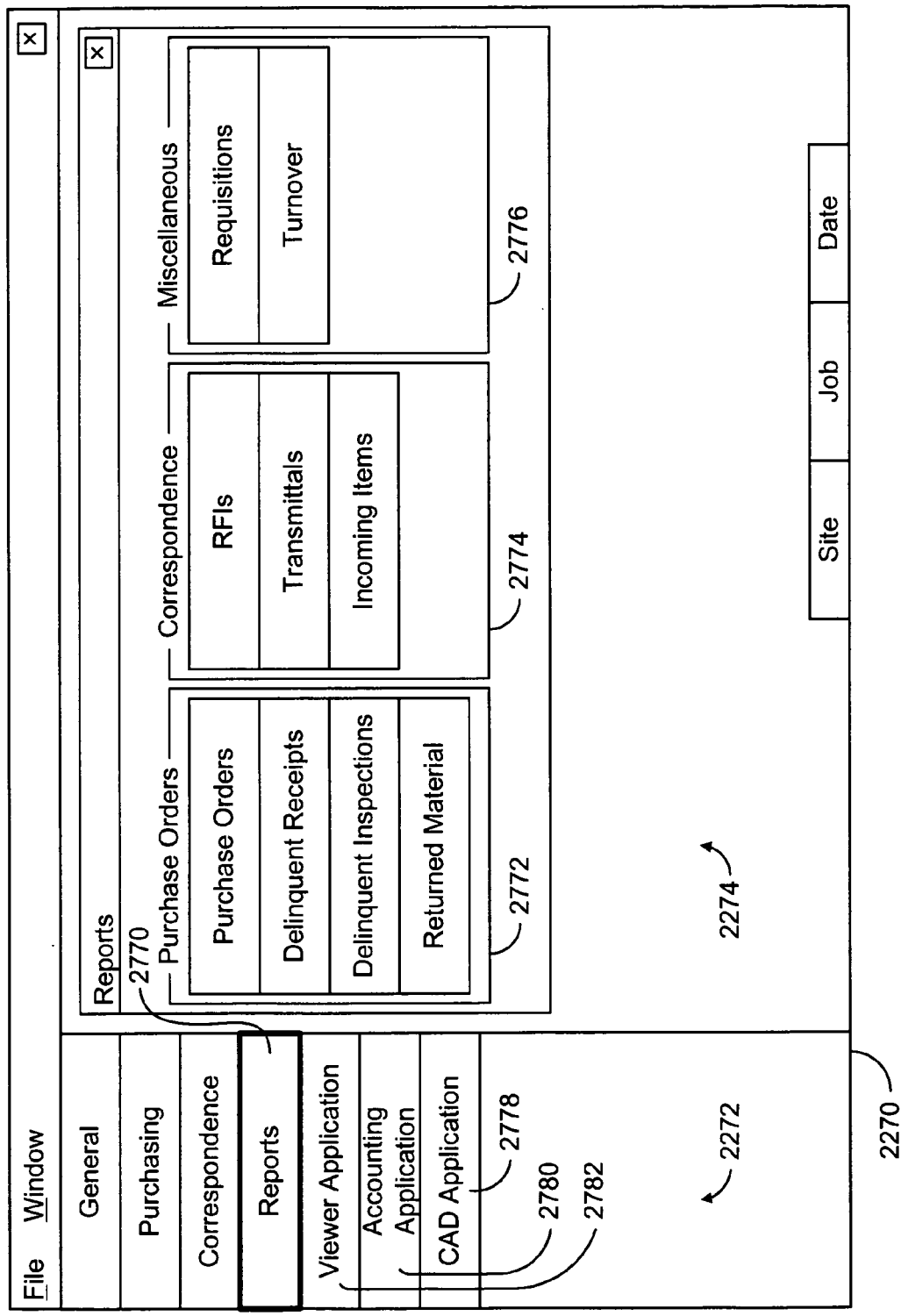
FIG. 86 shows another portion of a graphical user interface of the present invention.

FIG. 86 shows navigation screen 2270 when the reports group 2770 is selected, which causes a list of reports included in the report group 2480 to be displayed on the right side 2274 of screen 2270. The listed reports are generally divided into three groups. A purchase orders group 2722 includes buttons to launch reports on purchase orders (e.g., all open POs associated with certain selection criteria such as a particular job or vendor), delinquent receipts (e.g., all overdue goods associated with particular selection criteria), delinquent inspections (e.g., all overdue inspections associated with particular selection criteria), and returned material (e.g., materials returned to vendors associated with the particular selection criteria). A correspondence group 2774 includes buttons to launch reports on RFIs, transmittals, and any incoming items. A miscellaneous group 2776 includes buttons to launch reports on requisitions and turnover reports, which can be provided to clients upon completion of a project to document any desired aspect of the project.

Left side 2272 further includes a CAD application selection 2778 (launches CAD application 164 (FIG. 3)), an accounting application selection 2780 (launches accounting application 194 (FIG. 4)), and a viewer application selection 2782 (launches viewer application 244 (FIG. 5)). When one of the applications is launched, basic data (e.g., current site ID, directory file paths, etc.) is provided to the launched application. Then, the launched application communicates with database 136 via API 346 as described above.

FIG. 87 shows a system configuration form 2800 facilitates the configuration of global system options. System configuration form 2800 includes an installation path field 2802, a POs editable checkbox 2804, a default SMTP host field 2806, a late notification for PO items enabled checkbox 2808, and a late notification for RFIs enabled checkbox 2810. These fields and checkboxes correspond to fields in the records Configuration table 1016 (FIG. 16), and the data they contain can be added, deleted, viewed, and/or revised using configuration form 2800.

Configuration form 2800 further includes a plurality of state name fields 2812 (0-16). Each state name field corresponds to a record of ISOStateNames table 1024 (FIG. 24). Note that some (0-11) of the state names are predefined by the system and cannot be changed by the user, while others (12-16) may be defined and/or redefined by the user. Of course, the system designer can define and/or redefine any of the state names.

Fields 2812 (6 and 7) use the terms "Spool or ISO." As described above, the term "ISO" refers to a logical division of a construction project. The term "spool" refers to the physical component of the construction project associated with an ISO.

It should be understood that the foregoing description of the screens and forms of user interface 344 is by way of example to illustrate various features and aspects of the present invention. Not all of the screens and forms of user interface 344 are shown. Further, the reports generated by the system are not shown or described in detail. Indeed, the reports can be customized according to the needs of a particular user to retrieve and/or filter the data stored in database 136 according to any user-defined selection criteria, and to present the data in any desired format.

The detailed description of particular embodiments is now complete. While the making and use of the present invention will be clear to those skilled in the art in view of this disclosure, it should be understood that various aspects of the present invention are somewhat complex. Further, the development of new features is currently ongoing, even as this present application is filed. Therefore, in the interest of the most complete disclosure possible, the contents of the priority provisional applications (which include user's manuals, communication interface specifications, and the like) are incorporated herein by reference in their entirety.

It should be also be understood that the embodiments of the invention described in the appendices of the priority applications are only example embodiments of the invention. Accordingly, mandatory language contained in the appendices is understood to be directed to the particular disclosed embodiment, and not as a limitation of the scope of the invention. For example, Page 1 of the True Trac User Manual indicates that each user must be set up via the displayed form before they can log on to the system. The present invention, however, is not so limited.

Indeed, no single element of the present invention is considered to be an essential element. Rather, various embodiments of the present invention may be practiced with varying combinations of the features disclosed herein. Many of the described features may be substituted, altered or omitted without departing from the scope of the invention. Deviations from the particular embodiments shown will be apparent to those skilled in the art, particularly in view of the foregoing disclosure. For example, the present invention will be useful for managing any type of construction projects, including without limitation the manufacturing of complex goods such a airplanes, ships, and the like. Further, the present invention will be useful in creating and maintaining documentation for projects, apart from the manufacturing/construction of such projects.

We claim:

1. In a computer system, a method for managing a construction project, executed by a least one or more processors, said method comprising:
    receiving a plurality of identifiers from a user, each of said identifiers identifying a respective component of said construction project;
    associating an initial one of at least three predefined states with each of said identifiers, said predefined states indicating the construction status of the component identified by the associated identifier;
    writing records to a database, said records including said identifiers and said associated initial states;
    updating the states associated with said identifiers by writing records to said database associating different ones of said predefined states with said identifiers; and
    retrieving the updated states from said database to determine the status of said construction project; and wherein
    said step of updating said states associated with said identifiers depends on changes in the construction status of said components identified by said identifiers; and
    said step of updating said states includes
        retrieving said identifiers from said database,
        retrieving said predefined states from said database,
        presenting said identifiers and said predefined states to said user,
        receiving a selection of one of said identifiers to be updated from a list of identifiers from said user,
        receiving a selection of a state from a list of predefined states from said user, and
        writing a record to said database associating said selected identifier with said selected state.

2. A method for managing a construction project according to claim 1, further comprising:
    providing a model file including graphical representations of said components; and
    displaying each component based on said retrieved updated state corresponding to the respective component.

3. A method for managing a construction project according to claim 2, wherein said step of displaying said components includes:
    receiving a selection of one of said predefined states; and
    displaying only those components associated with the selected state.

4. A method for managing a construction project according to claim 2, wherein said step of displaying said components includes assigning a color to each state of said plurality of states.

5. A method for managing a construction project according to claim 1, further comprising:
    receiving a selection of one of said identifiers;
    receiving a hyperlink to a file; and
    writing a record to said database associating said selected identifier with said hyperlink.

6. A method for managing a construction project according to claim 1, wherein said step of retrieving said identifiers includes loading said identifiers into a hand-held device.

7. A method for managing a construction project according to claim 6, wherein said step of retrieving said predefined states includes loading said predefined states into said hand-held device.

8. A method for managing a construction project according to claim 7, wherein said identifiers and said predefined states are loaded into said hand-held device from said database via a portable computer.

9. A method for managing a construction project according to claim 1, further comprising writing records of hours worked on said construction project into said database.

10. A method for managing a construction project according to claim 9, wherein said step of writing records of hours worked into said database includes:
    retrieving said identifiers from said database;
    presenting said identifiers to said user;
    receiving a selection of one of said identifiers from said user;
    receiving a value indicative of a number of hours worked on a component identified by said selected identifier; and
    writing a record to said database associating the number of hours worked with the selected identifier.

11. A method for managing a construction project according to claim 10, further comprising:
    retrieving a plurality of workers from said database;
    presenting said plurality of workers to said user;
    receiving a selection of one of said workers who performed said number of hours of work on said component from said user; and
    including a value identifying said selected worker in said record associating said number of hours worked with said selected identifier.

12. A method for managing a construction project according to claim 10, further comprising:
    retrieving a plurality of activities from said database;
    presenting said plurality of activities to said user;
    receiving a selection of one of said activities that has been performed on said component identified by said selected identifier from said user; and
    including a value identifying said selected activity in said record associating said number of hours worked with said selected identifier.

13. A method for managing a construction project according to claim 10, further comprising retrieving a plurality of component descriptions from said database, each component description corresponding to one of said identifiers.

14. A method for managing a construction project according to claim 10, wherein said steps of selecting one of said identifiers and entering said number of hours worked is performed on a hand-held device.

15. A method for managing a construction project according to claim 14, wherein data is transferred between said database and said hand-held device via a portable computer.

16. A method for managing a construction project according to claim 1, wherein said step of receiving a plurality of identifiers from a user includes:
receiving a drawing file corresponding to said construction project;
receiving definitions of groups of objects within said drawing file from said user, said groups of objects corresponding to said components of said construction project; and
assigning one of said identifiers to each of said groups of objects.

17. A method for managing a construction project according to claim 16, further comprising:
receiving a separate drawing file for each defined group of objects in said drawing file; and
writing a record to said database associating each of said separate drawing files with one of said identifiers.

18. A non-transitory, electronically-readable storage medium having code embodied therein for causing an electronic device to:
receive a plurality of identifiers from a user, each of said identifiers identifying a respective component of a construction project;
associate an initial one of at least three predefined states with each of said identifiers, said predefined states indicating the construction status of the component identified by the associated identifier;
write records to a database, said records including said identifiers and said associated initial states;
update the states associated with said identifiers by writing records to said database associating different ones of said predefined states with said identifiers; and
update the updated states from said database to determine the status of said construction project; and wherein
said code is operative to cause said electronic device to update said states associated with said identifiers depending on changes in the construction status of said components identified by said identifiers; and
to update said states, said code is operative to cause said electronic device to
retrieve said identifiers from said database,
retrieve said predefined states from said database,
present said identifiers and said predefined states to said user,
receive a selection of one of said identifiers to be updated from a list of identifiers from said user,
receive a selection of a state from a list of predefined states from said user, and
write a record to said database associating said selected identifier with said selected state.

19. A non-transitory, electronically-readable storage medium according to claim 18, wherein said code is further operative to cause said electronic device to:
provide a model file including graphical representations of said components; and
display each component based on said retrieved updated state corresponding to the respective component.

20. A non-transitory, electronically-readable storage medium according to claim 19, wherein said code is further operative to cause said electronic device to:
receive a selection of one of said predefined states; and
display only those components associated with the selected state.

21. A non-transitory, electronically-readable storage medium according to claim 19, wherein said code is operative to cause said electronic device to display said components by assigning a color to each state of said plurality of states.

22. A non-transitory, electronically-readable storage medium according to claim 18, wherein said code is further operative to cause said electronic device to:
receive a selection of one of said identifiers;
receive a hyperlink to a file; and
write a record to said database associating said selected identifier with said hyperlink.

23. A non-transitory, electronically-readable storage medium according to claim 18, wherein said code is operative to cause said electronic device to retrieve said identifiers by loading said identifiers into a hand-held device.

24. A non-transitory, electronically-readable storage medium according to claim 23, wherein said code is operative to cause said electronic device to retrieve said predefined states by loading said predefined states into said hand-held device.

25. A non-transitory, electronically-readable storage medium according to claim 24, wherein said identifiers and said predefined states are loaded into said hand-held device from said database via a portable computer.

26. A non-transitory, electronically-readable storage medium according to claim 18, wherein said code is further operative to cause said electronic device to write records of hours worked on said construction project into said database.

27. A non-transitory, electronically-readable storage medium according to claim 26, wherein, to write records of hours worked into said database, said code is operative to cause said electronic device to:
retrieve said identifiers from said database;
present said identifiers to said user;
receive a selection of one of said identifiers from said user;
receive a value indicative of a number of hours worked on a component identified by said selected identifier; and
write a record to said database associating the number of hours worked with the selected identifier.

28. A non-transitory, electronically-readable storage medium according to claim 27, wherein said code is further operative to cause said electronic device to:
retrieve a plurality of workers from said database;
present said plurality of workers to said user;
receive a selection of one of said workers who performed said number of hours of work on said component from said user; and
include a value identifying said selected worker in said record associating said number of hours worked with said selected identifier.

29. A non-transitory, electronically-readable storage medium according to claim 27, wherein said code is further operative to cause said electronic device to:
retrieve a plurality of activities from said database;
present said plurality of activities to said user;
receive a selection of one of said activities that has been performed on said component identified by said selected identifier from said user; and
include a value identifying said selected activity in said record associating said number of hours worked with said selected identifier.

30. A non-transitory, electronically-readable storage medium according to claim 27, wherein said code is further operative to cause said electronic device to retrieve a plurality of component descriptions from said database, each component description corresponding to one of said identifiers.

31. A non-transitory, electronically-readable storage medium according to claim 27, wherein code is operative to cause said electronic device to select one of said identifiers and enter said number of hours worked via a hand-held device.

32. A non-transitory, electronically-readable storage medium according to claim 31, wherein data is transferred between said database and said hand-held device via a portable computer.

33. A non-transitory, electronically-readable storage medium according to claim 18, wherein, to receive a plurality of identifiers from a user, said code is operative to cause said electronic device to:
receive a drawing file corresponding to said construction project;
receive definitions of groups of objects within said drawing file from said user, said groups of objects corresponding to said components of said construction project; and
assign one of said identifiers to each of said groups of objects.

34. A non-transitory, electronically-readable storage medium according to claim 33, wherein said code is further operative to cause said electronic device to:
receive a separate drawing file for each defined group of objects in said drawing file; and
write a record to said database associating each of said separate drawing files with one of said identifiers.

35. A system for managing construction projects, said system comprising: a processor;
a database;
a component interface operative to receive component identifiers identifying components of a construction project;
a state interface operative to receive any of at least three predefined state indicators, each state indicator indicating a particular construction state associated with one of said components of said construction project;
a worker interface operative to receive worker identifiers identifying workers to perform work on at least one of said construction projects; and
a database interface operative to store said component identifiers and associated state indicators in said database, whereby said particular construction states associated with said components can be updated; and wherein
said database interface is further operative to store one of said component identifiers previously associated with a first one of said state indicators in said database with a different one of said state indicators, thereby updating the construction status of the component identified by said one of said component identifiers; and
said database interface is further operative to store said worker identifiers in said database.

36. A system according to claim 35, wherein said component interface and said state interface are embodied in a form, said form having a first field for receiving one of said component identifiers, and a second field for receiving one of said predefined states.

37. A system according to claim 35, wherein said component interface and said state interface are embodied in a table wherein said component identifiers and said predefined states can be entered.

38. A system according to claim 35, wherein said database interface is further operative to associate a default one of said state indicators with one of said component identifiers if one of said state indicators is not received with said one of said component identifiers.

39. A system according to claim 35, further comprising:
a link interface operative to receive links to files; and wherein
said database interface is further operative to store said links and associated ones of said component identifiers in said database.

40. A system according to claim 35, further comprising:
a time interface operative to receive time values corresponding to amounts of time worked on said components; and wherein
said database interface is further operative to store said time values and associated ones of said component identifiers in said database.

41. A system according to claim 40, further comprising a remote data entry device, said remote data entry device including:
a user input device operative to receive time values from a user; and
an application program interface operative to provide said time values and associated ones of said component identifiers to said time interface.

42. A system according to claim 40, further comprising:
a date interface operative to receive date values identifying dates that work is performed on said components; and wherein
said database interface is further operative to store said date values, associated ones of said time values, and associated ones of said component identifiers in said database.

43. A system according to claim 40, further comprising:
an activity interface operative to receive activity identifiers identifying activities performed on said components; and wherein
said database interface is further operative to store said activity identifiers, associated ones of said time values, and associated ones of said component identifiers in said database.

44. A system according to claim 43, further comprising a remote data entry device, said remote data entry device including:
a user input device operative to receive time values and associated ones of said activity identifiers from a user; and
an application program interface operative to provide said time values to said time interface, said associated ones of said activity identifiers to said activity interface, and said associated ones of said component identifiers to said component interface.

45. A system according to claim 35, further comprising:
a site interface operative to receive site identifiers identifying sites where said construction projects are located;
a job interface operative to receive job identifiers identifying jobs to be carried out at said sites; and wherein
said database interface is further operative to store said job identifiers and associated ones of said site identifiers in said database.

46. A system according to claim 35, further comprising:
a drawing object interface operative to receive drawing object identifiers identifying objects depicted in graphical representations of said components; and wherein
said database interface is further operative to store said drawing object identifiers and associated ones of said component identifiers in said database.

47. A system according to claim 46, further comprising a viewer, said viewer including:

a display operative to display said drawing files; and
an application program interface operative to provide said drawing object identifiers and said associated ones of said component identifiers to said drawing object interface.

48. A system according to claim 46, further comprising:
a drawing object link interface operative to receive links to files; and wherein
said database interface is further operative to store said links and associated ones of said drawing object identifiers in said database.

49. A system according to claim 35, further comprising:
a component property interface operative to receive properties to be associated with said construction states; and wherein
said database interface is further operative to store properties and associated ones of said state indicators in said database.

50. A system according to claim 49, wherein said properties include display colors to be associated with said construction states.

51. A system according to claim 49, wherein said properties include descriptions of said construction states.

52. A system according to claim 35, further comprising:
a date interface operative to receive state date values identifying dates when said component identifiers are associated with said state indicators; and wherein
said database interface is further operative to store said state date values, associated ones of said component identifiers, and associated ones of said state indicators in said database.

53. A system according to claim 35, further comprising an extractor operative to extract said component identifiers from a drawing file, and to provide said component identifiers to said component interface.

54. A system for managing construction projects, said system comprising: a processor;
a database;
a component interface operative to receive component identifiers identifying components of a construction project;
a state interface operative to receive any of at least three predefined state indicators, each state indicator indicating a particular construction state associated with one of said components of said construction project;
a time interface operative to receive time values corresponding to amounts of time worked on said components;
a database interface operative to
store said component identifiers and associated state indicators in said database, whereby said particular construction states associated with said components can be updated,
store one of said component identifiers previously associated with a first one of said state indicators in said database with a different one of said state indicators, thereby updating the construction status of the component identified by said one of said component identifiers, and
store said time values and associated ones of said component identifiers in said database; and
a remote data entry device including
a user input device operative to receive time values from a user and
an application program interface operative to provide said time values and associated ones of said component identifiers to said time interface.

55. A system according to claim 54, wherein said component interface and said state interface are embodied in a form, said form having a first field for receiving one of said component identifiers, and a second field for receiving one of said predefined states.

56. A system according to claim 54, wherein said component interface and said state interface are embodied in a table wherein said component identifiers and said predefined states can be entered.

57. A system according to claim 54, wherein said database interface is further operative to associate a default one of said state indicators with one of said component identifiers if one of said state indicators is not received with said one of said component identifiers.

58. A system according to claim 54, further comprising:
a link interface operative to receive links to files; and wherein
said database interface is further operative to store said links and associated ones of said component identifiers in said database.

59. A system according to claim 54, further comprising:
a worker interface operative to receive worker identifiers identifying workers; and wherein
said database interface is further operative to store said worker identifiers, associated ones of said time values, and associated ones of said component identifiers in said database.

60. A system according to claim 59, wherein:
said user input device of said remote data entry device is further operative to receive associated ones of said worker identifiers from said user; and
said application program interface of said remote data entry device is further operative to provide said associated ones of said worker identifiers to said worker interface and said associated ones of said component identifiers to said component interface.

61. A system according to claim 54, further comprising:
a date interface operative to receive date values identifying dates that work is performed on said components; and wherein
said database interface is further operative to store said date values, associated ones of said time values, and associated ones of said component identifiers in said database.

62. A system according to claim 54, further comprising:
an activity interface operative to receive activity identifiers identifying activities performed on said components; and wherein
said database interface is further operative to store said activity identifiers, associated ones of said time values, and associated ones of said component identifiers in said database.

63. A system according to claim 62, wherein:
said user input device of said remote data entry device is further operative to receive associated ones of said activity identifiers from said user; and
said application program interface of said remote data entry device is further operative to provide said associated ones of said activity identifiers to said activity interface and said associated ones of said component identifiers to said component interface.

64. A system according to claim 54, further comprising:
a site interface operative to receive site identifiers identifying sites where said construction projects are located; and
a job interface operative to receive job identifiers identifying jobs to be carried out at said sites; and wherein said database interface is further operative to store said job identifiers and associated ones of said site identifiers in said database.

65. A system according to claim 54, further comprising:
a drawing object interface operative to receive drawing object identifiers identifying objects depicted in graphical representations of said components; and wherein
said database interface is further operative to store said drawing object identifiers and associated ones of said component identifiers in said database.

66. A system according to claim 65, further comprising a viewer, said viewer including:
a display operative to display said drawing files; and
an application program interface operative to provide said drawing object identifiers and said associated ones of said component identifiers to said drawing object interface.

67. A system according to claim 65, further comprising:
a drawing object link interface operative to receive links to files; and wherein
said database interface is further operative to store said links and associated ones of said drawing object identifiers in said database.

68. A system according to claim 54, further comprising:
a component property interface operative to receive properties to be associated with said construction states; and wherein
said database interface is further operative to store properties and associated ones of said state indicators in said database.

69. A system according to claim 68, wherein said properties include display colors to be associated with said construction states.

70. A system according to claim 68, wherein said properties include descriptions of said construction states.

71. A system according to claim 54, further comprising:
a date interface operative to receive state date values identifying dates when said component identifiers are associated with said state indicators; and wherein
said database interface is further operative to store said state date values, associated ones of said component identifiers, and associated ones of said state indicators in said database.

72. A system according to claim 54, further comprising an extractor operative to extract said component identifiers from a drawing file, and to provide said component identifiers to said component interface.

73. A system for managing construction projects, said system comprising: a processor;
a database;
a component interface operative to receive component identifiers identifying components of a construction project;
a state interface operative to receive any of at least three predefined state indicators, each state indicator indicating a particular construction state associated with one of said components of said construction project;
a time interface operative to receive time values corresponding to amounts of time worked on said components;
a worker interface operative to receive worker identifiers identifying workers; and
a database interface operative to
store said component identifiers and associated state indicators in said database, whereby said particular construction states associated with said components can be updated,
store one of said component identifiers previously associated with a first one of said state indicators in said database with a different one of said state indicators, thereby updating the construction status of the component identified by said one of said component identifiers,
store said time values and associated ones of said component identifiers in said database, and
store said worker identifiers, associated ones of said time values, and associated ones of said component identifiers in said database.

74. A system according to claim 73, wherein said component interface and said state interface are embodied in a form, said form having a first field for receiving one of said component identifiers, and a second field for receiving one of said predefined states.

75. A system according to claim 73, wherein said component interface and said state interface are embodied in a table wherein said component identifiers and said predefined states can be entered.

76. A system according to claim 73, wherein said database interface is further operative to associate a default one of said state indicators with one of said component identifiers if one of said state indicators is not received with said one of said component identifiers.

77. A system according to claim 73, further comprising:
a link interface operative to receive links to files; and wherein
said database interface is further operative to store said links and associated ones of said component identifiers in said database.

78. A system according to claim 73, further comprising a remote data entry device, said remote data entry device including:
a user input device operative to receive time values and associated ones of said worker identifiers from a user; and
an application program interface operative to provide said time values to said time interface, said associated ones of said worker identifiers to said worker interface, and said associated ones of said component identifiers to said component interface.

79. A system according to claim 73, further comprising:
a date interface operative to receive date values identifying dates that work is performed on said components; and wherein
said database interface is further operative to store said date values, associated ones of said time values, and associated ones of said component identifiers in said database.

80. A system according to claim 73, further comprising:
an activity interface operative to receive activity identifiers identifying activities performed on said components; and wherein
said database interface is further operative to store said activity identifiers, associated ones of said time values, and associated ones of said component identifiers in said database.

81. A system according to claim 80, further comprising a remote data entry device, said remote data entry device including:
a user input device operative to receive time values and associated ones of said activity identifiers from a user; and
an application program interface operative to provide said time values to said time interface, said associated ones of said activity identifiers to said activity interface, and said associated ones of said component identifiers to said component interface.

82. A system according to claim 73, further comprising:
a site interface operative to receive site identifiers identifying sites where said construction projects are located; and
a job interface operative to receive job identifiers identifying jobs to be carried out at said sites; and wherein
said database interface is further operative to store said job identifiers and associated ones of said site identifiers in said database.

83. A system according to claim 73, further comprising:
a drawing object interface operative to receive drawing object identifiers identifying objects depicted in graphical representations of said components; and wherein
said database interface is further operative to store said drawing object identifiers and associated ones of said component identifiers in said database.

84. A system according to claim 83, further comprising a viewer, said viewer including:
a display operative to display said drawing files; and
an application program interface operative to provide said drawing object identifiers and said associated ones of said component identifiers to said drawing object interface.

85. A system according to claim 83, further comprising:
a drawing object link interface operative to receive links to files; and wherein
said database interface is further operative to store said links and associated ones of said drawing object identifiers in said database.

86. A system according to claim 73, further comprising:
a component property interface operative to receive properties to be associated with said construction states; and wherein
said database interface is further operative to store properties and associated ones of said state indicators in said database.

87. A system according to claim 86, wherein said properties include display colors to be associated with said construction states.

88. A system according to claim 86, wherein said properties include descriptions of said construction states.

89. A system according to claim 73, wherein said worker identifiers identify workers to perform work on at least one of said construction projects.

90. A system according to claim 72, further comprising:
a date interface operative to receive state date values identifying dates when said component identifiers are associated with said state indicators; and wherein
said database interface is further operative to store said state date values, associated ones of said component identifiers, and associated ones of said state indicators in said database.

91. A system according to claim 72, further comprising an extractor operative to extract said component identifiers from a drawing file, and to provide said component identifiers to said component interface.

92. A system for managing construction projects, said system comprising: a processor;
a database;
a component interface operative to receive component identifiers identifying components of a construction project;
a state interface operative to receive any of at least three predefined state indicators, each state indicator indicating a particular construction state associated with one of said components of said construction project;
a time interface operative to receive time values corresponding to amounts of time worked on said components;
a date interface operative to receive date values identifying dates that work is performed on said components; and
a database interface operative to
store said component identifiers and associated state indicators in said database, whereby said particular construction states associated with said components can be updated,
store one of said component identifiers previously associated with a first one of said state indicators in said database with a different one of said state indicators, thereby updating the construction status of the component identified by said one of said component identifiers,
store said time values and associated ones of said component identifiers in said database, and
store said date values, associated ones of said time values, and associated ones of said component identifiers in said database.

93. A system according to claim 92, wherein said component interface and said state interface are embodied in a form, said form having a first field for receiving one of said component identifiers, and a second field for receiving one of said predefined states.

94. A system according to claim 92, wherein said component interface and said state interface are embodied in a table wherein said component identifiers and said predefined states can be entered.

95. A system according to claim 92, wherein said database interface is further operative to associate a default one of said state indicators with one of said component identifiers if one of said state indicators is not received with said one of said component identifiers.

96. A system according to claim 92, further comprising:
a link interface operative to receive links to files; and wherein
said database interface is further operative to store said links and associated ones of said component identifiers in said database.

97. A system according to claim 92, further comprising:
a worker interface operative to receive worker identifiers identifying workers; and
a remote data entry device; and wherein
said database interface is further operative to store said worker identifiers, associated ones of said time values, and associated ones of said component identifiers in said database; and
said remote data entry device includes
a user input device operative to receive time values and associated ones of said worker identifiers from a user and
an application program interface operative to provide said time values to said time interface, said associated ones of said worker identifiers to said worker interface, and said associated ones of said component identifiers to said component interface.

98. A system according to claim 92, further comprising:
an activity interface operative to receive activity identifiers identifying activities performed on said components; and wherein said database interface is further operative to store said activity identifiers, associated ones of said time values, and associated ones of said component identifiers in said database.

99. A system according to claim 98, further comprising a remote data entry device, said remote data entry device including:
a user input device operative to receive time values and associated ones of said activity identifiers from a user; and
an application program interface operative to provide said time values to said time interface, said associated ones of said activity identifiers to said activity interface, and said associated ones of said component identifiers to said component interface.

100. A system according to claim 92, further comprising:
a site interface operative to receive site identifiers identifying sites where said construction projects are located; and
a job interface operative to receive job identifiers identifying jobs to be carried out at said sites; and wherein
said database interface is further operative to store said job identifiers and associated ones of said site identifiers in said database.

101. A system according to claim 92, further comprising:
a drawing object interface operative to receive drawing object identifiers identifying objects depicted in graphical representations of said components; and wherein
said database interface is further operative to store said drawing object identifiers and associated ones of said component identifiers in said database.

102. A system according to claim 101, further comprising a viewer, said viewer including:
a display operative to display said drawing files; and
an application program interface operative to provide said drawing object identifiers and said associated ones of said component identifiers to said drawing object interface.

103. A system according to claim 101, further comprising:
a drawing object link interface operative to receive links to files; and wherein
said database interface is further operative to store said links and associated ones of said drawing object identifiers in said database.

104. A system according to claim 92, further comprising:
a component property interface operative to receive properties to be associated with said construction states; and wherein
said database interface is further operative to store properties and associated ones of said state indicators in said database.

105. A system according to claim 104, wherein said properties include display colors to be associated with said construction states.

106. A system according to claim 104, wherein said properties include descriptions of said construction states.

107. A system according to claim 92, wherein:
said date interface is further operative to receive state date values identifying dates when said component identifiers are associated with said state indicators; and wherein
said database interface is further operative to store said state date values, associated ones of said component identifiers, and associated ones of said state indicators in said database.

108. A system according to claim 92, further comprising an extractor operative to extract said component identifiers from a drawing file, and to provide said component identifiers to said component interface.

109. A system for managing construction projects, said system comprising: a processor;
a database;
a component interface operative to receive component identifiers identifying components of a construction project;
a state interface operative to receive any of at least three predefined state indicators, each state indicator indicating a particular construction state associated with one of said components of said construction project;
a time interface operative to receive time values corresponding to amounts of time worked on said components;
an activity interface operative to receive activity identifiers identifying activities performed on said components; and
a database interface operative to
store said component identifiers and associated state indicators in said database, whereby said particular construction states associated with said components can be updated,
store one of said component identifiers previously associated with a first one of said state indicators in said database with a different one of said state indicators, thereby updating the construction status of the component identified by said one of said component identifiers,
store said time values and associated ones of said component identifiers in said database, and
store said activity identifiers, associated ones of said time values, and associated ones of said component identifiers in said database.

110. A system according to claim 109, wherein said component interface and said state interface are embodied in a form, said form having a first field for receiving one of said component identifiers, and a second field for receiving one of said predefined states.

111. A system according to claim 109, wherein said component interface and said state interface are embodied in a table wherein said component identifiers and said predefined states can be entered.

112. A system according to claim 109, wherein said database interface is further operative to associate a default one of said state indicators with one of said component identifiers if one of said state indicators is not received with said one of said component identifiers.

113. A system according to claim 109, further comprising:
a link interface operative to receive links to files; and wherein
said database interface is further operative to store said links and associated ones of said component identifiers in said database.

114. A system according to claim 109, further comprising:
a worker interface operative to receive worker identifiers identifying workers; and
a remote data entry device; and wherein
said database interface is further operative to store said worker identifiers, associated ones of said time values, and associated ones of said component identifiers in said database; and said remote data entry device includes
- a user input device operative to receive time values and associated ones of said worker identifiers from a user and
- an application program interface operative to provide said time values to said time interface, said associated ones of said worker identifiers to said worker interface, and said associated ones of said component identifiers to said component interface.

115. A system according to claim 109, further comprising a remote data entry device, said remote data entry device including:
- a user input device operative to receive time values and associated ones of said activity identifiers from a user; and
- an application program interface operative to provide said time values to said time interface, said associated ones of said activity identifiers to said activity interface, and said associated ones of said component identifiers to said component interface.

116. A system according to claim 109, further comprising:
- a site interface operative to receive site identifiers identifying sites where said construction projects are located; and
- a job interface operative to receive job identifiers identifying jobs to be carried out at said sites; and wherein
- said database interface is further operative to store said job identifiers and associated ones of said site identifiers in said database.

117. A system according to claim 109, further comprising:
- a drawing object interface operative to receive drawing object identifiers identifying objects depicted in graphical representations of said components; and wherein
- said database interface is further operative to store said drawing object identifiers and associated ones of said component identifiers in said database.

118. A system according to claim 117, further comprising a viewer, said viewer including:
- a display operative to display said drawing files; and
- an application program interface operative to provide said drawing object identifiers and said associated ones of said component identifiers to said drawing object interface.

119. A system according to claim 117, further comprising:
- a drawing object link interface operative to receive links to files; and wherein
- said database interface is further operative to store said links and associated ones of said drawing object identifiers in said database.

120. A system according to claim 109, further comprising:
- a component property interface operative to receive properties to be associated with said construction states; and wherein
- said database interface is further operative to store properties and associated ones of said state indicators in said database.

121. A system according to claim 120, wherein said properties include display colors to be associated with said construction states.

122. A system according to claim 120, wherein said properties include descriptions of said construction states.

123. A system according to claim 109, further comprising:
- a date interface operative to receive state date values identifying dates when said component identifiers are associated with said state indicators; and wherein
- said database interface is further operative to store said state date values, associated ones of said component identifiers, and associated ones of said state indicators in said database.

124. A system according to claim 109, further comprising an extractor operative to extract said component identifiers from a drawing file, and to provide said component identifiers to said component interface.

* * * * *